United States Patent
Liu et al.

(10) Patent No.: US 11,442,785 B2
(45) Date of Patent: *Sep. 13, 2022

(54) COMPUTATION METHOD AND PRODUCT THEREOF

(71) Applicant: SHANGHAI CAMBRICON INFORMATION TECHNOLOGY CO., LTD, Shanghai (CN)

(72) Inventors: Shaoli Liu, Shanghai (CN); Xishan Zhang, Shanghai (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 70 days.

This patent is subject to a terminal disclaimer.

(21) Appl. No.: 16/720,145

(22) Filed: Dec. 19, 2019

(65) Prior Publication Data

US 2020/0183752 A1 Jun. 11, 2020

Related U.S. Application Data

(63) Continuation of application No. 16/718,742, filed on Dec. 18, 2019, which is a continuation-in-part of
(Continued)

(30) Foreign Application Priority Data

May 18, 2018 (CN) .......................... 201810479540.0
Sep. 6, 2018 (CN) .......................... 201811040961.X
(Continued)

(51) Int. Cl.
*G06F 9/50* (2006.01)
*G06F 9/30* (2018.01)
(Continued)

(52) U.S. Cl.
CPC ........ *G06F 9/5061* (2013.01); *G06F 9/30109* (2013.01); *G06F 9/30145* (2013.01);
(Continued)

(58) Field of Classification Search
CPC .............. G06F 9/5061; G06F 9/30109; G06F 9/30145; G06F 9/3802; G06F 9/5011;
(Continued)

(56) References Cited

U.S. PATENT DOCUMENTS 5,052,043 A * 9/1991 Gaborski ............... G06N 3/084
382/157
6,144,977 A 11/2000 Giangarra et al.
(Continued)

FOREIGN PATENT DOCUMENTS

CN 1503858 A 6/2004
CN 1503958 A 6/2004
(Continued)

OTHER PUBLICATIONS

Taesik et al. "Speeding up Convolutional Neural Network Training with Dynamic Precision Scaling and Flexible MultiplierAccumulator" Section 2 Proposed Approach: Concept (Year: 2016) ACM.*
(Continued)

*Primary Examiner* — Eric Nilsson
(74) *Attorney, Agent, or Firm* — Rimon PC

(57) ABSTRACT

The present disclosure provides a computation method and product thereof. The computation method adopts a fusion method to perform machine learning computations. Technical effects of the present disclosure include fewer computations and less power consumption.

14 Claims, 14 Drawing Sheets

Related U.S. Application Data application No. PCT/CN2019/085844, filed on May 7, 2019.

(30) Foreign Application Priority Data

| Sep. 6, 2018 | (CN) | .......................... 201811041573.3 |
| Dec. 25, 2018 | (CN) | .......................... 201811592249.0 |

(51) Int. Cl.

| *G06F 9/38* | (2018.01) |
| *G06F 9/54* | (2006.01) |
| *G06N 20/10* | (2019.01) |
| *G06N 3/063* | (2006.01) |
| *G06N 3/08* | (2006.01) |

(52) U.S. Cl.

CPC .......... *G06F 9/3802* (2013.01); *G06F 9/5011* (2013.01); *G06F 9/546* (2013.01); *G06N 3/063* (2013.01); *G06N 3/08* (2013.01); *G06N 20/10* (2019.01)

(58) Field of Classification Search

CPC .. G06F 9/546; G06F 9/30025; G06F 9/30014; G06F 9/30112; G06F 2207/382; G06F 2207/3824; G06F 30/20; G06F 30/27; G06F 13/4018; G06N 20/00; G06N 20/10; G06N 20/20; G06N 3/02; G06N 3/04; G06N 3/0445; G06N 3/08; G06N 3/063; G06N 3/084

USPC ................. 718/102–108; 712/210, 221, 300; 706/12, 15, 16, 27

See application file for complete search history.

(56) References Cited

U.S. PATENT DOCUMENTS

| 6,671,796 | B1 | 12/2003 | Sudharsanan et al. |
| 6,715,065 | B1 | 3/2004 | Ebata et al. |
| 6,931,639 | B1 | 8/2005 | Eickemeyer |
| 7,236,995 | B2 | 6/2007 | Hinds |
| 7,242,414 | B1 | 7/2007 | Thekkath et al. |
| 7,406,451 | B2 | 7/2008 | Mrziglod et al. |
| 7,721,128 | B2 | 5/2010 | Johns et al. |
| 7,945,607 | B2 | 5/2011 | Hinds |
| 8,051,117 | B2 | 11/2011 | Lundvall et al. |
| 8,190,664 | B2 | 5/2012 | Lundvall et al. |
| 8,560,591 | B2 | 10/2013 | Lundvall et al. |
| 8,694,572 | B2 | 4/2014 | Samy et al. |
| 8,762,438 | B2 | 6/2014 | Lundvall et al. |
| 8,924,455 | B1 | 12/2014 | Barman et al. |
| 9,412,366 | B2 | 8/2016 | Wilensky et al. |
| 10,187,568 | B1 | 1/2019 | Tran et al. |
| 10,224,954 | B1 | 3/2019 | Madduri et al. |
| 10,360,304 | B1 | 7/2019 | Alvarez et al. |
| 10,427,306 | B1 | 10/2019 | Quinlan et al. |
| 10,656,942 | B2 | 5/2020 | Madduri et al. |
| 10,929,744 | B2 | 2/2021 | Li et al. |
| 2002/0138714 | A1 | 9/2002 | Leibholz et al. |
| 2003/0167460 | A1 | 9/2003 | Desai et al. |
| 2005/0138327 | A1 | 6/2005 | Tabei |
| 2006/0161375 | A1 | 7/2006 | Duberstein et al. |
| 2007/0220076 | A1 | 9/2007 | Hinds |
| 2008/0148120 | A1 | 6/2008 | Seuring |
| 2009/0113186 | A1 | 4/2009 | Kato et al. |
| 2009/0125293 | A1 | 5/2009 | Lefurgy et al. |
| 2010/0073068 | A1 | 3/2010 | Cho et al. |
| 2011/0060587 | A1 | 3/2011 | Phillips et al. |
| 2011/0301777 | A1 | 12/2011 | Cox et al. |
| 2012/0316845 | A1 | 12/2012 | Grey et al. |
| 2013/0054110 | A1 | 2/2013 | Sata |
| 2013/0332610 | A1 | 12/2013 | Beveridge |
| 2014/0081625 | A1 | 3/2014 | Wilensky et al. |
| 2014/0164737 | A1 | 6/2014 | Collange et al. |
| 2014/0249814 | A1 | 9/2014 | Nakano et al. |
| 2015/0134581 | A1* | 5/2015 | Doeding ................ G06N 3/084 706/25 |
| 2015/0370303 | A1 | 12/2015 | Krishnaswamy et al. |
| 2016/0026231 | A1 | 1/2016 | Ignowski et al. |
| 2016/0054922 | A1 | 2/2016 | Awasthi et al. |
| 2016/0124710 | A1 | 5/2016 | Lutz et al. |
| 2016/0170866 | A1 | 6/2016 | Ioualalen et al. |
| 2016/0328645 | A1* | 11/2016 | Lin ........................ G06N 3/063 |
| 2017/0061279 | A1 | 3/2017 | Yang et al. |
| 2017/0090956 | A1 | 3/2017 | Linsky |
| 2017/0103022 | A1 | 4/2017 | Kreinin et al. |
| 2017/0142327 | A1 | 5/2017 | Bayani |
| 2017/0161604 | A1 | 6/2017 | Craddock et al. |
| 2017/0221176 | A1 | 8/2017 | Munteanu et al. |
| 2017/0257079 | A1 | 9/2017 | Jain et al. |
| 2017/0262959 | A1 | 9/2017 | Lee et al. |
| 2017/0316307 | A1 | 11/2017 | Koster et al. |
| 2017/0316312 | A1 | 11/2017 | Goyal et al. |
| 2017/0344882 | A1 | 11/2017 | Ambrose et al. |
| 2017/0353163 | A1 | 12/2017 | Gazneli et al. |
| 2017/0357530 | A1 | 12/2017 | Shih et al. |
| 2017/0357910 | A1 | 12/2017 | Sommer et al. |
| 2018/0046903 | A1 | 2/2018 | Yao et al. |
| 2018/0088996 | A1 | 3/2018 | Rossi et al. |
| 2018/0096243 | A1 | 4/2018 | Patil et al. |
| 2018/0157464 | A1 | 6/2018 | Lutz et al. |
| 2018/0288440 | A1 | 10/2018 | Chao |
| 2018/0293517 | A1 | 10/2018 | Browne et al. |
| 2018/0300931 | A1 | 10/2018 | Vembu et al. |
| 2018/0322391 | A1* | 11/2018 | Wu ........................ G06N 3/084 |
| 2018/0357541 | A1 | 12/2018 | Chen et al. |
| 2018/0367729 | A1 | 12/2018 | Parasnis et al. |
| 2018/0373976 | A1 | 12/2018 | Woo |
| 2019/0034784 | A1 | 1/2019 | Li et al. |
| 2019/0042925 | A1 | 2/2019 | Choe et al. |
| 2019/0050710 | A1 | 2/2019 | Wang et al. |
| 2019/0057696 | A1 | 2/2019 | Ogawa |
| 2019/0114142 | A1 | 4/2019 | Yoda et al. |
| 2019/0122094 | A1 | 4/2019 | Chen et al. |
| 2019/0122119 | A1 | 4/2019 | Husain |
| 2019/0138372 | A1* | 5/2019 | Tee ..................... H04L 41/0604 |
| 2019/0164285 | A1 | 5/2019 | Nye et al. |
| 2019/0180170 | A1 | 6/2019 | Huang et al. |
| 2019/0199370 | A1 | 6/2019 | Madduri et al. |
| 2019/0205737 | A1 | 7/2019 | Bleiweiss et al. |
| 2019/0205746 | A1 | 7/2019 | Nurvitadhi et al. |
| 2019/0220734 | A1 | 7/2019 | Ferdman et al. |
| 2019/0228762 | A1 | 7/2019 | Wang et al. |
| 2019/0251429 | A1 | 8/2019 | Du et al. |
| 2019/0265949 | A1 | 8/2019 | Ito |
| 2019/0278677 | A1 | 9/2019 | Terechko et al. |
| 2019/0294968 | A1 | 9/2019 | Vantrease et al. |
| 2019/0339937 | A1 | 11/2019 | Lo et al. |
| 2020/0005424 | A1 | 1/2020 | Appu et al. |
| 2020/0097799 | A1 | 3/2020 | Divakar et al. |
| 2020/0117453 | A1 | 4/2020 | Zhang et al. |
| 2020/0117614 | A1 | 4/2020 | Zhang et al. |
| 2020/0125508 | A1 | 4/2020 | Liu et al. |
| 2020/0126554 | A1 | 4/2020 | Chen et al. |
| 2020/0126555 | A1 | 4/2020 | Chen et al. |
| 2020/0142748 | A1 | 5/2020 | Liu et al. |
| 2020/0159527 | A1 | 5/2020 | Zhang et al. |
| 2020/0159530 | A1 | 5/2020 | Zhang et al. |
| 2020/0159531 | A1 | 5/2020 | Zhang et al. |
| 2020/0159532 | A1 | 5/2020 | Zhang et al. |
| 2020/0159533 | A1 | 5/2020 | Zhang et al. |
| 2020/0159534 | A1 | 5/2020 | Li et al. |
| 2020/0160162 | A1 | 5/2020 | Zhang et al. |
| 2020/0160163 | A1 | 5/2020 | Liu et al. |
| 2020/0160219 | A1 | 5/2020 | Zhang et al. |
| 2020/0160220 | A1 | 5/2020 | Zhang et al. |
| 2020/0160221 | A1 | 5/2020 | Zhang et al. |
| 2020/0160222 | A1 | 5/2020 | Zhang et al. |
| 2020/0168227 | A1 | 5/2020 | Chen et al. |
| 2020/0174547 | A1 | 6/2020 | Fang et al. |
| 2020/0183752 | A1 | 6/2020 | Liu et al. |
| 2020/0241874 | A1 | 7/2020 | Chen et al. |

(56) References Cited

U.S. PATENT DOCUMENTS

| | | | |
|---|---|---|---|
| 2020/0257972 A1 | 8/2020 | Miniskar et al. |
| 2020/0334041 A1 | 10/2020 | Zhang et al. |
| 2020/0334522 A1 | 10/2020 | Zhang et al. |
| 2020/0334572 A1 | 10/2020 | Zhang et al. |
| 2020/0394522 A1 | 12/2020 | Liu et al. |
| 2020/0394523 A1 | 12/2020 | Liu et al. |
| 2021/0042889 A1 | 2/2021 | Pei |
| 2021/0061028 A1 | 3/2021 | Da Deppo et al. |
| 2021/0117768 A1 | 4/2021 | Liu et al. |
| 2021/0117810 A1 | 4/2021 | Liu |
| 2021/0182177 A1 | 6/2021 | Su et al. |
| 2021/0264270 A1 | 8/2021 | Liu et al. |
| 2021/0334007 A1 | 10/2021 | Liu et al. |
| 2021/0334137 A1 | 10/2021 | Zhang et al. |
| 2021/0341989 A1 | 11/2021 | Chen et al. |
| 2021/0374510 A1 | 12/2021 | Liu et al. |
| 2021/0374511 A1 | 12/2021 | Liu et al. |

FOREIGN PATENT DOCUMENTS

| | | |
|---|---|---|
| CN | 1851668 A | 10/2006 |
| CN | 101572829 A | 11/2009 |
| CN | 102270042 A | 12/2011 |
| CN | 102404673 A | 4/2012 |
| CN | 102684701 A | 9/2012 |
| CN | 102761509 A | 10/2012 |
| CN | 102789413 A | 11/2012 |
| CN | 102903089 A | 1/2013 |
| CN | 102981854 A | 3/2013 |
| CN | 103152673 A | 6/2013 |
| CN | 104914977 A | 9/2015 |
| CN | 105389158 A | 3/2016 |
| CN | 103534664 A | 8/2016 |
| CN | 105893419 A | 8/2016 |
| CN | 105978611 A | 9/2016 |
| CN | 106156310 A | 11/2016 |
| CN | 106354568 A | 1/2017 |
| CN | 106406812 A | 2/2017 |
| CN | 106469291 A | 3/2017 |
| CN | 106485316 A | 3/2017 |
| CN | 106502626 A | 3/2017 |
| CN | 106570559 A | 4/2017 |
| CN | 106650922 A | 5/2017 |
| CN | 106814639 A | 6/2017 |
| CN | 106951587 A | 7/2017 |
| CN | 106951962 A1 | 7/2017 |
| CN | 106997236 A | 8/2017 |
| CN | 107003988 A | 8/2017 |
| CN | 107025629 A | 8/2017 |
| CN | 107368174 A | 11/2017 |
| CN | 107451654 A | 12/2017 |
| CN | 107451658 A | 12/2017 |
| CN | 107608715 A | 1/2018 |
| CN | 107644254 A | 1/2018 |
| CN | 107688855 A | 2/2018 |
| CN | 107797913 A | 3/2018 |
| CN | 108053028 A | 5/2018 |
| CN | 104899641 A | 7/2018 |
| CN | 108337000 A | 7/2018 |
| CN | 108510067 A | 9/2018 |
| CN | 108717570 A | 10/2018 |
| CN | 109062540 A | 12/2018 |
| CN | 109063820 A | 12/2018 |
| CN | 109902745 A | 6/2019 |
| CN | 109934331 A | 6/2019 |
| CN | 109993296 A | 7/2019 |
| CN | 110059733 A | 7/2019 |
| CN | 11055450 A | 12/2019 |
| CN | 110780845 A | 2/2020 |
| EP | 0 789 296 A1 | 8/1997 |
| EP | 2 703 945 A2 | 3/2014 |
| EP | 3 106 997 A2 | 12/2016 |
| EP | 3 407 268 A1 | 11/2018 |
| JP | H03-075860 A | 8/1989 |
| JP | H09-265379 A | 10/1997 |
| JP | 2009-134433 A | 8/2012 |
| JP | 2013-514570 A | 4/2013 |
| JP | 2014-199464 A | 10/2014 |
| JP | 2015-176158 A | 10/2015 |
| JP | 2018-26114 A | 2/2018 |
| JP | 2019-519852 A | 7/2019 |
| WO | 2008153194 A1 | 12/2008 |
| WO | 2016186823 A1 | 11/2016 |
| WO | 2017185412 A1 | 11/2017 |

OTHER PUBLICATIONS

Jamie Hanlon "Why is so much memory needed for deep neural networks?" (https://www.graphcore.ai/posts/why-is-so-much-memory-needed-for-deep-neural-networks) (Year: 2017).*

Chen, T., et al., "DianNao: A Small-Footprint High-Throughput Accelerator for Ubiquitous Machine-Learning," ASPLOS '14 Proceedings of the 19th international conference on Architectural support for programming languages and operating systems, pp. 269-284, Salt Lake City, Utah, USA—Mar. 1, 2014; available: https://dl.acm.org/citation.cfm?id=2541967.

Chen, T., et al., "A Small-Footprint Accelerator for Large-Scale Neural Networks," ACM Transactions on Computer Systems (TOCS), vol. 33, Issue 2, May 1, 2015, Article No. 6, ACM New York, NY, USA; available: https://dl.acm.org/citation.cfm?id=2701417.

Chen, Y., et al., "DaDianNao: A Machine-Learning Supercomputer," MICRO-47 Proceedings of the 47th Annual IEEE/ACM International Symposium on Microarchitecture, pp. 609-622, Cambridge, United Kingdom—Dec. 13, 2014; available: https://dl.acm.org/citation.cfm?id=2742217.

Luo, T., et al., "DaDianNao: A Neural Network Supercomputer," Published in: IEEE Transactions on Computers, vol. 66, Issue: 1, pp. 73-88, Date of Publication: May 30, 2016; available: https://ieeexplore.ieee.org/document/7480791.

Liu, D., et al., "PuDianNao: A Polyvalent Machine Learning Accelerator," ASPLOS '15 Proceedings of the Twentieth International Conference on Architectural Support for Programming Languages and Operating Systems,pp. 369-381, Istanbul, Turkey—Mar. 14, 2015; available: https://dl.acm.org/citation.cfm?id=2694358.

Du, Z., et al., "ShiDianNao: Shifting Vision Processing Closer to the Sensor," ISCA '15 Proceedings of the 42nd Annual International Symposium on Computer Architecture, pp. 92-104, Portland, Oregon—Jun. 13, 2015; available: https://dl.acm.org/citation.cfm?id=2750389.

Du, Z., et al., "An Accelerator for High Efficient Vision Processing," Published in: IEEE Transactions on Computer-Aided Design of Integrated Circuits and Systems, vol. 36, Issue: 2, Jun. 22, 2016, pp. 227-240; available: https://ieeexplore.ieee.org/document/7497562.

Liu, S., et al., "Cambricon: An Instruction Set Architecture for Neural Networks," 2016 ACM/IEEE 43rd Annual International Symposium on Computer Architecture (ISCA), Seoul, South Korea, Jun. 18, 2016; available: https://ieeexplore.ieee.org/document/7551409.

Zhang, S. et al., "Cambricon-X: An Accelerator for Sparse Neural Networks," Published in: 2016 49th Annual IEEE/ACM International Symposium on Microarchitecture (MICRO), Taipei, Taiwan, Oct. 15, 2016; available: https://ieeexplore.ieee.org/document/7783723.

Chen, Y., et al., "DianNao Family: Energy-Efficient Hardware Accelerators for Machine Learning," Communications of the ACM, vol. 59 Issue 11, Oct. 28, 2016, pp. 105-112, ACM New York, NY, USA; available: https://dl.acm.org/citation.cfm?id=2996864.

Vivienne Sze et al., "Efficient Processing of Deep Neural Networks: A Tutorial and Survey", Arxiv.org, Cornell University Library, 201 Olin Library Cornell University Ithaca, NY 14853, Mar. 27, 2017 (Mar. 27, 2017), XP080759895, DOI: 10.1109/JPROC.2017. 2761740.

Liu Shaoli et al., "Cambricon: An Instruction Set Architecture for Neural Networks", 2013 21st International Conference on Program Comprehension (ICPC); [International Symposium on Computer Architecture.(ISCA)], IEEE, US, Jun. 18, 2016 (Jun. 18, 2016), pp. 393-405, XP032950675, ISSN: 1063-6897, DOI: 10.1109/ISCA. 2016.42 ISBN: 978-0-7695-3174-8 [retrieved on Aug. 24, 2016].

(56) References Cited

OTHER PUBLICATIONS

IBM, "PowerPC Microprocessor Family: Vector/SIMD Multimedia Extension Technology Programming Environments Manual Programming Environments Manual", Aug. 22, 2005 (Aug. 22, 2005), pp. 170-171, XP055673033, Retrieved from the Internet: URL:http://math-atlas.sourceforge.net/devel/assembly/ vector_simd_pem. ppc.2005AUG23.pdf [retrieved on Mar. 3, 2020].

Sumod Mohan, "Accuracy and Multi-Core Performance of Machine Learning Algorithms for Handwritten Character Recognition", Aug. 1, 2009 (Aug. 1, 2009), XP055673941, Retrieved from the Internet: URL:https://tigerprints.clemson.edu/cgi/viewcontent.cgi? article=1634&contex=all theses retrieved on Mar. 5, 2020].

European Patent Office, Extended European Search Report for European Application No. 19212749.6 dated Mar. 18, 2020.

European Patent Office, Extended European Search Report for European Application No. 19212750.4 dated Mar. 18, 2020.

European Patent Office, Extended European Search Report for European Application No. 192127512 dated Mar. 18, 2020.

European Patent Office, Extended European Search Report for European Application No. 19212752.0 dated Mar. 18, 2020.

European Patent Office, Extended European Search Report for European Application No. 19214004.4 dated Mar. 18, 2020.

European Patent Office, Extended European Search Report for European Application No. 19213389.0 dated Mar. 18, 2020.

European Patent Office, Extended European Search Report for European Application No. 19212753.8 dated Mar. 18, 2020.

European Patent Office, Extended European Search Report for European Application No. 19212754.6 dated Mar. 18, 2020.

European Patent Office, Extended European Search Report for European Application No. 19212755.3 dated Mar. 18, 2020.

European Patent Office, Extended European Search Report for European Application No. 19212756.1 dated Mar. 18, 2020.

European Patent Office, Extended European Search Report for European Application No. 18906652.6 dated Mar. 18, 2020.

European Patent Office, Extended European Search Report for European Application No. 19212746.2 dated Mar. 18, 2020.

Kalathingal Sajith et al., "Dynamic Inter-Thread Vectorization Architecture: Extracting OLP from TLP", 2016 28th International Symposium on Computer Architecture and High Performance Computing (SBAC-PAD), IEEE, Oct. 26, 2016, pp. 18-25, XP033028005, DOI: 10.1109/SBAC-PAD.2016.11.

Li et al., "Using Artificial Neural Network for Predicting Thread Partitioning in Speculative Multithreading", IEEE, 2015, pp. 823-826.

Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.

Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.

Anonymous, "Control unit—Wikipedia", May 8, 2017 (May 8, 2017), XP055673879,Retrieved from the Internet: URL: https://web.archive.org/web/20170508110348/https://en.wikipedia.org/wiki/Control unit [retrieved on Mar. 5, 2020].

Joel Emer et al., "DNN Accelerator Architectures", CICS/MTL Tutorial, Jan. 1, 2017 (Jan. 1, 2017), XP055672691, Retrieved from the Internet: URL:https://www.rle.mit.edu/eems/wp-content/uploads/2017/031Tutorial-on-JNN-4-of-5-DNN-Accelerator-Architectures.pdf [retrieved on Mar. 2, 2020].

Chen Yu-Hsin et al., "Eyeriss: An Energy-Efficient Reconfigurable Accelerator for Deep Convolutional Neural getworks", IEEE Journal of Solid-State Circuits, IEEE, USA, vol. 52, No. 1, Jan. 1, 2017 (Jan. 1, 2017), pp. 127-138, XP011638633, ISSN: 0018-9200, DOI: 10.1109/JSSC.2016.2616357 [retrieved on Jan. 9, 2017].

Pedro O. Domingos, et al., "An Efficient and Scalable Architecture for Neural Networks With Backpropagation Learning" Proceedings/ 2005 International Conference on Field Programmable Logic and Applications {Fpl): Tampere Hall, Tampere, Finland, Jan. 1, 2005, pp. 89-94, XP055606447, Piscataway, NJ. DOI: 10.1109/FPL.2005. 1515704 ISBN: 978-0-7803-9362-2.

Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/MSPEC.2016.7524158 [retrieved on Jul. 27, 2016].

Song Mingcong et al., "In-Situ AI: Towards Autonomous and Incremental Deep Learning for IoT Systems", 2018 IEEE International Symposium on High Performance Computer Architecture (HPCA),IEEE, Feb. 24, 2018 (Feb. 24, 2018), pp. 92-103, XP033341941, DOI: 10.1109/HPCA.2018.00018 [retrieved on Mar. 27, 2018].

Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE.2018.844167 4 [retrieved on Aug. 20, 2018].

Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].

European Patent Office, extended European search report for Application No. 19216754.2 dated May 8, 2020.

Extended European Search Report for EP Application No. 19214324.6 dated Oct. 1, 2020.

International Searching Authority, International Search Report for PCT Application No. PCT/CN2019/093144 dated Oct. 9, 2019.

Extended European Search Report for Application No. 19215861.6 dated May 15, 2020.

Extended European Search Report for Application No. 19215862.4 dated May 15, 2020.

Sumina Yamashita, et al., "A Method to create illustrate images using DCGAN," JISJ SIG Technical Report, vol. 2017-MPS-112 No. 16, Feb. 27, 2017; translation of abstract included.

* cited by examiner

COMPUTATION METHOD AND PRODUCT THEREOF

RELATED APPLICATIONS

The present application is a continuation of U.S. application Ser. No. 16/718,742, filed Dec. 18, 2019, which is a continuation-in-part application of PCT/CN2019/085844 filed on May 7, 2019, which claims the benefit of priority to Chinese Patent Application CN201811592249.0 filed on Dec. 25, 2018, Chinese Patent Application CN201811040961.X filed on Sep. 6, 2018, Chinese Patent Application CN201811041573.3 filed on Sep. 6, 2018, and Chinese Patent Application CN201810479540.0 filed on May 18, 2018. The content of the afore-mentioned applications are hereby incorporated by reference in their entirety.

TECHNICAL FIELD

The disclosure relates to a field of neural network, and particularly relates to a computation method and a product thereof.

BACKGROUND

Neural networks are a type of computational model. They are formed by a large number of interconnecting nodes (or may be referred to as neurons). Each node represents a specific output function called an activation function. The connection between every two nodes represents a weighted value that passes the connection signal, called weight, which is equivalent to the memory of the artificial neural network. The output of a network varies depending on the connection method, the weight, and the activation function of the network. The network itself is usually an approximation of an algorithm or function in nature, or it may be an expression of a logic strategy.

Computation methods of neural networks include, but are not limited to, addition, multiplication, activation computation, and the like. The existing computation methods of neural networks cannot realize fast computation of neural network data but may affect the computational speed.

SUMMARY

The present disclosure provides a computation method and a product thereof. The computation method and the product thereof have a technical effect of improving the computational speed of existing integrated circuit chip.

In a first aspect, a computation method is provided. The computation method can be applied in a computing system, where the computing system may include: a control unit, a computation group, and a general storage unit. The control unit may include: a first memory, a decoding logic, and a controller. The computation group may include: a group controller and a plurality of computing units. The general storage unit is configured to store data. The computation method may include:

receiving, by the controller, a first level instruction sequence, partitioning, by the decoding logic, the first level instruction sequence into a plurality of second level instruction sequences;

creating, by the controller, M threads for the plurality of second level instruction sequences, and allocating, by the controller, an independent register and configuring an independent addressing function for each thread of the M threads, in which M is an integer greater than or equal to 1; and obtaining, by the group controller, a plurality of computation types of the plurality of second level instruction sequences, obtaining a corresponding fusion computation manner of the computation types according to the plurality of computation types, using the fusion computation manner by the plurality of computing units to call the M threads to perform computations on the plurality of second level instruction sequences, and obtaining a final result.

In a second aspect of the present disclosure, a neural network operation device is provided, which is configured to perform artificial neural network training operations. The artificial neural network training operations may include neural network multi-layer training operations. The multi-layer training operations may include an $i^{th}$ layer, where at least some data of a forward computation or back computation of the $i^{th}$ layer are for a fixed point data computation, and i is an integer greater than or equal to 1; the operation device may include: a controller unit, an operating unit, and a conversion unit, where the controller unit is connected to the operating unit and to the conversion unit; the training operations of the $i^{th}$ layer may include the forward computation and the back computation of the $i^{th}$ layer; the controller unit is configured to obtain input neuron data of the $i^{th}$ layer, weight data of the $i^{th}$ layer, and a forward computation instruction of the $i^{th}$ layer;

the controller unit is further configured to parse the forward computation instruction of the $i^{th}$ layer to obtain a plurality of forward operation instructions, send the input neuron data of the $i^{th}$ layer and the weight data of the $i^{th}$ layer to the conversion unit, and send the plurality of operation instructions to the operating unit;

the conversion unit is configured to perform floating point and fixed point conversion on all or some data of the input neuron data of the $i^{th}$ layer and the weight data of the $i^{th}$ layer to obtain all fixed point data or mixed data, and send the all fixed point data or the mixed data to the operating unit, where the mixed data may include: some fixed point data and some floating point data;

the operating unit is configured to perform fixed point computations on the all fixed point data or perform mixed computations on the mixed data according to the forward operation instructions, to obtain a forward output result of the $i^{th}$ layer; and the mixed computations may include: fixed point computations performed on some fixed point data and floating point computations performed on some floating point data.

Alternatively, the controller unit is further configured to obtain input neuron data of the $i^{th}$ layer, weight data of the $i^{th}$ layer, input neuron gradients of the $i^{th}$ layer, and a back computation instruction of the $i^{th}$ layer;

the controller unit is further configured to parse the computation instruction of the $i^{th}$ layer to obtain a plurality of back operation instructions, send the input neuron data of the $i^{th}$ layer, the weight data of the $i^{th}$ layer, and the input neuron gradients of the $i^{th}$ layer to the conversion unit, and send the plurality of operation instructions to the operating unit;

the conversion unit is further configured to perform floating point and fixed point conversion on all or some data of the input neuron data of the $i^{th}$ layer, the weight data of the $i^{th}$ layer, and the input neuron gradients of the $i^{th}$ layer to obtain all fixed point data or mixed data, and send the all fixed point data or the mixed data to the operating unit, where the mixed data may include: some fixed point data and some floating point data; and the operating unit is further configured to perform fixed point computations on the all fixed point data or perform mixed computations on the mixed data according to the plurality of back operation instructions, to obtain weight gradients of the $i^{th}$ layer and output result gradients of the $i^{th}$ layer, and use the weight gradients of the $i^{th}$ layer to update weights of the $i^{th}$ layer.

Alternatively, the conversion unit is configured to convert some of the input neuron data of the $i^{th}$ layer to some fixed point input neuron data and convert some of the weight data of the $i^{th}$ layer into some fixed point weight data, send the some fixed point input neuron data and the some fixed point weight data to the operating unit, and send some input neuron data and some weight data to the operating unit;

the operating unit is further configured to perform fixed point data computations on the some fixed point input neuron data and the some fixed point weight data to obtain some fixed point forward output results, and send the some fixed point forward output results to the conversion unit, the conversion unit is configured to perform fixed point and floating point conversion on the some fixed point forward output results to obtain a first set of some floating point forward operation results, and send the first set of some floating point forward operation results to the operating unit; and the operating unit is configured to perform computations on the some input neuron data and some weight data to obtain a second set of some floating point forward operation results, and combine the first set of some floating point forward operation results and the second set of some floating point forward operation results to obtain forward output results of the $i^{th}$ layer.

Alternatively, the conversion unit is configured to convert some of the input neuron data of the $i^{th}$ layer to some fixed point input neuron data, convert some of the weight data of the $i^{th}$ layer into some fixed point weight data, and convert input neuron gradients of the $i^{th}$ layer to some fixed point input neuron gradients, send the some fixed point input neuron data, the some fixed point input neuron gradients, and the some fixed point weight data to the operating unit, and send some input neuron data, some input neuron gradients, and some weight data to the operating unit;

the operating unit is configured to perform fixed point data computations on the some fixed point input neuron gradients and the some fixed point input data to obtain some weight gradients of the $i^{th}$ layer, perform fixed point data computations on the some fixed point input neuron gradients and the some fixed point weight data to obtain some output result gradients of the $i^{th}$ layer, and send the some weight gradients of $i^{th}$ layer and the some output result gradients of $i^{th}$ layer to the conversion unit;

conversion unit is configured to perform fixed point and floating point conversion on the some weight gradients of the $i^{th}$ layer and the some output result gradients of the $i^{th}$ layer to obtain a first set of some weight gradients of the $i^{th}$ layer and a first set of some output result gradients of the $i^{th}$ layer, and send the first set of some weight gradients of the $i^{th}$ layer and the first set of some output result gradients of the $i^{th}$ layer to the operating unit; and the operating unit is configured to perform computations on the some input neuron gradients and the some input data to obtain a second set of some weight gradients of the $i^{th}$ layer, perform computations on the some input neuron gradients and the some weight data to obtain a second set of some output result gradients of the $i^{th}$ layer, combine the first set of some weight gradients of the $i^{th}$ layer and the second set of some weight gradients of the $i^{th}$ layer to obtain weight gradients of the $i^{th}$ layer, and combine the first set of some output result gradients of the $i^{th}$ layer and the second set of some output result gradients of the $i^{th}$ layer to obtain output result gradients of the $i^{th}$ layer.

Alternatively, the conversion unit is point=$\lceil (\log_2(\max \text{abs})-\text{width}+2) \rceil$ configured to determine point which refers to a decimal point of a floating point number, where maxabs is a largest absolute value in floating point data to be converted, and width is a bit width of a fixed point number, $$\text{int} = \begin{cases} -2^{width-1}, & \text{if float} < -2^{width+point-1} \\ \text{round}(\text{float}/2^{point}), & \text{if } -2^{width+point-1} \leq \text{float} \leq (2^{point-1}-1)*2^{point} \\ 2^{width-1}-1, & \text{if float} > (2^{width-1}-1)*2^{point} \end{cases}$$

in which float=int*$2^{point}$, float is a value of a floating point number, and int is a value of a fixed point number.

Alternatively, the method of obtaining an input neuron gradient of the $i^{th}$ layer may include:

the controller unit is configured to receive an output result gradient sent from an $i+1^{th}$ layer, and send the output result gradient sent from the $i+1^{th}$ layer to the operating unit;

the operating unit is configured to obtain an input neuron gradient of the $i^{th}$ layer according to the output result gradient sent from the $i+1^{th}$ layer; and the input neuron gradient of the $i^{th}$ layer=f'*the output result gradient of the $i+1^{th}$ layer, and f' is a derived function of an activation function f.

Alternatively, the operating unit may include a primary processing circuit and a plurality of secondary processing circuits, where the primary processing circuit is configured to perform preprocessing on data and transfer data and operation instructions to the plurality of secondary processing circuits;

the plurality of secondary processing circuits are configured to perform intermediate computations in parallel according to data and operation instructions transferred from the primary processing circuit to obtain a plurality of intermediate results, and transfer the plurality of intermediate results to the primary processing circuit; and the primary processing circuit is configured to obtain forward output results of the $i^{th}$ layer, output result gradients of the $i^{th}$ layer, and weight gradients of the $i^{th}$ layer according to the plurality of intermediate results, and update the weights of the $i^{th}$ layer according to the weight gradients of the $i^{th}$ layer.

Alternatively, the primary processing circuit is configured to transfer input neuron data of the $i^{th}$ layer to each of the secondary processing circuits respectively, transfer the input neuron gradients of the $i^{th}$ layer to each of the secondary processing circuits. Each secondary processing circuit may multiply scalar data corresponding to the secondary processing circuit in the input neuron gradients of the $i^{th}$ layer in_gradient by the input neuron data of the $i^{th}$ layer to obtain an original weight update gradient vector dw_original of the $i^{th}$ layer of each secondary processing circuit, and may multiply the original weight update gradient vector dw_original by a weight of each secondary processing circuit to obtain an updated weight of each secondary processing circuit.

Alternatively, the primary processing circuit is configured to compute a quadratic sum sumsq_diff of original weight update gradients of all layers after original weight update gradient vectors of all layers are obtained by computations, then extract a root of sumsq_diff to obtain l2norm_diff, if l2norm_diff is greater than clip_gradient, compute a scale factor scale_factor=clip_gradient/l2norm_diff, multiply all original weight update gradients dw_original by the scale factor scale_factor respectively to obtain a weight update gradient dw', and send the update gradient dw' to each secondary processing circuit; and the secondary processing circuits are configured to multiply the weight update gradient dw' by weights to obtain a update weight of each secondary processing circuit of the $i^{th}$ layer.

Alternatively, each of the primary processing circuit and the secondary processing circuits may include a storage module, where the storage module is configured to store data; and the storage module may include at least one shared area, in which the shared area is storage space shared by the primary processing circuit or the secondary processing circuits.

Alternatively, the operating unit may also include: a branch processing circuit, where the branch processing circuit may be arranged between the primary processing circuit and the plurality of secondary processing circuits to forward data and operation instructions among the primary processing circuit and the plurality of secondary processing circuits.

Alternatively, the branch processing circuit may include: a storage module, where the storage module may include at least one shared area, in which the shared area is storage space shared by the primary processing circuit and the branch processing circuit.

Alternatively, the device may include a tree module, for instance, the tree module may be an interconnection module where a plurality of nodes constitute an n-ary tree pathway, data in upstream nodes of the n-ary tree may be sent to n downstream nodes, and data returned by the n downstream nodes is combined and then sent to the upstream nodes, where n is an integer greater than or equal to 2.

Alternatively, the activation function f may be any of the following nonlinear functions: sigmoid, tanh, relu, softmax, or may be a linear function; and the computation instructions may include: a CONFIG instruction, a COMPUTE instruction, an IO instruction, a NOP instruction, a JUMP instruction, or a MOVE instruction.

Alternatively, the primary processing circuit may include a first storage unit, a first operating unit, a first data dependency determination unit, and a first storage unit, in which:

a neuron caching unit is configured to cache input data and output data used by the primary processing circuit during computations;

the first operating unit is configured to perform various computational functions of the primary processing circuit; and the first data dependency determination unit is configured to read an input neuron vector from the first storage unit, and send the input neuron vector to the secondary processing circuits through the interconnection module, and receive an intermediate result vector of the interconnection module and send the intermediate result vector to the first operating unit.

Alternatively, the first operating unit may include: a vector addition unit and an activation operating unit;

the vector addition unit is configured to perform element-wise addition on bias data and the intermediate result to obtain a bias result; and the activation operating unit is configured to perform an activation function operation on the bias result.

Alternatively, each secondary processing circuit may include a second operating unit, a second data dependency determination unit, a second storage unit, and a third storage unit, where the second operating unit is configured to perform arithmetic logic computations;

the second data dependency determination unit is configured to perform read/write operations on the second storage unit and the third storage unit;

the second storage unit is configured to cache data of an input neuron vector and cache an output neuron value obtained by computations performed by the secondary processing circuit; and the third storage unit is configured to cache a weight vector required during a computation process of the secondary processing circuits.

Alternatively, the second operating unit may include: a vector multiplication unit and an accumulation unit;

the vector multiplication unit is configured to perform vector multiplication computations in dot product computations; and the accumulation unit is configured to perform accumulation computations in dot product computations.

In a third aspect of the present disclosure, a neural network training method for a neural network operation device is provided. The neural network training operations may include neural network multi-layer training operations. The multi-layer training operations may include an $i^{th}$ layer, where at least some data of a forward computation or back computation of the $i^{th}$ layer are for a fixed point data computation, and i is an integer greater than or equal to 1; the operation device may include: a controller unit, an operating unit, and a conversion unit, where the controller unit is connected to the operating unit and to the conversion unit; the training operations of the $i^{th}$ layer may include the forward computation and the back computation of the $i^{th}$ layer;

the forward computation of the $i^{th}$ layer may include that:

obtaining, by the controller unit, input neuron data of the $i^{th}$ layer, weight data of the $i^{th}$ layer, and a forward computation instruction of the $i^{th}$ layer, parsing the computation instruction of the $i^{th}$ layer to obtain a plurality of forward operation instructions, sending the input neuron data of the $i^{th}$ layer and the weight data of the $i^{th}$ layer to the conversion unit, and sending the plurality of forward operation instructions to the operating unit;

performing, by the conversion unit, floating point and fixed point conversion on all or some of the input neuron data of the $i^{th}$ layer and the weight data of the $i^{th}$ layer to obtain all fixed point data or mixed data, and sending the all fixed point data or the mixed data to the operating unit, wherein the mixed data comprises: some fixed point data and some floating point data;

performing, by the operating unit, fixed point computations on the all fixed point data or performing mixed computations on the mixed data according to the plurality of forward operation instructions to obtain a forward output result of the $i^{th}$ layer, where the mixed computations may include: fixed point computations performed on some fixed point data and floating point computations performed on some floating point data.

Alternatively, the back computation of the $i^{th}$ layer may include that:

obtaining, by the controller unit, the input neuron data of the $i^{th}$ layer, the weight data of the $i^{th}$ layer, input neuron gradients of the $i^{th}$ layer, and a back computation instruction of the $i^{th}$ layer, parsing the computation instruction of the $i^{th}$ layer to obtain a plurality of back operation instructions, sending the input neuron data of the $i^{th}$ layer, the weight data of the $i^{th}$ layer, and the input neuron gradients of the $i^{th}$ layer to the conversion unit, and sending the plurality of back operation instructions to the operating unit;

performing, by the conversion unit, floating point and fixed point conversion on all or some of the input neuron data of the $i^{th}$ layer, the weight data of the $i^{th}$ layer, and the input neuron gradients of the $i^{th}$ layer to obtain all fixed point data or mixed data, and sending the all fixed point data or the mixed data to the operating unit, where the mixed data may include: some fixed point data and some floating point data; and performing, by the operating unit, fixed point computations on the all fixed point data or performing mixed computations on the mixed data according to the plurality of back operation instructions, to obtain a weight gradient of the $i^{th}$ layer and an output result gradient of the $i^{th}$ layer, and using the weight gradient of the $i^{th}$ layer to update a weight of the $i^{th}$ layer.

Alternatively, the conversion unit performing floating point and fixed point conversion on all or some of the input neuron data of the $i^{th}$ layer and the weight data of the $i^{th}$ layer to obtain all fixed point data or mixed data, and sending the all fixed point data or the mixed data to the operating unit, where the mixed data may include: some fixed point data and some floating point data, and the operating unit performing fixed point computations on the all fixed point data or perform mixed computations on the mixed data according to the forward operation instructions to obtain a forward output result of the $i^{th}$ layer may include:

converting, by the conversion unit, some of the input neuron data of the $i^{th}$ layer to some fixed point input neuron data and converting some of the weight data of the $i^{th}$ layer into some fixed point weight data, sending the some fixed point input neuron data and the some fixed point weight data to the operating unit, and sending some input neuron data and some weight data to the operating unit;

performing, by the operating unit, fixed point data computations on the some fixed point input neuron data and the some fixed point weight data to obtain some fixed point forward output results, and sending the some fixed point forward output results to the conversion unit;

performing, by the conversion unit, fixed point and floating point conversion on the some fixed point forward output results to obtain a first set of some floating point forward operation results, and sending the first set of some floating point forward operation results to the operating unit; and performing, by the operating unit, computations on the some input neuron data and some weight data to obtain a second set of some floating point forward operation results, and combining the first set of some floating point forward operation results and the second set of some floating point forward operation results to obtain forward output results of the $i^{th}$ layer.

Alternatively, the conversion unit performing floating point and fixed point conversion on all or some of the input neuron data of the $i^{th}$ layer, the weight data of the $i^{th}$ layer, and the input neuron gradients of the $i^{th}$ layer to obtain all fixed point data or mixed data, and sending the all fixed point data or the mixed data to the operating unit, where the mixed data may include: some fixed point data and some floating point data, the operating unit performing fixed point computations on the all fixed point data or performing mixed computations on the mixed data according to the plurality of forward operation instructions to obtain an weight gradient of the $i^{th}$ layer and an output result gradient of the $i^{th}$ layer, and using the weight gradient of the $i^{th}$ layer and the weight of the $i^{th}$ layer for updating may include:

converting, the conversion unit, some of the input neuron data of the $i^{th}$ layer to some fixed point input neuron data, converting some of the weight data of the $i^{th}$ layer into some fixed point weight data, and converting the input neuron gradients of the $i^{th}$ layer to some fixed point input neuron gradients, sending the some fixed point input neuron data, the some fixed point input neuron gradients, and the some fixed point weight data to the operating unit, and sending some input neuron data, some input neuron gradients, and some weight data to the operating unit;

performing, by the operating unit, fixed point data computations on the some fixed point input neuron gradients and the some fixed point input data to obtain some weight gradients of the $i^{th}$ layer, performing fixed point data computations on the some fixed point input neuron gradients and the some fixed point weight data to obtain some output result gradients of the $i^{th}$ layer, and sending the some weight gradients of $i^{th}$ layer and the some output result gradients of $i^{th}$ layer to the conversion unit;

performing, the conversion unit, fixed point and floating point conversion on the some weight gradients of the $i^{th}$ layer and the some output result gradients of the $i^{th}$ layer to obtain a first set of some weight gradients of the $i^{th}$ layer and a first set of some output result gradients of the $i^{th}$ layer, and sending the first set of some weight gradients of the $i^{th}$ layer and the first set of some output result gradients of the $i^{th}$ layer to the operating unit; and performing, by the operating unit, computations on the some input neuron gradients and the some input data to obtain a second set of some weight gradients of the $i^{th}$ layer, performing computations on the some input neuron gradients and the some weight data to obtain a second set of some output result gradients of the $i^{th}$ layer, combining the first set of some weight gradients of the $i^{th}$ layer and the second set of some weight gradients of the $i^{th}$ layer to obtain weight gradients of the $i^{th}$ layer, and combining the first set of some output result gradients of the $i^{th}$ layer and the second set of some output result gradients of the $i^{th}$ layer to obtain output result gradients of the $i^{th}$ layer.

In a fourth aspect, a neural network training device which may include the operation device of the fifth aspect is provided. The neural network training device is configured to obtain data to be computed and control information from another processing device, perform an assigned computation, and transfer an execution result to another processing device via an I/O interface;

if the neural network training device include a plurality of the operation devices, the plurality of the operation devices may be connected to each other in a specific structure and may transfer data to each other, where the plurality of the operation devices may be interconnected via a PCIE (Peripheral Component Interface Express) bus and can transfer data to each other, so that neural network operations with larger scale can be supported; the plurality of the operation devices may share a control system or have their own control systems; the plurality of the operation devices may share a memory or have their own memories; and a manner for interconnecting the plurality of the operation devices may be an interconnection topology.

In a fifth aspect, a combined processing device is provided, which may include the neural network training device of the seventh aspect, a general interconnection interface, and another processing device; and the neural network training device may interact with the another processing device to perform computation operations specified by users.

In a sixth aspect, a neural network chip is provided, which may include the operation device of the fifth aspect, the neural network training device of the seventh aspect, or the combined processing device of the eighth aspect.

In a seventh aspect of the present disclosure, an electronic device is provided, where the electronic device may include the chip provided in the ninth aspect.

In an eighth aspect of the present disclosure, a board card is provided, where the board card may include: a storage component, an interface means, a control component, and the neural network chip provided in the ninth aspect.

The neural network chip is connected to the storage component, the control component, and the interface means respectively.

The storage component is configured to store data.

The interface means is configured to realize data transfer between the chip and external equipment.

The control component is configured to monitor a status of the chip.

Alternatively, the storage component may include: a plurality groups of storage units, where each group of storage units is connected to the chip via a bus, and the storage unit may be DDR SDRAM.

The chip may include: a DDR controller for controlling data transfer and data storage of each storage unit.

The interface means may be a standard PCIE interface.

BRIEF DESCRIPTION OF THE DRAWINGS

In order to illustrate the technical solutions in the examples of the present disclosure more clearly, the drawings to be used in the description of the examples will be briefly explained below. Obviously, the drawings in the description below are some examples of the present disclosure. Other drawings can be obtained according to the disclosed drawings without any creative effort by those skilled in the art.

DETAILED DESCRIPTION

Figure 1:
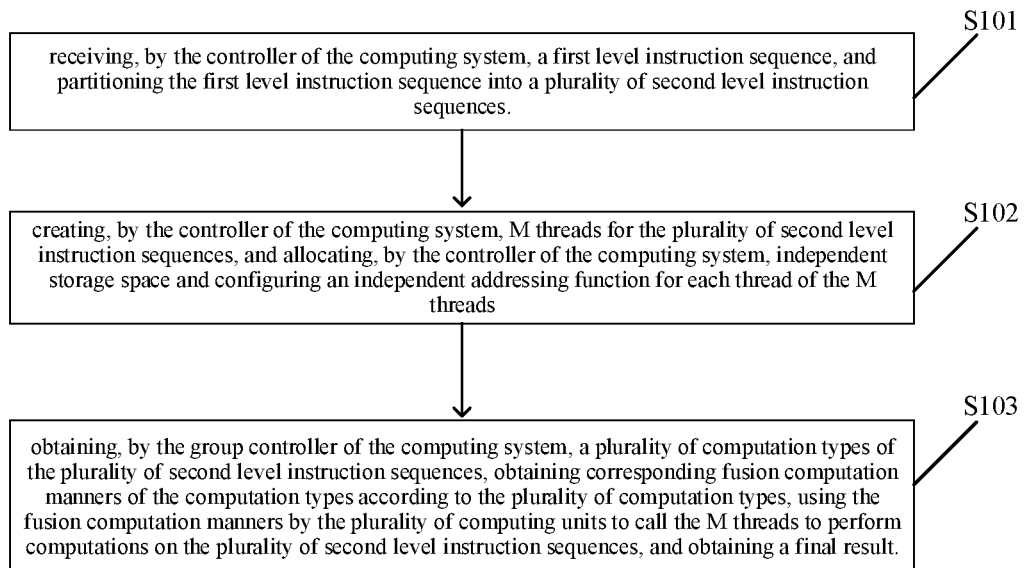
FIG. 1 is a flow chart of a computation method according to the present disclosure.

The technical solutions in the examples of the present disclosure will be described clearly and completely hereinafter with reference to the accompanied drawings in the examples of the present disclosure. Obviously, examples to be described are merely some rather than all examples of the present disclosure. All other examples obtainable by those of ordinary skill in the art based on the examples of the present disclosure without creative efforts shall fall within the protection scope of the present disclosure.

The terms such as "first", "second", "third", "fourth", and the like in the specification, the claims, and the accompanied drawings of the present disclosure are used for distinguishing between different objects rather than describing a particular order. The terms "include" and "comprise" as well as variations thereof are intended to cover non-exclusive inclusion. For instance, a process, method, system, product, device, or apparatus including a series of steps or units are not limited to the listed steps or units, they may alternatively include other steps or units that are not listed; alternatively, other steps or units inherent to the process, method, product, or device may also be included.

The term "example" in the specification means that a particular feature, structure, or characteristic described in conjunction with an example may be contained in at least one example of the present disclosure. The phrase appearing in various places in the specification does not necessarily refer to the same example, nor does it refer to an independent or alternative example that is mutually exclusive with other embodiments. It is explicitly and implicitly understood by those skilled in the art that an example described herein may be combined with other examples.

A neural network normally has several operation methods which includes but not limited to SIMD (Single Instruction Multiple Data), SIMT (Single Instruction Multiple Threads), and SMT (Simultaneous Multithreading).

SIMD (Single Instruction Multiple Data) refers to an operation determined by a computer when the computer executes a single instruction on multiple data simultaneously. For instance, when addition of two or more long vectors are to be performed, in a SIMD scenario, the one or two long vectors can be split into several short vectors, so that a plurality of vector addition components can perform addition of the several short vectors in parallel. Then, results of the addition of the several short vectors can be combined to obtain a result of addition of the two or more long vectors. In a SIMD model, an instruction stream is single at any time.

In other words, an instruction stream to be executed can be the same instruction, but data to be executed may be different.

SIMT (Single Instruction Multiple Threads) refers to the computation mode in which multiple threads run the same instruction, but each thread can have different data. In the case of SIMT, threads are often combined into a warp, each time a thread in the same warp may be run. When data processing by a thread is blocked, the data can be switched to a thread of another wrap for execution through context switching. For instance, when a first wrap waits for the memory access operation to return an operand, it may switch to a second wrap, and when the operand is ready, it can switch back to the first wrap.

SMT (Simultaneous Multithreading) refers to that a processor can run multiple instructions from multiple threads in the same clock cycle. When a thread is blocked, instructions of another thread can be run through context switching.

Referring to FIG. 1 which provides a computation method, the computation method can be performed by a computing system, where the computing system may include: a control unit, a computation group, and a general storage unit. The control unit may include: a first memory, a decoding logic, and a controller. The computation group may include: a group controller and a plurality of computing units. The general storage unit is configured to store data. The computation method may include:

S101, receiving, by the controller of the computing system, a first level instruction sequence, and partitioning the first level instruction sequence into a plurality of second level instruction sequences.

Of course, in a real application, the computing system may also receive a plurality of second level instruction sequences directly. The second level instruction sequence is an instruction sequence whose integration level is lower than the first level instruction sequence. In other words, the first level instruction sequence may include or is integrated with a plurality of second level instruction sequences. The present disclosure does not restrict a manner of the inclusion and integration.

The first level instruction sequence may be a very long instruction, and the second level instruction sequence may be an instruction sequence. Of course, in a real application, the first level instruction sequence may be an instruction sequence, and the second level instruction sequence may be a microinstruction sequence. The description above are merely some instances for explanation, for an instruction sequence used in a specific implementation, a first level instruction sequence may only need to include a set of second level instruction sequences.

The method may include: S102, creating, by the controller of the computing system, M threads for the plurality of second level instruction sequences, and allocating, by the controller of the computing system, independent storage space and configuring an independent addressing function for each thread of the M threads; and M is an integer greater than or equal to 1.

In some embodiments, the number of threads, M, allocated by the controller depends on the application or the first level instruction or instruction sequence. M may also depend on the overall hardware resources of the computing system. For example, the overall hardware resources of the computing systems decide how many computing units an SIMD operation can execute. If an SIMD operation can execute on z computing units, then M can be calculated by dividing the number of computing units required by the application by z.

The method may include: S103, obtaining, by the group controller of the computing system, a plurality of computation types of the plurality of second level instruction sequences, obtaining corresponding fusion computation manners of the computation types according to the plurality of computation types, using the fusion computation manners by the plurality of computing units to call the M threads to perform computations on the plurality of second level instruction sequences, and obtaining a final result.

In the present disclosure, the term 'fusion computation" refers to a combination of two or more computing operations, such as SIMD and SIMT. In an SIMD operation, an instruction is divided among a plurality of computing units but an SIMD operation is a single thread operation. In comparison, an SIMT operation is a multi-thread operation with each thread running on a single computing unit. A fusion computation that combines SIMD and SIMT operations is a multi-thread operation with each thread running on multiple computing units.

The present disclosure provides a computing system and a method that combine SIMD, SMT, and SIMT, and use VLIW as an alternative assistant tool. The present disclosure can fully exploit the parallelism of computing. With the rise of deep learning, vector computations are getting larger and larger. The technical solution provided by the present application can obtain a processing result faster, which has a technical effect of improving computation speed.

An instance is used below to explain the technical effect of the present disclosure. It is assumed that there are 25 vector addition instruction sequences, and the 25 vector addition instruction sequences are combined into one VLIW. If a conventional computation method is used, which parses the VLIW to obtain 25 vector addition instructions. A SIMD manner is adopted to perform addition on the 25 vector addition instructions to obtain 25 intermediate results. It is assumed that the time of each vector addition instruction is t, and if the SIMD is serially performed, the required time is 25t. When using the operation method provided by the present application, the VLIW is parsed to obtain 25 vector addition instructions, 5 threads can be called by SIMT, each thread executes 5 vector addition instructions by adopting a SIMD method, and the time of obtaining 25 vector addition instructions can be 5t, the time of switching is ignored here. Thus, it can be seen that the computation speed of the operation method provided by the present application may be increased by nearly 5 times compared with an existing method.

Alternatively, regarding the obtaining a corresponding fusion computation manner of the computation types according to the plurality of computation types, using the fusion computation manner to call the M threads to perform computations on the plurality of second level instruction sequences to obtain a final result:

if the computation types represent computation operations of the same type, the group controller may call a combined computation manner in which SIMD (Single Instruction Multiple Data) of the same type is in combination with SIMT (Single Instruction Multiple Threads), and call the M threads to perform computations to obtain a final result, which may include:

partitioning, by the decoding logic, the M threads into N wraps, converting the plurality of second level instruction sequences into a plurality of second control signals, sending the plurality of second control signals and the N wraps to plurality of computing units, calling, by the plurality of computing units, wraps that are allocated and the second control signals to fetch corresponding data, performing, by the plurality of computing units, computations on the data to obtain a plurality of intermediate results, and splicing the plurality of intermediate results to obtain a final result.

Using very-long-vector computation as example, each ALU is configured to accommodate operands of a certain length, generally much shorter than the very-long-vector. In a very-long-vector computing process, each vector is split into parts of a shorter length that can be supported by the ALUs. Each ALU performs operation on one part of the very long vector to obtain a computation result. The computation results from multiple ALUs are then spliced to obtain the final result in a reversed manner of the split.

Alternatively, regarding the obtaining a corresponding fusion computation manner of the computation types according to the plurality of computation types, using the fusion computation manner to call the M threads to perform computations on the plurality of second level instruction sequences to obtain a final result:

if the computation types represent computation operations of different type, the group controller may call a combined computation manner in which SIMD (Single Instruction Multiple Data) of the same type is in combination with SMT (Simultaneous Multithreading), and call the M threads to perform computations to obtain a final result, which may include:

partitioning, by the group controller, the M threads into N wraps; converting the plurality of second level instruction sequences into a plurality of second control signals; allocating different wraps of the N wraps for the second level instruction sequences of different types; obtaining, by the group controller, function types of the computing units; if a function type of a computing unit A is the same as a type of an instruction sequence A of the plurality of second level instruction sequences, allocating a control signal A corresponding to the instruction sequence A to the computing unit A for computing to obtain an intermediate result; if a function type of a computing unit is different from a type of an instruction sequence of the second level instruction sequences, allocating, the plurality of second control signals and the N wraps to the plurality of computing units, calling, by the plurality of computing units, allocated wraps and the second control signals to fetch corresponding data, performing computations on the data to obtain a plurality of intermediate results, and splicing the plurality of intermediate results to obtain a final result.

In an example embodiment, the number M is determined by dividing the total number of computing units required by the application by the number of computing units one thread can execute. N is determined by the hardware structure of the computing system. In an exemplary computing system, one or more arithmetic logic units (ALUs) share the same RAM and same local synchronizer. Together they are grouped into a computing subset group. To fully utilize the hardware computing resources, it is desirable to run a group of threads on all ALUs in the same computing subset group. A group of threads is also referred to as "wrap" in this disclosure. A wrap may be configured to include the same number of threads as the number of ALUs in a computing subset group. In that case, the number of wraps, N, may be determined by the number of computing subset groups and the number of ALUs in a computing subset group.

Alternatively, the method may also include:

if a wrap A in the plurality of wraps is blocked, adding, by the controller, the wrap A to a waiting queue, and if data of the wrap A have already been fetched, adding the wrap A to a preparation queue, where the preparation queue is a queue where a wrap to be scheduled for executing when the computing resource is idle is in.

Figure 2:
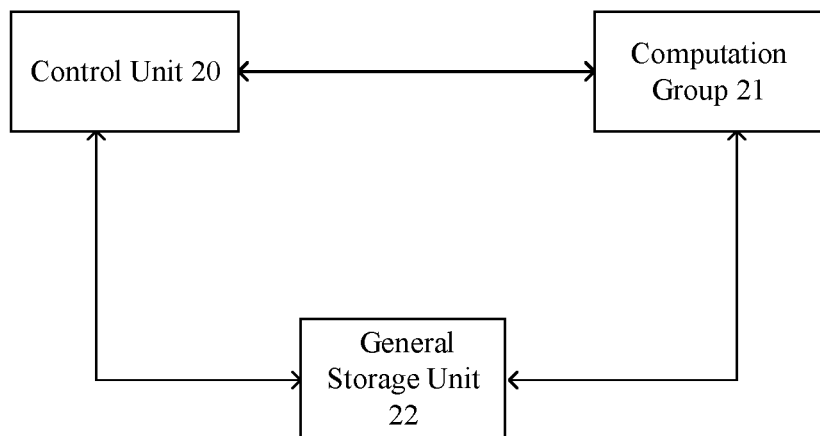
FIG. 2 is a structural diagram of a computing system according to the present disclosure.
Figure 2A:
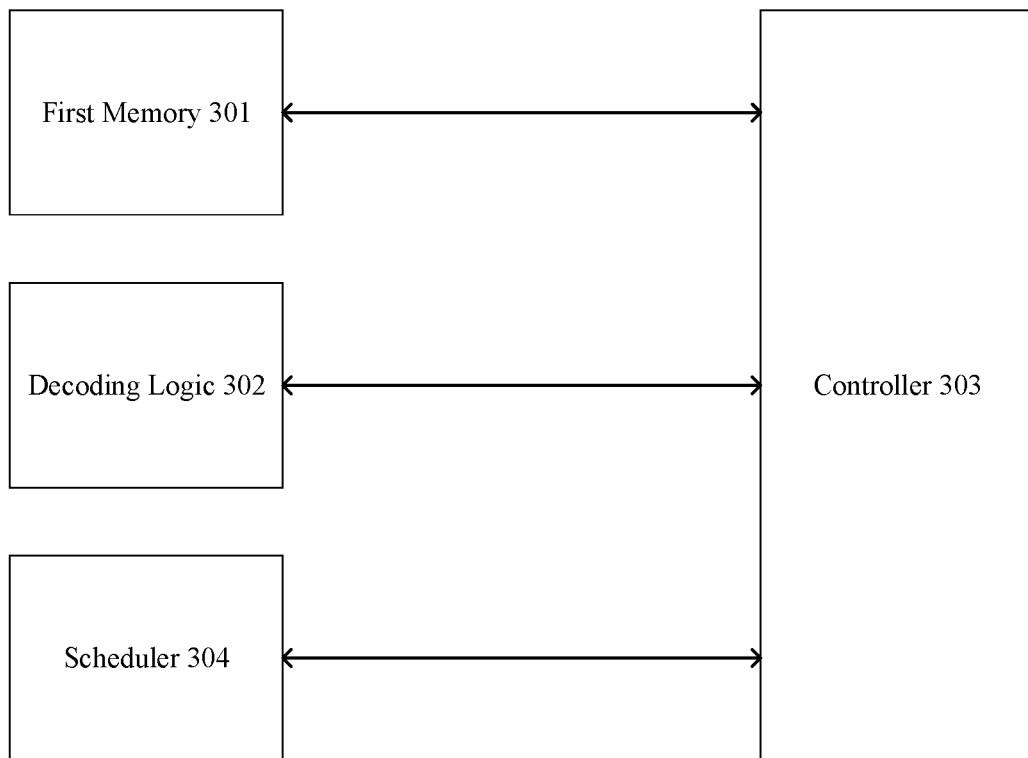
FIG. 2A is a structural diagram of a control unit according to the present disclosure.
Figure 2B:
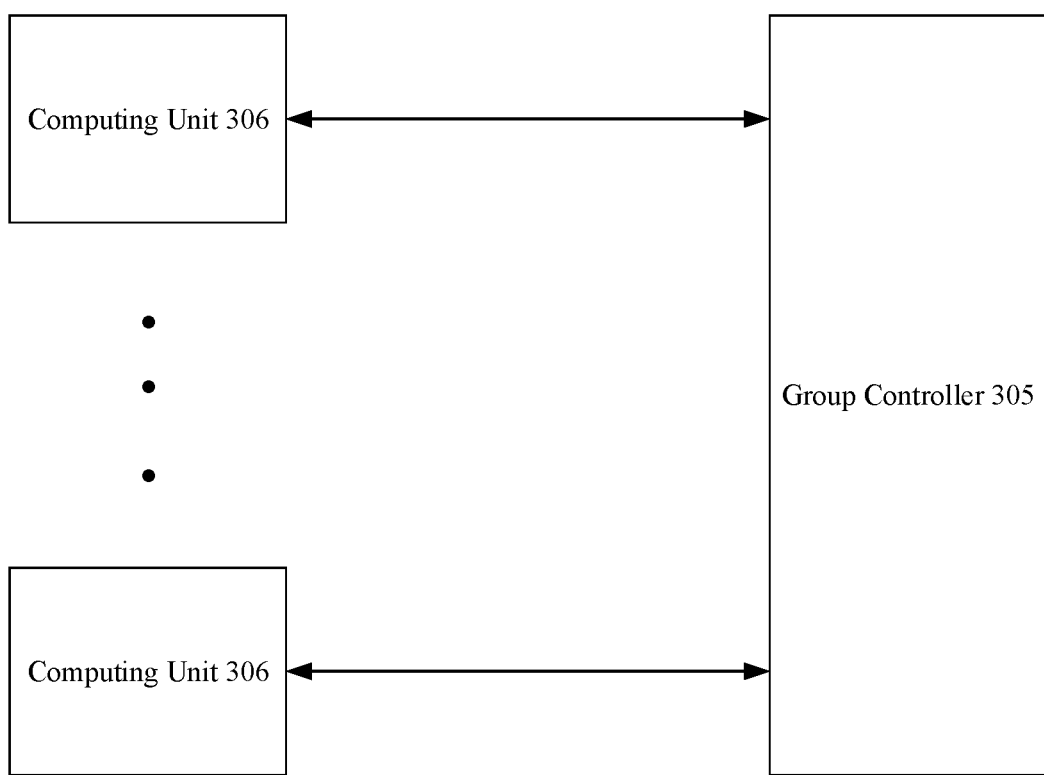
FIG. 2B is a structural diagram of a computation group according to the present disclosure.

Referring to FIG. 2 which provides a computing system, the computing system may include: a control unit 20, a computation group 21, and a general storage unit 22. As shown in FIG. 2A, the control unit may include: a first memory 301, a decoding logic 302, a controller 303, and a scheduler 304. Referring to FIG. 2B, the computation group may include: a group controller 305 and a plurality of computing units 306. The general storage unit 22 is configured to store data.

The controller 303 is configured to receive a first level instruction sequence and is configured to control the first memory 301 and the decoding logic 302.

The decoding logic 302 is configured to partition the first level instruction sequence into a plurality of second level instruction sequences.

The controller 303 is further configured to create M threads for the plurality of second level instruction sequences 303, and allocate independent storage space and configure an independent addressing function for each thread of the M threads; M is an integer greater than or equal to 1; and the controller 303 is further configured to convert the plurality of second level instruction sequences into a plurality of control signals for sending to the group controller.

The group controller 305 is configured to receive the plurality of control signals, obtain a plurality of computational types if the plurality of control signals, dividing the M threads into N wraps, and allocate the N wraps and the plurality of control signals for the plurality of computing units according to the plurality of computational types.

The computing unit 306 is configured to fetch data from the general storage unit 22 through allocated wrap and control signals, and perform computations to obtain an intermediate result.

The group controller 305 is configured to splice all intermediate results to obtain a final computation result.

Alternatively, the plurality of computing units 306 may include: an addition computing unit, a multiplication computing unit, an activation computing unit, or a dedicated computing unit.

Alternatively, the dedicated computing unit may include: a face recognition computing unit, a graphics computing unit, a fingerprint computing unit, or a neural network computing unit.

Alternatively, the group controller is configured to: if computation types of the plurality of control signals are graphics computations, fingerprint identification, face recognition, or neural network operations, allocate the plurality of control signals to the face recognition computing unit, the graphics computing unit, the fingerprint computing unit, or the neural network computing unit respectively.

Alternatively, the first level instruction sequence may include: a very long instruction, and the second level instruction sequence may include: an instruction sequence.

The computing system may include a control unit 20, a computation group 21, and a storage unit 22. The control unit is responsible for allocating instructions, creating threads, decoding ordinary instructions and very long instruction words, transferring control signals, and the like. The control unit may include: local storage, decoding logic, a scheduler, and a controller. The local storage is configured to store instructions, the decoding logic is capable of decoding the very long instruction words and the ordinary instructions, the scheduler is responsible for context switching of threads, and the controller is capable of calling stored codes to control the functioning of each submodule (for instance, the local storage, the decoding logic, and the scheduler) in the control unit.

The computation group may include a group controller and a plurality of computing units. The group controller receives the control signal from the control unit and converts it into an intra-group control signal, and transfers the intra-group control signal to one or more computing units of the plurality of computing units to compute the intra-group control signal. The computing unit may include various functional components which may include: a vector computing component and various optimized computing components for special-purpose algorithms (such as special-purpose components for machine learning or graphics processing, etc.). The computing unit may also include: a unit controller and a local memory. The unit controller is configured to control the functioning of each functional component in the computing unit, and the local memory is configured to cache data.

The storage unit is configured to store data input by users, data output by the computation group, and the like. The computation group is capable of fetching suitable data from the storage unit through various addressing methods under the control of the control unit.

The very long instruction word is taken as an instance to illustrate functions that the computing system can perform. It should be noted that the above-mentioned very long instruction word is for illustrative purposes only. In a real application, the technical solution of the present application does not restrict a form of the instruction, which can be an instruction sequence.

The very long instruction word is a vector with very long length. The vector may include multiple segments of data. The computing system can perform different operations on each segment of multiple segments of data, or perform the same operation on the multiple segments of data. When the computing system needs to compute one or more super-long vectors, first, a compiler may pack storage information of each segment of the super-long vector and information to be operated into a very long instruction word and send the very long instruction word to the control unit. The control unit may decode the very long instruction word into a series of micro-control instruction sequences. (Note that the very long instruction word is optional. When the very long instruction word is not used, an instruction sequence is stored in the local storage of the control unit, the instruction sequence may be decoded by the decoding logic into micro-control instruction sequences. Note that the micro-control instruction sequence is also optional, and the controller may also create a thread to perform the instruction sequence directly. Note that the local storage is also optional and can be replaced by the storage unit.) The computing system uses a computation method which combines SIMT and SIMD for a series of computation operations that have the same type and are involved with vectors. The controller unit creates a plurality of threads for the micro-control instruction sequences, where each thread has independent storage space and can perform independent addressing. An appropriate count of threads are packaged into wraps based on a count of computing units in the computation group, so that the computing system can obtain one or more wraps (typically being multiple wraps). The scheduler receives thread allocation information, cooperates with decoding logic to convert the micro-control instruction sequences in the threads into control signals, and sends the control signals to the group control unit of the computation group. The group control unit receives the control signals from the control unit, converts the control signals into intra-group control signals, and sends the intra-group control signals to appropriate computing units. The computing units reads vector operands from the storage unit and performs vector computations. Intermediate results may be temporarily stored in the local memory, and a final result may be stored in the storage unit. When a wrap is blocked due to memory access, by context switching, the computation group may perform computation operations of another wrap, the blocked warp is added to a waiting queue, and when an operand of the blocked warp is ready, the wrap is added to a preparation queue from the waiting queue. Wraps in the preparation queue can be scheduled to execute when the computing resource is idle. A count of threads included in a wrap is generally constant. If a count of remaining threads is less than a wrap, a constant value is filled with a non-active thread. The computing system uses a computation method which combines SMT and SIMD for a series of computation operations that have different types and are involved with vectors. The computing system assigns micro-control instruction sequences of different operations to threads in different wraps. During computation, if a warp is blocked, the computing system may perform context switching to perform a warp having other operations. The computations above may be performed cooperatively by several computing units. For a video compression computation, the prediction, transformation, quantization, and entropy coding procedures of the computation process may be allocated to different computing units, and the computing units may transfer results to each other, thereby constituting a pipeline.

Figure 2C:
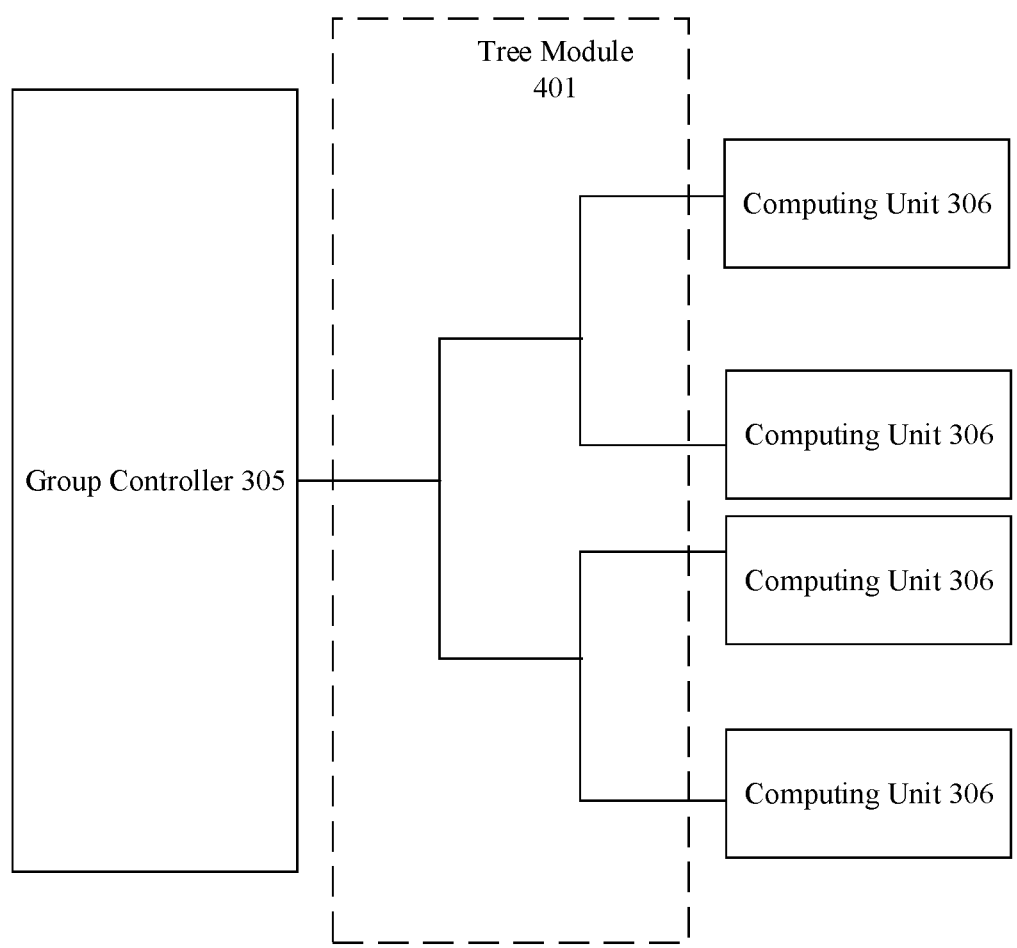
FIG. 2C is a hardware structural diagram of a group controller and a plurality of computing units.

Referring to FIG. 2C which is a hardware structural diagram of a group controller and a plurality of computing units, the computing system may further include: a tree module 401, where the tree module may be an n-ary tree, n being an integer greater than 2, and the tree module may include: a root port and a plurality of branch ports. The root port of the tree module is connected to the group controller 305. The plurality of branch ports of the tree module are connected to a computing unit 306 of the plurality of computing units 306 respectively; and the tree module is configured to forward data blocks, wraps, or instruction sequences between the group controller 305 and the plurality of computing units.

Figure 2D:
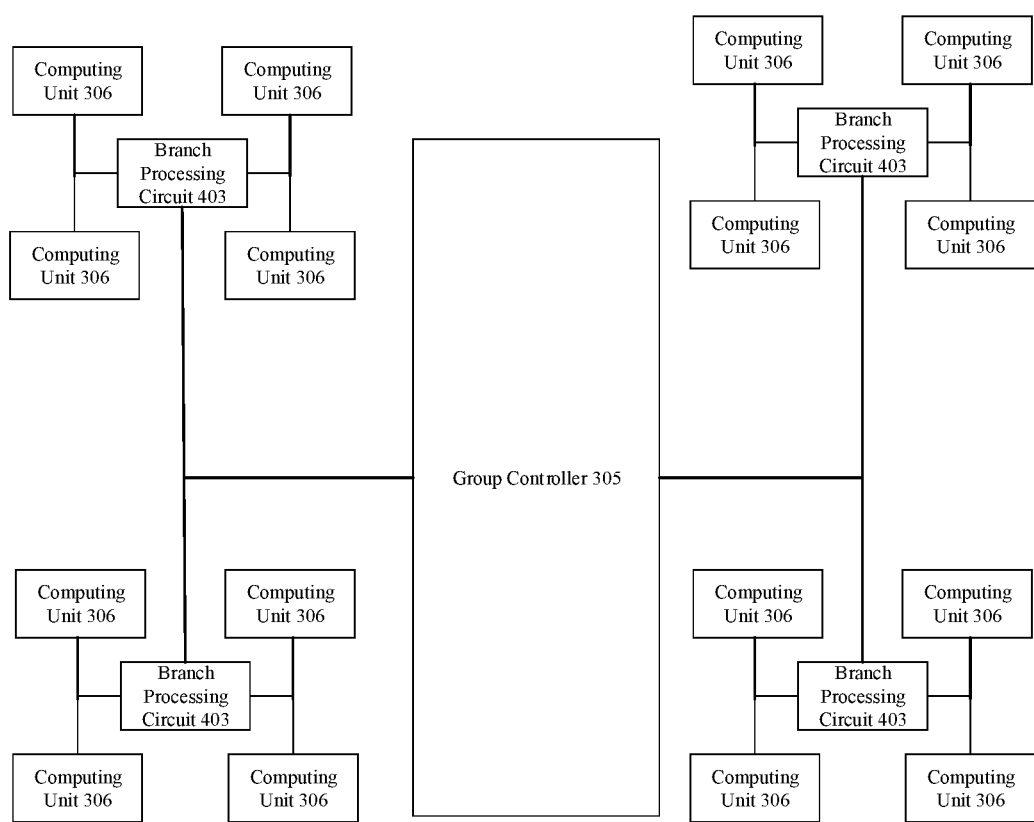
FIG. 2D is another hardware structural diagram of a group controller and a plurality of computing units.

Referring to FIG. 2D which is another hardware structural diagram of a group controller and a plurality of computing units, the computing system may include a branch processing circuit, where the branch processing circuit is connected between the group controller and the plurality of computing units; and the branch processing circuit is configured to forward data, wraps, or instruction sequences between the group controller and the plurality of computing units.

The computing unit may include: a multiplication processing circuit, where the multiplication processing circuit is configured to perform product computations on received data to obtain a product result; the computing unit may further include: an accumulation processing circuit, where the accumulation processing circuit is configured to perform accumulation computations on the product result to obtain an intermediate result.

Figure 3A:
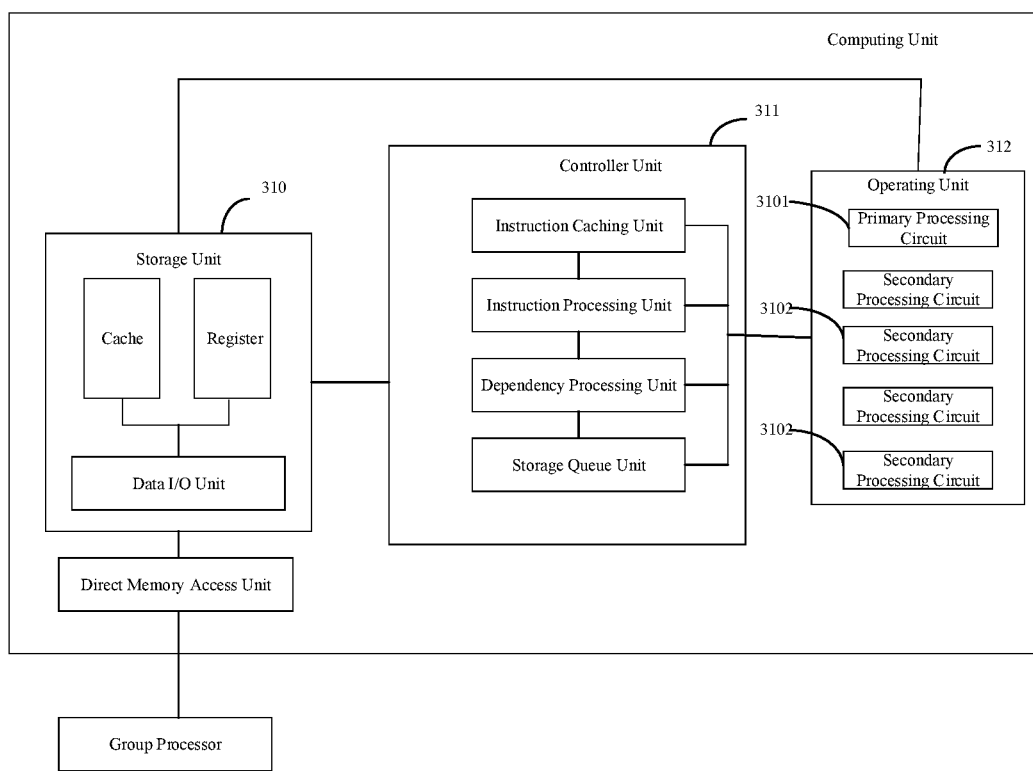
FIG. 3A is a structural diagram of a computing unit.

It should be noted that, the computing unit above may have another hardware structure. As shown in FIG. 3A, the computing unit may include a controller unit 311 and an operating unit 312, where the controller unit 311 may be connected to the operating unit 312, and the operating unit 312 may include a primary processing circuit and a plurality of secondary processing circuits;

the controller unit 311 is configured to obtain data, warps, and instructions, where when performing artificial neural network model operations, the data may include: input neuron data, weight data, and output neuron data; and in an alternative example, data, wraps, and instructions may be obtained via a data input/output unit, where the data input/output unit may be one or a plurality of data I/O interfaces or I/O leads.

The instructions may include but not limited to: a forward operation instruction or back training instruction, or another neural network operation instruction, or the like, such as a convolution operation instruction. Examples of the present disclosure do not restrict a specific representation of the computation instruction.

The controller unit 311 is further configured to parse the instruction to obtain a plurality of operation instructions, and send the plurality of operation instructions and the data to the primary processing circuit;

the primary processing circuit 3101 is configured to perform preprocessing on data and transfer data and computation instructions to the plurality of secondary processing circuits;

the plurality of secondary processing circuits 3102 are configured to perform intermediate computations in parallel according to data and operation instructions transferred from the primary processing circuit to obtain a plurality of intermediate data results, and transfer the plurality of intermediate data results to the primary processing circuit; and the primary processing circuit 3101 is further configured to perform postprocessing on the plurality of intermediate data results to obtain an instruction result of the instruction.

Alternatively, the computing unit may further include: the storage unit 310 and a direct memory access unit, where the storage unit may include one or any combination of a register and a cache. Specifically, the cache is configured to store the operation instructions. The register is configured to store wraps, instructions, data, or scalars. The cache is a high-speed temporary cache. The direct memory access unit is configured to read data from or store data in the storage unit 310.

Alternatively, the controller unit may include an instruction storage unit, an instruction processing unit, and a storage queue unit;

the instruction storage unit is configured to store instructions;

the instruction processing unit is configured to parse the computation instruction to obtain a plurality of operation instructions; and the storage queue unit is configured to store an instruction queue, where the instruction queue may include: a plurality of operation instructions or computation instructions that are to be performed and are sorted in sequential order.

Alternatively, the controller unit may include a dependency processing unit; the dependency processing unit is configured to, when a plurality of operation instructions exist, determine whether a first operation instruction and a zero-th operation instruction preceding the first operation instruction are associated, if the first operation instruction and the zero-th operation instruction are associated, the first operation instruction may be cached in the instruction storage unit, after the zero-th operation instruction is completed, the first operation instruction may be fetched from the instruction storage unit and transferred to the operating unit;

The determining whether a first operation instruction and a zero-th operation instruction preceding the first operation instruction are associated may include:

fetching a first memory address range of required data (e.g., a matrix) of the first operation instruction according to the first operation instruction, and fetching a zero-th memory address range of a required matrix of the zero-th operation instruction according to the zero-th operation instruction. If there is overlap between the first memory address range and the zero-th memory address range, then it may be determined that the first operation instruction and the zero-th operation instruction are associated; if there is no overlap between the first memory address range and the zero-th memory address range, then it may be determined that the first operation instruction and the zero-th operation instruction are not associated.

Figure 3B:
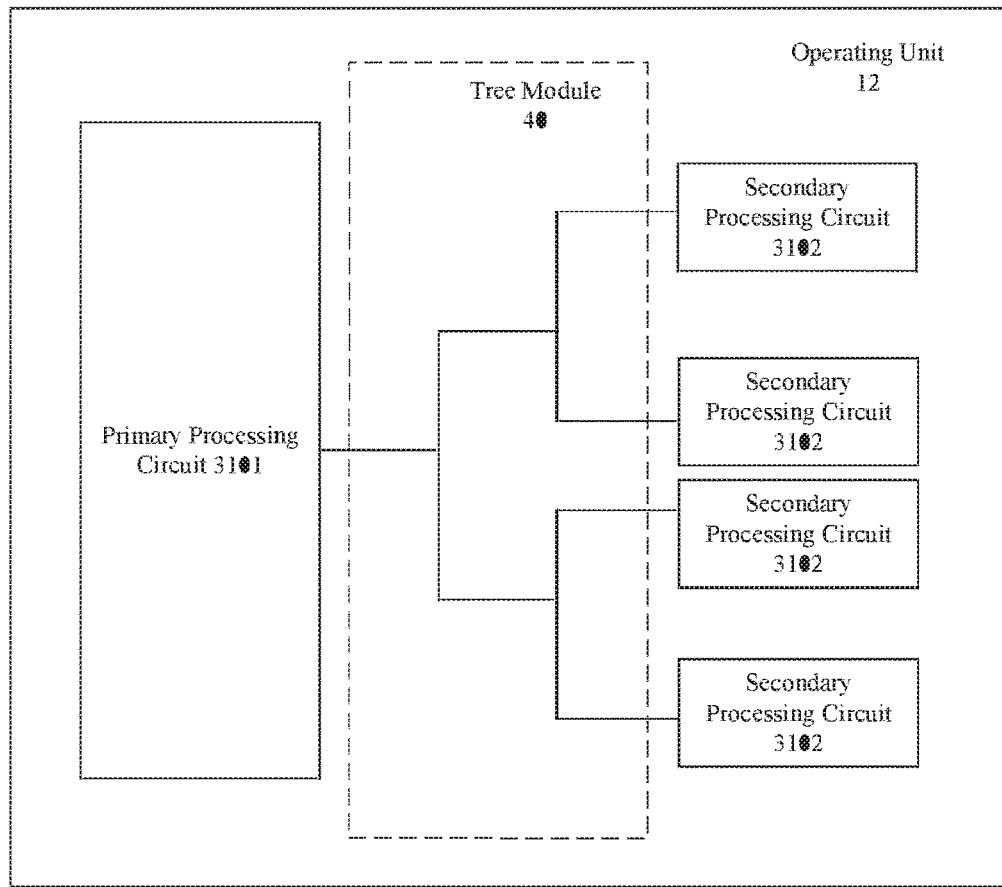
FIG. 3B is a structural diagram of an operating unit.

As an alternative example, as shown in FIG. 3B, a structure of an operating unit is provided. The operating unit may include: a tree module, where the tree module may include: a root port and a plurality of branch ports, in which the root port of the tree module is connected to the main processing circuit, and the plurality of branch ports of the tree module are connected to a secondary processing circuit of the plurality of secondary processing circuits respectively; and the tree module has a function of receiving and transferring.

The tree module is configured to forward data blocks, weights, and operation instructions between the primary processing circuit and the plurality of secondary processing circuits.

Figure 3C:
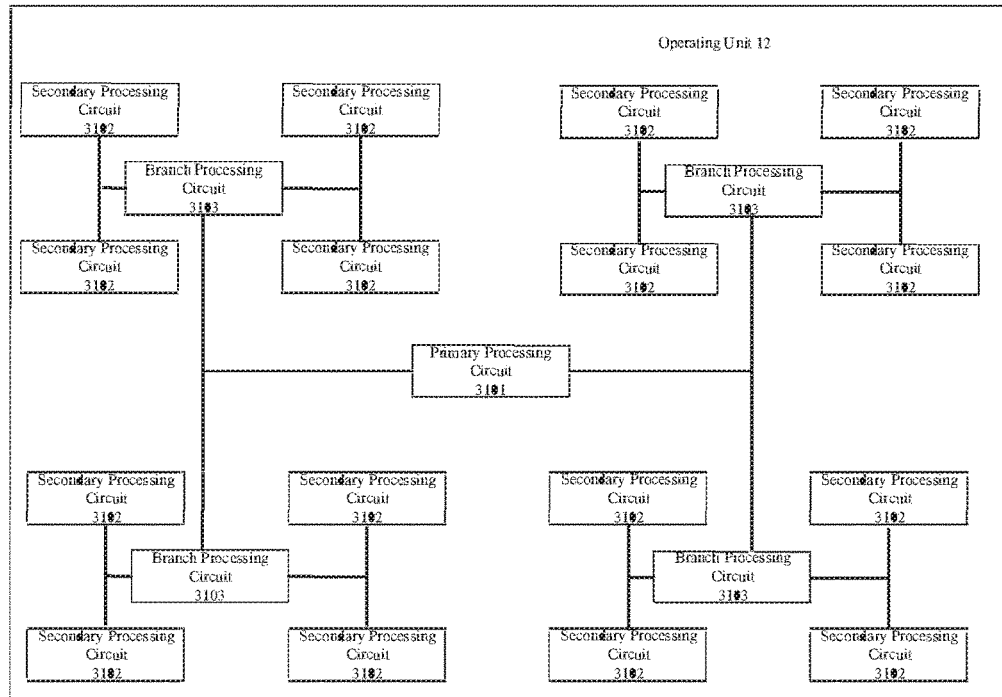
FIG. 3C is a structural diagram of another operating unit.

In an alternative example, the operating unit 12 is as shown in FIG. 3C, where the operating unit may include a branch processing circuit. A specific connection structure is shown in FIG. 3C, where the primary processing circuit 3101 is connected to the branch processing circuit 3103, and the branch processing circuit 3103 is connected to the plurality of secondary processing circuits 3102; and the branch processing circuit 3103 is configured to forward data or instructions between the primary processing circuit 3101 and the secondary processing circuits 3102.

During computation, in order to reduce computations and improve the computation speed, a floating point number is usually converted into a fixed point number for computations, which is because that a fixed point number usually has fewer bits than a floating point number does, so the memory capacity may be reduced, and the computation speed may be improved.

Figure 1A:
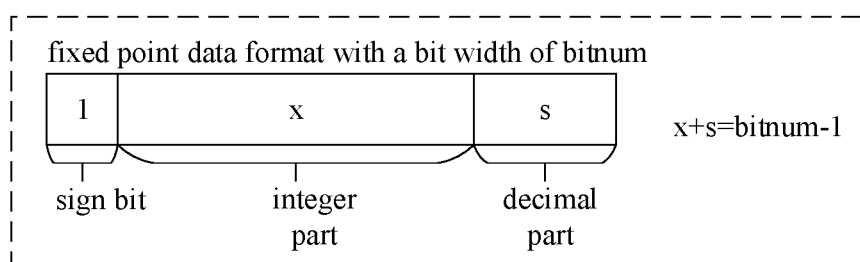
FIG. 1A is a schematic diagram of a fixed point data format.

A fixed point number is a data format in which the position of a decimal point can be specified. A bit width is usually used to represent the data length of a fixed point number. For instance, a bit width of a 16-bit fixed point number is 16. For a fixed number with a fixed bit width, the precision of representable data is related to the representable number range. For example, if the representable precision is larger, the representable number range is smaller. As shown in FIG. 1A, for a fixed point data format with a bit width of bitnum, a first bit is a sign bit, an integer part occupies x bits, and a decimal part occupies s bits, and the maximum fixed point precision S that the fixed point data format can represent is $2^{-s}$. A representable range of the fixed point data format is [neg, pos], where $pos=(2^{bitnum-1}-1)*2^{-s}$, $neg=-(2^{bitnum-1})*2^{-s}$.

In neural network operations, data can be represented by a fixed point data format. For instance, during a process of forward computations, data of an $L^{th}$ layer may include an input neuron $X^{(1)}$, an output neuron $Y^{(1)}$, and a weight $W^{(1)}$. During a process of back computations, data of an $L^{th}$ layer may include an input neuron gradient $\nabla x^{(1)}$, an output neuron gradient $\nabla_y^{(1)}$, and a weight)gradient $\nabla_w^{(1)}$. The data above may all be represented by fixed point numbers, or data represented by fixed point data format may be computed according to fixed point numbers.

A training process of neural networks usually includes two steps: forward computations and back operations. In a back computation, the precision required by the input neuron gradient, the weight gradient, and the output neuron gradient may change. They may possibly decrease as the training process goes. If the precision of fixed point numbers is redundant, the computational overhead may be increased and computational resources may be wasted.

During a process of neural network operations, after a series of computations such as addition, subtraction, multiplication, division, and convolution are performed, the input neuron, the weight, and the output neuron included in a forward computation process, as well as the input neuron gradient, the weight gradient, and the output neuron gradient included in a back training process may change. The precision of the input neuron, the weight, the output neuron, the input neuron gradient, the weight gradient, and the output neuron gradient which are represented by fixed-point data format may need to be increased or decreased. If the precision of the input neuron, the weight, the output neuron, the input neuron gradient, the weight gradient, and the output neuron gradient is not precise enough, there may be big errors in operation results, or the back training may fail. If the precision of the input neuron, the weight, the output neuron, the input neuron gradient, the weight gradient, and the output neuron gradient is redundant, unnecessary computational overhead may occur and computational resources may be wasted. The present disclosure provides a neural network operation module and a method. The neural network operation module and the method are capable of dynamically adjust the precision of the above-mentioned data during neural network operations, so that while computation demands are met, the error of a computation result may be reduced, and the precision of a computation result may be improved.

The examples of the present disclosure can adjust data precision by adjusting the bit widths of the above-mentioned data. For instance, in a case where the precision of a fixed point data format exceeds computation demands, the bit width of the decimal part in the fixed point data format may be decreased, which in other words, s in FIG. 1A may be decreased, to reduce the precision of the above-mentioned fixed point data format. However, the precision of the fixed point data format is related to the bit width of its decimal part. The bit width of the decimal part may be increased and decreased to adjust the precision of the fixed point data format. In this case, when the precision of the fixed point data format is less than required precision, the bit width of the decimal part may be reduced to increase the precision of the fixed point data format. In this way, the precision redundancy of the fixed point data format may be reduced, computational overhead may be cut down, and may avoid wasting the computational resources.

Figure 1B:
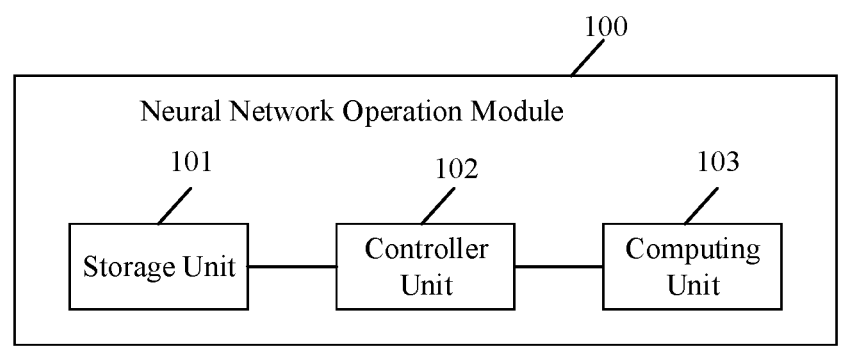
FIG. 1B is a structural diagram of a neural network operation module according to an example of the present disclosure.

FIG. 1B is a structural diagram of a neural network operation module according to an example of the present disclosure. The neural network operation module is configured to perform operations of a multi-layer neural network. As shown in FIG. 1B, the neural network operation module 100 may include:

a storage unit 101 configured to store input neuron precision, weight precision, and output neuron gradient precision.

The neural network operation module 100 may include: a controller unit 102 configured to obtain input neuron precision $S_{x(l)}$, weight precision $S_{w(l)}$, and output neuron gradient precision $S\nabla_{x(l)}$ of an $L^{th}$ layer of the multi-layer neural network from the storage unit 101, where L is an integer greater than 0, obtain gradient update precision T according to the input neuron precision $S_{x(l)}$, the weight precision $S_{w(l)}$, and the output neuron gradient precision $S\nabla_{x(l)}$, and if the gradient update precision T is less than preset precision Tr, adjust the input neuron precision $S_{x(l)}$, the weight precision $S_{w(l)}$, and the output neuron gradient precision $S\nabla_{x(l)}$.

In a viable example, the storage unit 101 is further configured to store an input neuron, a weight, an output neuron, and an output neuron gradient. The controller unit 102 may obtain the input neuron, the weight, and the output neuron gradient of the $L^{th}$ layer from the storage unit 101. The controller unit 102 may obtain the input neuron precision $S_{x(l)}$, the weight precision $S_{w(l)}$, and the output neuron gradient precision $S\nabla_{x(l)}$ according to the input neuron, the weight, and the output neuron gradient of the $L^{th}$ layer.

A bit width of a fixed point data format representing the input neuron and a bit width of a fixed point data format representing the weight are a first bit width, and a bit width of a fixed point data format representing the output neuron gradient is a second bit width.

Alternatively, the second bit width may be larger than the first bit width.

Further, the second bit width may be twice the amount of the first bit width for an electronic computer to process.

Still further, the first bit width may be 8 bits, and the second bit width may be 16 bits.

The controller unit 102 may be configured by users in advance to preset the precision to $T_r$. According to a second preset formula, preset precision $T_r$ that matches input parameters may also be obtained by changing input parameters. $T_r$ may further be obtained according to a machine learning manner.

Alternatively, the controller unit 102 may configure the preset precision $T_r$ according to a learning rate and batchsize (a count of samples during batch processing).

Furthermore, if a parameter-sharing layer (e.g., a convolutional layer and a recurrent neural network layer) exists in the neural network, the controller unit 102 may configure the preset precision $T_r$ according to a count of neurons of a previous layer, batchsize, and a learning rate. In other words, the larger the count of neurons of the previous layer, the batchsize, and the learning rate are, the larger the preset precision $T_r$ is.

Specifically, after the controller unit 102 obtains the input neuron precision $S_{x(l)}$, the weight precision $S_{w(l)}$, and the output neuron gradient precision $S\nabla_{x(l)}$, the controller unit 102 may perform computations on the input neuron precision $S_{x(l)}$, the weight precision $S_{w(l)}$, and the output neuron gradient precision $S\nabla_{x(l)}$, according to a first preset formula to obtain the gradient update precision T, where the first preset formula may be $T=S_{x(l)}+S\nabla_{x(l)}-S_{w(l)}$.

The controller unit 102 may adjust the input neuron precision $S_{x(l)}$, the weight precision $S_{w(l)}$, and the output neuron gradient precision $S\nabla_{w(l)}$, which may include that:

the controller unit 102 may keep the input neuron precision $S_{x(l)}$ and the weight precision $S_{w(l)}$ unchanged, and increase the output neuron gradient precision $S\nabla_{x(l)}$.

It should be noted that regarding the output neuron gradient precision $S\nabla_{x(l)}=2^{-s1}$, increasing the output neuron gradient precision $S\nabla_{x(l)}$ by the controller unit 102 refers to decreasing the bit width of the decimal part s1 of the fixed point data format of the output neuron gradient.

Alternatively, the controller unit 102 may decrease the bit width of the decimal part s1 of the fixed point data format representing the weight according to a value of Tr-T and a first preset stride N1.

Specifically, regarding the bit width of the decimal part s1 of the fixed point data format of the output neuron gradient, the controller unit 102 may decrease s1 by N1 bits each time, which means the bit width of the decimal part is s1−N1, and may obtain the output neuron gradient precision $S\nabla_{x(l)}=2^{-(s1-N1)}$, then the controller unit 102 may determine whether the absolute value of the difference between the gradient update precision T and the preset precision Tr becomes smaller according to the preset formula $T=S_{x(l)}+S\nabla_{x(l)}-S_{w(l)}$; when the controller unit 102 determines the absolute value of the difference between the gradient update precision T and the preset precision Tr becomes smaller, the controller unit 102 may continue to decrease the bit width of the decimal part of the fixed point data format representing the output neuron gradient by N1, which means the bit width is s1−2*N1, and obtain output neuron gradient precision $S\nabla_{x(l)}=2^{-(s1-2*N1)}$, then continue to determine whether the absolute value of the difference between the gradient update precision T and the preset precision Tr becomes smaller; if the absolute value becomes smaller, the controller unit may continue to perform processing by following the method above; if in a $n^{th}$ time of processing, the absolute value of the difference between the gradient update precision T and the preset precision Tr becomes bigger, the controller unit 102 may use the bit width obtained in a n−$1^{th}$ time of processing, which is s1−(n−1)*N1, as the bit width of the decimal part of the fixed point data format representing the output neuron gradient. After the bit width of the decimal part is decreased, the output neuron gradient precision is $S\nabla_{x(l)}=2^{-(s1-(n-1)*N1)}$.

Alternatively, the first preset stride N1 may be 1, 2, 4, 6, 7, 8, or another positive integer.

Alternatively, the controller unit 102 may decrease the bit width of the decimal part of the fixed point data format representing the output neuron gradient with an increment of 2 times.

For instance, the bit width of the decimal part of the fixed point data format representing the output neuron gradient is 4, which means the precision of the weight is $2^{-4}$. After the bit width of the decimal part of the fixed point data format representing the output neuron gradient is decreased with an increment of 2 times, the bit width becomes 2, which means the decreased output neuron gradient precision is $2^{-2}$.

In a viable example, after the controller unit 102 determines to decrease the bit width of the decimal part of the fixed point data format of the output neuron gradient by a range b, the controller unit 102 may decrease the bit width of the decimal part of the fixed point format in a plurality of times, for instance, the controller unit 102 may decrease the bit width of the decimal part of the fixed point data format in two times, where in a first time the bit width may be decreased by a range b1, in a second time the bit width may be decreased by a range b2, and b=b1+b2.

B1 and b2 may be the same or different.

Alternatively, when the controller unit 102 increases the output neuron gradient precision $S\nabla_{x(l)}$, the controller unit may decrease the bit width of the fixed point data format representing the output neuron gradient.

Furthermore, the increase of the output neuron gradient precision $S\nabla_{x(l)}$ is realized by decreasing the bit width of the decimal part of the fixed point data format of the output neuron gradient, and since the bit width of the fixed point data format representing the output neuron gradient stays the same, if the bit width of the decimal part is decreased, the integer part is increased, then the data range represented by the fixed point data format becomes larger, however, the precision represented by the fixed point data format also becomes larger. In this case, after the controller unit 102 increases the output neuron gradient precision $S\nabla_{x(l)}$, the controller unit 102 decrease the bit width of the fixed point data format, and after the bit width of the fixed point data format decreases, the integer part of the fixed point data format stays the same, in other words, the decrease of the integer part is the same as the decrease of the decimal part, which may ensure that the maximum value represented by the fixed point data format stays the same while the bit width of the decimal part changes.

For instance, the bit width of the fixed point data format is 9, in which the bit width of the sign bit is 1, the bit width of the integer part is 5, and the bit width of the decimal part is 4. After the controller unit 102 decreases the bit width of the decimal part and the bit width of the integer part, the bit width of the decimal part becomes 2, and the bit width of the integer part becomes 5. After the bit width of the decimal part is decreased, the bit width of the integer part stays the same.

In a viable example, after the controller unit 102 decreases the output neuron gradient precision $S\nabla_{x(l)}$, the controller unit 102 is further configured to:

determine whether the output neuron gradient precision $S\nabla_{x(l)}$ is less than required precision, where the required precision is minimum precision of the output neuron gradient when a multi-layer neural network operation is being performed; and if the output neuron gradient precision $S\nabla_{x(l)}$ is less than the required precision, the controller unit may decrease the bit width of the fixed point data format representing the output neuron gradient.

Note that, a reason why the controller unit 102 increases the output neuron gradient precision $S\nabla_{x(l)}$ is that the output neuron gradient precision $S\nabla_{x(l)}$ is smaller than the required precision and in this case, precision redundancy occurs which may increase computational overhead and waste computing resources. For the purpose of reducing computational overhead and avoiding wasting of computing resources, the precision of the output neuron gradient $S\nabla_{x(l)}$ needs to be increased.

Specifically, it can be known from the description above that after the controller unit 102 increases the output neuron gradient precision $S\nabla_{x(l)}$, a determination of whether precision redundancy occurs needs to be made. In other words, it needs to be determined whether the output neuron gradient precision $S\nabla_{x(l)}$ is smaller than the required precision. When it is determined that the output neuron gradient precision $S\nabla_{x(l)}$ is less than the required precision, the bit width of the fixed point data format representing the output neuron gradient may be decreased to increase the output neuron gradient precision $S\nabla_{x(l)}$ and reduce precision redundancy.

Note that, decreasing the bit width of the fixed point data format by the controller unit 102 is decreasing the bit width of the integer part of the fixed point data format.

Furthermore, decreasing the bit width of the fixed point data format representing the output neuron gradient by the controller unit 102 may include:

decreasing, by the controller unit 102, the bit width of the fixed point data format representing the output neuron gradient according to a second preset stride N2, where, the second preset stride N2 may be 1, 2, 3, 4, 5, 7, 8, or another positive integer.

Specifically, when it is determined to decrease the bit width of the fixed point data format, the controller unit 102 may decrease the bit width of the fixed point data format by the second preset stride N2 each time.

In a viable example, decreasing the bit width of the fixed point data format representing the output neuron gradient by the controller unit 102 may include:

decreasing, by the controller unit, the bit width of the fixed point data format representing the output neuron gradient with an increment of 2 times.

For instance, the bit width of the fixed point data format without the sign bit is 16. After the bit width of the fixed point data format is decreased with an increment of 2 times, the bit width of the fixed point data format without the sign bit is 8; after the bit width of the fixed point data format is decreased again with an increment of 2 times, the bit width of the fixed point data format without the sign bit is 4.

In a viable example, adjusting, by the controller unit 102, the input neuron precision $S_{x(l)}$, the weight precision $S_{w(l)}$, and the output neuron gradient precision $S\nabla_{x(l)}$ may include:

increasing, by the controller unit 102, the input neuron precision $S_{x(l)}$ and/or the output neuron gradient precision $S\nabla_{x(l)}$, and keeping the weight precision $S_{w(l)}$ unchanged; or increasing, by the controller unit 102, the input neuron precision $S_{x(l)}$, decreasing the output neuron gradient precision $S\nabla_{x(l)}$, and keeping the weight precision $S_{w(l)}$ unchanged, where the increase of the input neuron precision $S_{x(l)}$ is larger than the decrease of the output neuron gradient precision $S\nabla_{x(l)}$; or decreasing, by the controller unit 102, the output neuron gradient precision $S\nabla_{x(l)}$, increasing the input neuron precision $S_{x(l)}$, and keeping the weight precision $S_{w(l)}$ unchanged, where the decrease of the output neuron gradient precision $S\nabla_{x(l)}$ is smaller than the increase of the input neuron precision $S_{x(l)}$; or increasing or decreasing, by the controller unit 102, one or any combination of the input neuron precision $S_{x(l)}$, the weight precision $S_{w(l)}$, and the output neuron gradient precision $S\nabla_{x(l)}$, to minimize an absolute value of a difference between the gradient update precision T and the preset precision $T_r$.

It should be explained that a specific process of decreasing, by the controller unit 102, any of the weight precision $S_{w(l)}$, the input neuron precision $S_{x(l)}$, and the output neuron gradient precision $S\nabla_{x(l)}$, may be seen in the process of increasing, by the controller unit 102, the weight precision $S_{w(l)}$, the input neuron precision $S_{x(l)}$, and output neuron gradient precision $S\nabla_{x(l)}$, and is thus omitted here.

After the input neuron precision $S_{x(l)}$, the weight precision $S_{w(l)}$, and the output neuron gradient precision $S\nabla_{x(l)}$ are adjusted according to the method above, during a computation process, the operating unit 103 may represent the input neuron, the weight, and the output neuron gradient of the $L^{th}$ layer in the fixed point data format according to adjusted input neuron precision $S_{x(l)}$, weight precision $S_{x(l)}$, and output neuron gradient precision $S\nabla_{x(l)}$, and perform subsequent computations.

It should be explained that a frequency of computing the gradient update precision T by the controller unit 102 may be flexibly set according to needs.

The controller unit 102 may adjust the frequency of computing the gradient update precision T according to a count of training iterations in a neural network training process.

Alternatively, in a neural network training process, the controller unit 102 may recompute the gradient update precision T after each iteration, or recompute the gradient update precision T after a preset count of iterations, or set the frequency according to the change of the gradient update precision T.

Alternatively, the controller unit 102 may set the frequency of computing the gradient update precision T according to a count of training iterations in neural network training.

The operating unit 103 is configured to represent an input neuron and a weight of the $L^{th}$ layer according to increased or decreased input neuron precision $S_{x(l)}$ and the weight precision $S_{w(l)}$, and represent an output neuron gradient of the $L^{th}$ layer obtained from computations according to increased or decreased output neuron gradient precision $S\nabla_{x(l)}$.

In other words, the operating unit is configured to increase or decrease the fixed point data format of the input neuron precision $S_{x(l)}$ to represent an input neuron of the $L^{th}$ layer, increase or decrease the fixed point data format of the weight precision $S_{w(l)}$ to represent a weight of the $L^{th}$ layer, and increase or decrease the fixed point data format of the output neuron gradient precision $S\nabla_{x(l)}$ represent an output neuron gradient of the $L^{th}$ layer, so that subsequent computations can be performed.

By dynamically adjusting (including increasing or decreasing) the input neuron precision $S_{x(l)}$, the weight precision $S_{w(l)}$, and the output neuron gradient precision $S\nabla_{x(l)}$ during neural network operations, precision redundancy may be reduced, computational overhead may be cut down, and wasting of computing resources may be avoided while computation demands are met.

Figure 1C:
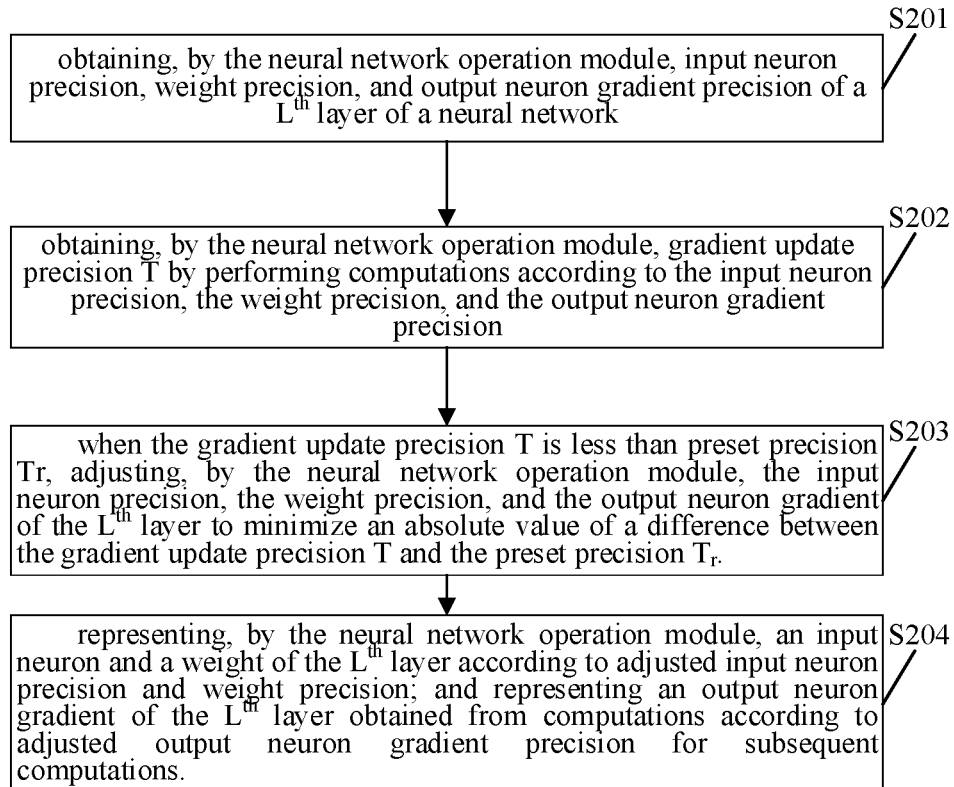
FIG. 1C is a flow chart of a neural network operation method according to an example of the present disclosure.

Referring to FIG. 1C, FIG. 1C is a flow chart of a neural network operation method according to an example of the present disclosure. As shown in FIG. 1C, the method may include:

S201, obtaining, by a neural network operation module, input neuron precision, weight precision, and output neuron gradient precision of an $L^{th}$ layer of a neural network.

Values of the input neuron precision $S_{x(l)}$, the weight precision $S_{w(l)}$, and the output neuron gradient precision $S\nabla_{x(l)}$ may be the same, or some of them may be the same, or any couple of them may be different.

The neural network may be a multi-layer neural network, the input neuron precision $S_{x(l)}$, the weight precision $S_{w(l)}$, and the output neuron gradient precision $S\nabla_{x(l)}$ of the $L^{th}$ layer may be input neuron precision, weight precision, and output neuron gradient precision of any layer of the multi-layer neural network.

In a viable example, the neural network operation module may obtain an input neuron, a weight, and an output neuron of the $L^{th}$ layer, and may obtain the input neuron precision $S_{x(l)}$, the weight precision $S_{w(l)}$, and the output neuron gradient precision $S\nabla_{x(l)}$ of the $L^{th}$ layer according to the input neuron, the weight, and the output neuron of the $L^{th}$ layer.

The method may also include: S202, obtaining, by the neural network operation module, gradient update precision T by performing computations according to the input neuron precision, the weight precision, and the output neuron gradient precision of the $L^{th}$ layer.

Specifically, the neural network operation module may perform computations on the input neuron precision $S_{x(l)}$, the weight precision $S_{w(l)}$, and the output neuron gradient precision $S\nabla_{x(l)}$ according to a first preset formula, to obtain the gradient update precision T, where the first preset formula may be $T = S_{x(l)} + S\nabla_{x(l)} - S_{w(l)}$.

S203, when the gradient update precision T is less than preset precision Tr, adjusting, by the neural network operation module, the input neuron precision, the weight precision, and the output neuron gradient of the $L^{th}$ layer to minimize an absolute value of a difference between the gradient update precision T and the preset precision $T_r$.

A bit width of a fixed point data format representing the input neuron and a bit width of a fixed point data format representing the weight are a first bit width, and a bit width of a fixed point data format representing the output neuron gradient is a second bit width.

Alternatively, the second bit width may be larger than the first bit width.

Further, the second bit width may be twice the amount of the first bit width for an electronic computer to process.

Still further, the first bit width may be 8 bits, and the second bit width may be 16 bits.

The preset precision $T_r$ may be set according to experience in advance. According to a second preset formula, $T_r$ that matches input parameters may also be obtained by changing input parameters. $T_r$ may further be obtained according to a machine learning method.

Alternatively, the neural network operation module may configure the preset precision $T_r$ according to a learning rate and batchsize (a count of samples during batch processing).

Furthermore, if a parameter-sharing layer (e.g., a convolutional layer and a recurrent neural network layer) exists in the neural network, the preset precision $T_r$ may be set according to a count of neurons in a previous layer, batchsize, and a learning rate. In other words, the larger the count of neurons in the previous layer, the batchsize, and the learning rate are, the larger the preset precision $T_r$ is.

Adjusting, by the neural network operation module, the input neuron precision $S_{x(l)}$, the weight precision $S_{w(l)}$, and the output neuron gradient precision $S\nabla_{x(l)}$ may include:

keeping, by the neural network operation module, the input neuron precision $S_{x(l)}$ and the weight precision $S_{w(l)}$ unchanged, and increasing the output neuron gradient precision $S\nabla_{x(l)}$.

It should be noted that regarding the output neuron gradient precision $S\nabla_{x(l)}=2^{-s1}$, increasing the output neuron gradient precision $S\nabla_{x(l)}$ by the neural network operation module refers to decreasing a bit width of a decimal part s1 of the fixed point data format of the output neuron gradient.

Alternatively, the neural network operation module may decrease the bit width of the decimal part s1 of the fixed point data format representing the weight according to a value of Tr-T and a first preset stride N1.

Specifically, regarding the bit width of the decimal part s1 of the fixed point data format of the output neuron gradient, the neural network operation module may decrease s1 by N1 bits each time, which means the bit width of the decimal part is s1-N1, and may obtain the output neuron gradient precision $S\nabla_{x(l)}=2^{-(s1-N1)}$, then the neural network operation module may determine whether the absolute value of the difference between the gradient update precision T and the preset precision Tr becomes smaller according to the preset formula $T=S_{x(l)}+S\nabla_{x(l)}-S_{x(l)}$; when the neural network operation module determines the absolute value of the difference between the gradient update precision T and the preset precision Tr becomes smaller, the neural network operation module may continue to decrease the bit width of the decimal part of the fixed point data format representing the output neuron gradient by N1, which means the bit width is s1-2*N1, and obtain output neuron gradient precision $S\nabla_{x(l)}=2^{-(s1-2*N1)}$, then continue to determine whether the absolute value of the difference between the gradient update precision T and the preset precision Tr becomes smaller; if the the absolute value becomes smaller, the neural network operation module may continue to perform processing by following the method above; if in a $n^{th}$ time of processing, the absolute value of the difference between the gradient update precision T and the preset precision Tr becomes bigger, the neural network operation module may use the bit width obtained in a n-1$^{th}$ time of processing, which is s1-(n-1)*N1, as the bit width of the decimal part of the fixed point data format representing the output neuron gradient. After the bit width of the decimal part is decreased, the output neuron gradient precision is $S\nabla_{x(l)}=2^{-(s1-(n-1)*N1)}$.

Alternatively, the first preset stride N1 may be 1, 2, 4, 6, 7, 8, or another positive integer.

Alternatively, the neural network operation module may decrease the bit width of the decimal part of the fixed point data format representing the output neuron gradient with an increment of 2 times.

For instance, the bit width of the decimal part of the fixed point data format representing the output neuron gradient is 4, which means the precision of the weight is $2^{-4}$. After the bit width of the decimal part of the fixed point data format representing the output neuron gradient is decreased with an increment of 2 times, the bit width becomes 2, which means the decreased output neuron gradient precision is $2^{-2}$.

In a viable example, after the neural network operation module determines to decrease the bit width of the decimal part of the fixed point data format representing the output neuron gradient by a range b, the neural network operation module may decrease the bit width of the decimal part of the fixed point format in a plurality of times, for instance, the neural network operation module may decrease the bit width of the decimal part of the fixed point data format in two times, where in a first time the bit width may be decreased by a range b1, in a second time the bit width may be decreased by a range b2, and b=b1+b2.

B1 and b2 may be the same or different.

Alternatively, when the neural network operation module increases the output neuron gradient precision $S\nabla_{x(l)}$, the neural network operation module may decrease the bit width of the fixed point data format representing the output neuron gradient.

Furthermore, the increase of the output neuron gradient precision $S\nabla_{x(l)}$ is realized by decreasing the bit width of the decimal part of the fixed point data format of the output neuron gradient, and since the bit width of the fixed point data format representing the output neuron gradient stays the same, if the bit width of the decimal part is decreased, the integer part is increased, then the data range represented by the fixed point data format becomes larger, however, the precision represented by the fixed point data format also becomes larger. In this case, after the neural network operation module increases the output neuron gradient precision $S\nabla_{x(l)}$, the neural network operation module may decrease the bit width of the fixed point data format, and after the bit width of the fixed point data format decreases, the integer part stays the same, in other words, the decrease of the integer part is the same as the decrease of the decimal part, which can ensure that the maximum value represented by the fixed point data format stays the same while the bit width of the decimal part changes.

For instance, the bit width of the fixed point data format is 9, in which the bit width of the sign bit is 1, the bit width of the integer part is 5, and the bit width of the decimal part is 3. After the neural network operation module decreases the bit width of the decimal part and the bit width of the integer part, the bit width of the decimal part becomes 2, and the bit width of the integer part becomes 5. After the bit width of the decimal part is decreased, the bit width of the integer part stays the same.

In a viable example, after the neural network operation module decreases the output neuron gradient precision $S\nabla_{x(l)}$, the neural network operation module is further configured to:

determine whether the output neuron gradient precision $S\nabla_{x(l)}$ is less than required precision, where the required precision is minimum precision of the output neuron gradient when a multi-layer neural network operation is being performed; and if the output neuron gradient precision $S\nabla_{x(l)}$ is less than the required precision, the neural network operation module may decrease the bit width of the fixed point data format representing the output neuron gradient.

Note that, a reason why the neural network operation module increases the output neuron gradient precision $S\nabla_{x(l)}$ that the output neuron gradient precision $S\nabla_{x(l)}$ is smaller than the required precision, and in this case, precision redundancy occurs which may increase computational overhead and waste computing resources. For the purpose of reducing computational overhead and avoiding wasting of computing resources, the output neuron gradient precision $S\nabla_{x(l)}$ needs to be increased.

Specifically, it can be known from the description above that after the neural network operation module increases the output neuron gradient precision $S\nabla_{x(l)}$, a determination of whether precision redundancy occurs needs to be made. In other words, it needs to be determined whether the output neuron gradient precision $S\nabla_{x(l)}$ is smaller than the required precision. When it is determined that the output neuron gradient precision $S\nabla_{x(l)}$ is less than the required precision, the bit width of the fixed point data format representing the output neuron gradient may be decreased to increase the output neuron gradient precision $S\nabla_{x(l)}$ and reduce precision redundancy.

Note that, decreasing the bit width of the fixed point data format by the neural network operation module is decreasing the bit width of the integer part of the fixed point data format.

Furthermore, decreasing the bit width of the fixed point data format representing the output neuron gradient by the neural network operation module may include:

decreasing, by the neural network operation module, the bit width of the fixed point data format representing the output neuron gradient according to a second preset stride N2, where, the second preset stride N2 may be 1, 2, 3, 4, 5, 7, 8, or another positive integer.

Specifically, when it is determined to decrease the bit width of the fixed point data format, the neural network operation module may decrease the bit width of the fixed point data format by the second preset stride N2 each time.

In a viable example, decreasing the bit width of the fixed point data format representing the output neuron gradient by the neural network operation module may include:

decreasing, by the neural network operation module, the bit width of the fixed point data format representing the output neuron gradient with an increment of 2 times.

For instance, the bit width of the fixed point data format without the sign bit is 16. After the bit width of the fixed point data format is decreased with an increment of 2 times, the bit width of the fixed point data format without the sign bit is 8; after the bit width of the fixed point data format is decreased again with an increment of 2 times, the bit width of the fixed point data format without the sign bit is 4.

In a viable example, adjusting the input neuron precision $S_{x(l)}$, the weight precision $S_{w(l)}$, and the output neuron gradient precision $S\nabla_{x(l)}$ by the neural network operation module may include:

increasing, by the neural network operation module, the input neuron precision $S_{x(l)}$ and/or the output neuron gradient precision $S\nabla_{x(l)}$, and keeping the weight precision $S_{w(l)}$ unchanged; or increasing, by the neural network operation module, the input neuron precision $S_{x(l)}$, decreasing the output neuron gradient precision $S\nabla_{x(l)}$, and keeping the weight precision $S_{w(l)}$ unchanged, where the increase of the input neuron precision $S_{x(l)}$ is larger than the decrease of the output neuron gradient precision $S\nabla_{x(l)}$; or decreasing, by the neural network operation module, the output neuron gradient precision $S\nabla_{x(l)}$, increasing the input neuron precision $S_{x(l)}$, and keeping the weight precision $S_{w(l)}$ unchanged, where the increase and decrease of the output neuron gradient precision $S\nabla_{x(l)}$ are smaller than the increase of the input neuron precision $S_{x(l)}$; or increasing or decreasing, by the neural network operation module, one or any combination of the input neuron precision $S_{x(l)}$, the weight precision $S_{w(l)}$, and the output neuron gradient precision $S\nabla_{x(l)}$, to minimize an absolute value of a difference between the gradient update precision T and the preset precision $T_r$.

It should be explained that a specific process of decreasing, by the neural network operation module, any of the weight precision $S_{w(l)}$, the input neuron precision $S_{x(l)}$, and the output neuron gradient precision $S\nabla_{x(l)}$, may be seen in the process of increasing, by the neural network operation module, the weight precision $S_{w(l)}$, the input neuron precision $S_{x(l)}$ and output neuron gradient precision $S\nabla_{x(l)}$, and is thus omitted here.

The method may further include: S204, representing, by the neural network operation module, an input neuron and a weight of the $L^{th}$ layer according to adjusted input neuron precision and the weight precision; and representing an output neuron gradient of the $L^{th}$ layer obtained from computations according to adjusted output neuron gradient precision for subsequent computations.

In other words, the operating unit is configured to increase or decrease the fixed point data format of the input neuron precision $S_{x(l)}$ to represent an input neuron of the $L^{th}$ layer, increase or decrease the fixed point data format of the weight precision $S_{w(l)}$ to represent a weight of the $L^{th}$ layer, and increase or decrease the fixed point data format of the output neuron gradient precision $S\nabla_{x(l)}$ to represent an output neuron gradient of the $L^{th}$ layer, so that subsequent computations can be performed.

After the input neuron precision $S_{x(l)}$, the weight precision $S_{w(l)}$, and the output neuron gradient precision $S\nabla_{x(l)}$ are adjusted according to the method above, the neural network operation module may recompute the gradient update precision T; when the gradient update precision is no longer larger than the preset precision $T_r$, the neural network operation module may follow the method of the step S203 to decrease the input neuron precision $S_{x(l)}$, the weight precision $S_{w(l)}$, and the output neuron gradient precision $S\nabla_{x(l)}$.

It should be explained that a frequency of computing the gradient update precision T by the neural network operation module may be flexibly set according to needs.

The neural network operation module may adjust the frequency of computing the gradient update precision T according to a count of training iterations in a neural network training process.

Alternatively, in a neural network training process, the neural network operation module may recompute the gradient update precision T after each iteration, or recompute the gradient update precision T after a preset count of iterations, or set the frequency according to the change of the gradient update precision T.

Alternatively, the neural network operation module may set the frequency of computing the gradient update precision T according to a count of training iterations in neural network training.

It can be seen that during a process of neural network operations, the technical scheme provided by the examples of the present disclosure can dynamically adjust the input neuron precision $S_x$, the weight precision $S_w$, and the output neuron gradient precision $S\nabla_x$, so that precision redundancy may be reduced, computational overhead may be cut down, and wasting of computing resources may be avoided while computation demands are met.

In the field of neural networks, training computations are the basis of neural network applications. Training operation are also called pre-training or pre-processing of models. Due to the large amount of computations involved in training computations, special-purpose devices (such as a data center) are usually required. In this case, how to reduce the amount of computations involved in training computations becomes the key to applying training computations to common devices (such as personal computers and terminal devices).

In neural network operations, data can be represented by a fixed point data format and can be computed according to their fixed point data formats. For instance, during a process of forward computations, data of the $L^{th}$ layer may include an input neuron $X^{(1)}$, an output neuron $Y^{(1)}$, and a weight $W^{(1)}$. During a process of back computations, data of the $L^{th}$ layer may include an input neuron gradient $\nabla x^{(1)}$, an output neuron gradient $\nabla_y^{(1)}$, and a weight gradient $\nabla_w^{(1)}$. The data above may all be represented by fixed point numbers, and may be computed according to the fixed point numbers.

A fixed point number is a data format in which the position of a decimal point can be specified. A bit width is usually used to represent the data length of a fixed point number. For instance, a bit width of a 16-bit fixed point number is 16. For a fixed number with a fixed bit width, the precision of representable data is related to the representable number range. If the representable precision is larger, the representable number range is smaller. As shown in FIG. 1A, for a fixed point data format with a bit width of bitnum, a first bit is a sign bit, an integer part occupies x bits, and a decimal part occupies s bits, and the maximum fixed point precision S that the fixed point data format can represent is $2^{-s}$. A representable range of the fixed point data format is [neg, pos], where $pos = (2^{bitnum-1} - 1) * 2^{-s}$, $neg = -(2^{bitnum-1}) * 2^{-s}$.

A training process of neural networks usually includes two steps: forward computations and back operations. In a back computation, the precision required by the input neuron gradient, the weight gradient, and the output neuron gradient may change. They may possibly increase as the training process goes. If the precision of fixed point numbers is not enough, large errors may occur in a computation result, and the training may even fail.

The examples of the present disclosure can adjust data precision by adjusting the bit widths of the above-mentioned data. For instance, when the precision of the fixed point data format cannot meet the demands of computations, the bit width of the decimal part of the fixed point data format may be increased, which is to increase s in FIG. 1A, so that the precision of the fixed point data format may be increased. However, since the bit width of the fixed point data format is fixed, when the bit width of the decimal part is increased, the bit width of the integer part is decreased, and the data range representable by the fixed point data format may become smaller. In this case, the bit width of the fixed point data format may be increased. Since the bit width of the decimal part stays the same, increasing the bit width of the fixed point data format may seen as increasing the bit width of the integer part of the fixed point data format, so that the data range representable by the fixed point data format may be expanded.

Referring to FIG. 1B, FIG. 1B is a structural diagram of a neural network operation module according to an example of the present disclosure. The neural network operation module is configured to perform operations of a multi-layer neural network. As shown in FIG. 1B, the neural network operation module 100 may include:

a storage unit 101 configured to store input neuron precision, weight precision, and output neuron gradient precision.

The neural network operation module 100 may include: a controller unit 102 configured to obtain input neuron precision $S_{x(l)}$, weight precision $S_{w(l)}$, and output neuron gradient precision $S\nabla_{x(l)}$ of an $L^{th}$ layer of the multi-layer neural network from the storage unit 101, where L is an integer greater than 0, obtain gradient update precision T according to the input neuron precision $S_{x(l)}$, the weight precision $S_{w(l)}$, and the output neuron gradient precision $S\nabla_{x(l)}$, and if the gradient update precision T is less than preset precision $T_r$, adjust the input neuron precision $S_{w(l)}$, the weight precision $S_{w(l)}$, and the output neuron gradient precision $S\nabla_{x(l)}$.

In a viable example, the storage unit 101 is further configured to store an input neuron, a weight, an output neuron, and an output neuron gradient. The controller unit 102 may obtain the input neuron, the weight, and the output neuron gradient of the $L^{th}$ layer from the storage unit 101. The controller unit 102 may obtain the input neuron precision $S_{x(l)}$, the weight precision $S_{(l)}$, and the output neuron gradient precision $S\nabla_{x(l)}$ according to the input neuron, the weight, and the output neuron gradient of the $L^{th}$ layer.

A bit width of a fixed point data format representing the input neuron and a bit width of a fixed point data format representing the weight are a first bit width, and a bit width of a fixed point data format representing the output neuron gradient is a second bit width.

Alternatively, the second bit width may be larger than the first bit width.

Further, the second bit width may be twice the amount of the first bit width for an electronic computer to process.

Still further, the first bit width may be 8 bits, and the second bit width may be 16 bits.

The controller unit 102 may be configured by users in advance to preset the precision to $T_r$. According to a second preset formula, preset precision $T_r$ that matches input parameters may also be obtained by changing input parameters. $T_r$ may further be obtained according to a machine learning method.

Alternatively, the controller unit 102 may configure the preset precision Tr according to a learning rate and batchsize (a count of samples during batch processing).

Furthermore, if a parameter-sharing layer (e.g., a convolutional layer and a recurrent neural network layer) exists in the neural network, the controller unit 102 may configure the preset precision $T_r$ according to a count of neurons in a previous layer, batchsize, and a learning rate. In other words, the larger the count of neurons in the previous layer, the batchsize, and the learning rate are, the larger the preset precision $T_r$ is.

Specifically, after the controller unit 102 obtains the input neuron precision $S_{x(l)}$, the weight precision $S_{w(l)}$, and the output neuron gradient precision $S\nabla_{x(l)}$, the controller unit 102 may perform computations on the input neuron precision $S_{x(l)}$, the weight precision $S_{w(l)}$, and the output neuron gradient precision $S\nabla_{x(l)}$ according to a first preset formula to obtain the gradient update precision T, where the first preset formula may be $T=S_{x(l)}+S\nabla_{x(l)}-S_{w(l)}$.

The controller unit 102 may adjust the input neuron precision $S_{x(l)}$, the weight precision $S_{w(l)}$, and the output neuron gradient precision $S\nabla_{x(l)}$, which may include that:

the controller unit 102 may keep the input neuron precision $S_{x(l)}$ and the weight precision $S_{w(l)}$, unchanged, and decrease the output neuron gradient precision $S\nabla_{x(l)}$.

It should be noted that regarding the output neuron gradient precision $S\nabla_{x(l)}=2^{-s1}$, decreasing the output neuron gradient precision $S\nabla_{x(l)}$ by the controller unit 102 refers to increasing the bit width of the decimal part s1 of the fixed point data format representing the output neuron gradient.

Alternatively, the controller unit 102 may increase the bit width of the decimal part s1 of the fixed point data format representing the weight according to a value of $T_r$-T and a first preset stride N1.

Specifically, regarding the bit width of the decimal part s1 of the fixed point data format representing the output neuron gradient, the controller unit 102 may increase s1 by N1 bits each time, which means the bit width of the decimal part is s1+N1, and may obtain the output neuron gradient precision $S\nabla_{x(l)}=2^{-(s1+N1)}$, then the controller unit 102 may determine whether the absolute value of the difference between the gradient update precision T and the preset precision Tr becomes smaller according to the preset formula $T=S_{x(l)}+S\nabla_{x(l)}-S_{w(l)}$; when the controller unit 102 determines the absolute value of the difference between the gradient update precision T and the preset precision Tr becomes smaller, the controller unit 102 may continue to increase the bit width of the decimal part of the fixed point data format representing the output neuron gradient by N1, which means the bit width is s1+2*N1, and obtain output neuron gradient precision $S\nabla_{x(l)}=2^{(s1+2*N1)}$, then continue to determine whether the absolute value of the difference between the gradient update precision T and the preset precision $T_r$ becomes smaller; if the absolute value becomes smaller, the controller unit may continue to perform processing by following the method above; if in a $n^{th}$ time of processing, the absolute value of the difference between the gradient update precision T and the preset precision Tr becomes bigger, the controller unit 102 may use the bit width obtained in a n-1$^{th}$ time of processing, which is s1+(n-1)*N1, as the bit width of the decimal part of the fixed point data format representing the output neuron gradient. After the bit width of the decimal part is increased, the output neuron gradient precision is $S\nabla_{x(l)}=2^{-(s1+(n-1)*N1)}$.

Alternatively, the first preset stride N1 may be 1, 2, 4, 6, 7, 8, or another positive integer. Alternatively, the controller unit 102 may increase the bit width of the decimal part of the fixed point data format representing the output neuron gradient with an increment of 2 times.

For instance, the bit width of the decimal part of the fixed point data format representing the output neuron gradient is 3, which means the precision of the weight is $2^{-3}$. After the bit width of the decimal part of the fixed point data format representing the output neuron gradient is increased with an increment of 2 times, the bit width becomes 6, which means the decreased output neuron gradient precision is $2^{-6}$.

In a viable example, after the controller unit 102 determines to increase the bit width of the decimal part of the fixed point data format representing the output neuron gradient by a range b, the controller unit 102 may increase the bit width of the decimal part of the fixed point format in a plurality of times, for instance, the controller unit 102 may increase the bit width of the decimal part of the fixed point data format in two times, where in a first time the bit width may be increased by a range b1, in a second time the bit width may be increased by a range b2, and b=b1+b2.

B1 and b2 may be the same or different.

Alternatively, when the controller unit 102 decreases the output neuron gradient precision $S\nabla_{x(l)}$, the controller unit may increase the bit width of the fixed point data format representing the output neuron gradient.

Furthermore, the increase of the output neuron gradient precision $S\nabla_{x(l)}$ is realized by increasing the bit width of the decimal part of the fixed point data format of the output neuron gradient, and since the bit width of the fixed point data format representing the output neuron gradient stays the same, if the bit width of the decimal part is increased, the integer part is decreased, then the data range represented by the fixed point data format becomes smaller. In this case, after the controller unit 102 decreases the output neuron gradient precision $S\nabla_{x(l)}$, the controller unit 102 may increase the bit width of the fixed point data format, and after the bit width of the fixed point data format is increased, the bit width of the integer part stays the same, in other words, the increase of the integer part is the same as the increase of the decimal part.

For instance, the bit width of the fixed point data format is 9, in which the bit width of the sign bit is 1, the bit width of the integer part is 5, and the bit width of the decimal part is 3. After the controller unit 102 increases the bit width of the decimal part and the bit width of the integer part, the bit width of the decimal part becomes 6, and the bit width of the integer part becomes 5. After the bit width of the decimal part is increased, the bit width of the integer part stays the same.

In a viable example, after the controller unit 102 decreases the output neuron gradient precision $S\nabla_{x(l)}$, the controller unit 102 is further configured to:

determining whether the output neuron gradient overflows when the output neuron gradient is represented by the fixed point data format; and if overflows, increase the bit width of the fixed point data format representing the output neuron gradient.

Specifically, it can be known from the description above that when the controller unit 102 decreases the output neuron gradient precision $S\nabla_{x(l)}$, the representable data range of the fixed point data format representing the output neuron gradient may become smaller. In this case, after the controller unit 102 decreases the output neuron gradient precision $S\nabla_{x(l)}$, a determination of whether the output neuron gradient outflows when being represented by the fixed point data format needs to be made. When it is determined that the output neuron gradient outflows, the controller unit 102 may increase the bit width of the fixed point data format, so that the representable data range of the fixed point data format may be expanded, which can ensure that the output neuron gradient does not outflow when being represented by the fixed point data format.

Note that, increasing the bit width of the fixed point data format by the controller unit 102 is increasing the bit width of the integer part of the fixed point data format.

Furthermore, increasing the bit width of the fixed point data format representing the output neuron gradient by the controller unit 102 may include:

increasing, by the controller unit 102, the bit width of the fixed point data format representing the output neuron gradient according to a second preset stride N2, where, the second preset stride N2 may be 1, 2, 3, 4, 5, 7, 8, or another positive integer.

Specifically, when it is determined to increase the bit width of the fixed point data format, the controller unit 102 may increase the bit width of the fixed point data format by the second preset stride N2 each time.

In a viable example, increasing the bit width of the fixed point data format representing the output neuron gradient by the controller unit 102 may include:

increasing, by the controller unit, the bit width of the fixed point data format representing the output neuron gradient with an increment of 2 times.

For instance, the bit width of the fixed point data format without the sign bit is 8. After the bit width of the fixed point data format is increased with an increment of 2 times, the bit width of the fixed point data format without the sign bit is 16; after the bit width of the fixed point data format is increased again with an increment of 2 times, the bit width of the fixed point data format without the sign bit is 32.

In a viable example, adjusting the input neuron precision $S_{x(l)}$, the weight precision $S_{w(l)}$, and the output neuron gradient precision $S\nabla_{x(l)}$ by the controller unit 102 may include:

decreasing, by the controller unit 102, the input neuron precision $S_{x(l)}$ and/or the output neuron gradient precision $S\nabla_{x(l)}$, and keeping the weight precision $S_{w(l)}$ unchanged; or decreasing, by the controller unit 102, the input neuron precision $S_{x(l)}$, increasing the output neuron gradient precision $S\nabla_{x(l)}$, and keeping the weight precision $S_{w(l)}$ unchanged, where the decrease of the input neuron precision $S_{x(l)}$ is greater than the increase of the output neuron gradient precision $S\nabla_{x(l)}$; or increasing, by the controller unit 102, the output neuron gradient precision $S_{x(l)}$ decreasing the input neuron precision $S_{x(l)}$ and keeping the weight precision $S_{w(l)}$ unchanged, where the increase of the output neuron gradient precision $S_{x(l)}$ is smaller than the decrease of the input neuron precision $S_{x(l)}$; or increasing or decreasing, by the controller unit 102, one or any combination of the input neuron precision $S_{x(l)}$ the weight precision $S_{x(l)}$, and the output neuron gradient precision $S\nabla_{x(l)}$, to minimize an absolute value of a difference between the gradient update precision T and the preset precision $T_r$.

It should be explained that a specific process of increasing any of the weight precision $S_{w(l)}$, the input neuron precision $S_{x(l)}$, and the output neuron gradient precision $S\nabla_{x(l)}$ by the controller unit 102, may be seen in the process of increasing the weight precision $S_{w(l)}$, the input neuron precision $S_{x(l)}$, and output neuron gradient precision $S\nabla_{x(l)}$ by the controller unit 102, and is thus omitted here.

After the input neuron precision $S_{x(l)}$, the weight precision $S_{w(l)}$, and the output neuron gradient precision $S\nabla_{x(l)}$ are adjusted according to the method above, during a computation process, the operating unit 103 may represent the input neuron, the weight, and the output neuron gradient of the $L^{th}$ layer by the fixed point data format according to adjusted input neuron precision $S_{x(l)}$, weight precision $S_{w(l)}$, and output neuron gradient precision $S\nabla_{x(l)}$, and perform subsequent computations.

It should be explained that a frequency of computing the gradient update precision T by the controller unit 102 may be flexibly set according to needs.

The controller unit 102 may adjust the frequency of computing the gradient update precision T according to a count of training iterations in a neural network training process.

Alternatively, in a neural network training process, the controller unit 102 may recompute the gradient update precision T after each iteration, or recompute the gradient update precision T after a preset count of iterations, or set the frequency according to the change of the gradient update precision T.

Alternatively, the controller unit 102 may set the frequency of computing the gradient update precision T according to a count of training iterations in neural network training.

The operating unit 103 is configured to represent an input neuron and a weight of the $L^{th}$ layer according to increased or decreased input neuron precision $S_{x(l)}$ and the weight precision $S_{w(l)}$, and represent an output neuron gradient of the $L^{th}$ layer obtained from computations according to increased or decreased output neuron gradient precision $S\nabla_{x(l)}$.

In other words, the operating unit 103 is configured to increase or decrease the fixed point data format of the input neuron precision $S_{x(l)}$ to represent an input neuron of the $L^{th}$ layer, increase or decrease the fixed point data format of the weight precision $S_{x(l)}$ to represent a weight of the $L^{th}$ layer, and increase or decrease the fixed point data format of the output neuron gradient precision $S\nabla_{x(l)}$ represent an output neuron gradient of the $L^{th}$ layer, so that subsequent computations can be performed.

By dynamically adjusting (including increasing or decreasing) the input neuron precision $S_{x(l)}$, the weight precision $S_{w(l)}$, and the output neuron gradient precision $S\nabla_{x(l)}$ during neural network operations, precision redundancy may be reduced, computational overhead may be cut down, and wasting of computing resources may be avoided while computation demands are met.

In a viable example, the controller unit 102 may obtain the output neuron gradient of the $L^{th}$ layer of the multi-layer neural network.

In a viable example, the controller unit 102 may obtain an output neuron of the $L^{th}$ layer and an output neuron of an $L-1^{th}$ layer, and obtain the output neuron gradient of the $L^{th}$ layer according to the output neuron of the $L^{th}$ layer and the output neuron of the $L-1^{th}$ layer.

The controller unit 102 may obtain proportion data a of an output neuron gradient whose absolute value is smaller than a first preset threshold in the output neuron gradient.

Alternatively, the first preset threshold may be 0, 0.01, 0.05, 0.1, 0.12, 0.05, or another value. Specifically, after the controller unit 102 obtains the output neuron gradient of the $L^{th}$ layer, the controller unit 102 may obtain n1 which is a count of gradients whose absolute values are smaller than the first preset threshold in output neuron gradients of the $L^{th}$ layer, and obtain the proportion data a which is a=n1/n2 according to n1 and n2 which is a count of output neuron gradients of the $L^{th}$ layer.

Alternatively, the proportion data may be 50%, 60%, 65%, 70%, 80%, 85%, 90%, or another value.

Alternatively, the proportion data is 80%.

When the proportion data a is greater than a second preset threshold, the controller unit 102 may decrease the output neuron gradient precision $S\nabla_{x(l)}$ of the $L^{th}$ layer.

In a viable example, when the controller unit 102 decreases the output neuron gradient precision $S_{x(l)}$ of the $L^{th}$ layer, the controller unit 102 may increase the bit width of the fixed point data format representing the output neuron gradient of the $L^{th}$ layer.

In a viable example, after the controller unit 102 decreases the output neuron gradient precision $S\nabla_{x(l)}$ of the $L^{th}$ layer, the controller unit 102 is further configured to:

determine whether the output neuron gradient of the $L^{th}$ layer overflows when the output neuron gradient is represented by the fixed point data format; and if overflows, increase the bit width of the fixed point data format representing the output neuron gradient of the $L^{th}$ layer.

In a viable example, increasing the bit width of the fixed point data format representing the output neuron gradient of the $L^{th}$ layer by the controller unit 102 may include that:

the controller unit 102 may increase the bit width of the fixed point data format representing the output neuron gradient of the $L^{th}$ layer according to a third preset stride N3.

In a viable example, increasing the bit width of the fixed point data format representing the output neuron gradient of the $L^{th}$ layer by the controller unit 102 may include:

the controller unit may increase the bit width of the fixed point data format representing the out put neuron gradient of the $L^{th}$ layer with an increment of 2 times.

It should be explained that a process of decreasing the output neuron gradient precision $S\nabla_{x(l)}$ by the controller unit 102 may be seen in related description above, and thus is omitted here.

After the output neuron gradient precision $S\nabla_{x(l)}$ is adjusted according to the method above, during a computation process, the operating unit 103 may represent the output neuron gradient of the $L^{th}$ layer in the fixed point data format according to the adjusted output neuron gradient precision $S\nabla_{x(l)}$, and perform subsequent computations.

By adjusting the output neuron precision according to the output neuron gradient during the neural network operation process, the error in the output neuron may be reduced, thereby ensuring that training can be performed normally.

Referring to FIG. 1C, FIG. 1C is a flow chart of a neural network operation method according to an example of the present disclosure. As shown in FIG. 1C, the method may include:

S201, obtaining, by a neural network operation module, input neuron precision, weight precision, and output neuron gradient precision of an $L^{th}$ layer of a neural network.

Values of the input neuron precision $S_{x(l)}$, the weight precision $S_{w(l)}$, and the output neuron gradient precision $S\nabla_{x(l)}$ may be the same, or some of them may be the same, or any couple of them may be different.

The neural network may be a multi-layer neural network, the input neuron precision $S_{x(l)}$, the weight precision $S_{w(l)}$, and the output neuron gradient precision $S\nabla_{x(l)}$ of the $L^{th}$ layer may be input neuron precision, weight precision, and output neuron gradient precision of any layer of the multi-layer neural network.

In a viable example, the neural network operation module may obtain an input neuron, a weight, and an output neuron of the $L^{th}$ layer, and may obtain the input neuron precision $S_{x(l)}$, the weight precision $S_{w(l)}$, and the output neuron gradient precision $S\nabla_{x(l)}$ of the $L^{th}$ layer according to the input neuron, the weight, and the output neuron of the $L^{th}$ layer.

The method may also include: S202, obtaining, by the neural network operation module, gradient update precision T by performing computations according to the input neuron precision, the weight precision, and the output neuron gradient precision of the $L^{th}$ layer.

Specifically, the neural network operation module may perform computations on the input neuron precision $S_{x(l)}$, the weight precision $S_{w(l)}$, and the output neuron gradient precision $S\nabla_{x(l)}$ according to a preset formula, to obtain the gradient update precision T, where the first preset formula may be $T=S_{x(l)}+S\nabla_{x(l)}-S_{w(l)}$.

The method may also include: S203, when the gradient update precision T is greater than preset precision $T_r$, adjusting, by the neural network operation module, the input neuron precision, the weight precision, and the output neuron gradient of the $L^{th}$ layer to minimize an absolute value of a difference between the gradient update precision T and the preset precision $T_r$.

A bit width of a fixed point data format representing the input neuron and a bit width of a fixed point data format representing the weight are a first bit width, and a bit width of a fixed point data format representing the output neuron gradient is a second bit width.

Alternatively, the second bit width may be larger than the first bit width.

Further, the second bit width may be twice the amount of the first bit width for an electronic computer to process.

Still further, the first bit width may be 8 bits, and the second bit width may be 16 bits. The preset precision $T_r$ may be set according to experience in advance. According to a second preset formula, $T_r$ that matches input parameters may also be obtained by changing input parameters. $T_r$ may further be obtained according to a machine learning method.

Alternatively, the neural network operation module may configure the preset precision $T_r$ according to a learning rate and batchsize (a count of samples during batch processing).

Furthermore, if a parameter-sharing layer (e.g., a convolutional layer and a recurrent neural network layer) exists in the neural network, the preset precision $T_r$ may be set according to a count of neurons in a previous layer, batchsize, and a learning rate. In other words, the larger the count of neurons in the previous layer, the batchsize, and the learning rate are, the larger the preset precision $T_r$ is.

Adjusting the input neuron precision $S_{x(l)}$, the weight precision $S_{w(l)}$, and the output neuron gradient precision $S\nabla_{x(l)}$ by the neural network operation module may include:

keeping the input neuron precision $S_{x(l)}$ and the weight precision $S_{w(l)}$ unchanged, and increasing the output neuron gradient precision $S\nabla_{x(l)}$.

It should be noted that decreasing the output neuron gradient precision $S\nabla_{x(l)}$ by the neural network operation module refers to increasing a bit width of a decimal part s1 of the fixed point data format of the output neuron gradient.

Alternatively, the neural network operation module may increase the bit width of the decimal part s1 of the fixed point data format representing the output neuron gradient according to a value of Tr-T and a first preset stride N1.

Specifically, regarding the bit width of the decimal part s1 of the fixed point data format of the output neuron gradient, the neural network operation module may increase s1 by N1 each time, which means the bit width of the decimal part is s1+N1, and may obtain the output neuron gradient precision $S\nabla_{x(l)}=2^{-(s1+N1)}$, then the neural network operation module may determine whether the absolute value of the difference between the gradient update precision T and the preset precision Tr becomes smaller according to the preset formula $T=S_{x(l)}+S\nabla_{x(l)}-S_{w(l)}$; when the neural network operation module determines the absolute value of the difference between the gradient update precision T and the preset precision Tr becomes smaller, the neural network operation module may continue to increase the bit width of the decimal part of the fixed point data format representing the output neuron gradient by N1, which means the bit width is s1+2*N1, and obtain output neuron gradient precision $S\nabla_{x(l)}=2^{-(s1+2*N1)}$, then continue to determine whether the absolute value of the difference between the gradient update precision T and the preset precision Tr becomes smaller; if the absolute value becomes smaller, the neural network operation module may continue to perform processing by following the method above; if in a $n^{th}$ time of processing, the absolute value of the difference between the gradient update precision T and the preset precision Tr becomes bigger, the neural network operation module may use the bit width obtained in an $n-1^{th}$ time of processing, which is s1+(n−1)*N1, as the bit width of the decimal part of the fixed point data format representing the output neuron gradient. After the bit width of the decimal part is decreased, the output neuron gradient precision is $S\nabla_{x(l)}=2^{-(s1+(n-1)*N1)}$.

Alternatively, the first preset stride N1 may be 1, 2, 4, 6, 7, 8, or another positive integer.

Alternatively, the neural network operation module may increase the bit width of the decimal part of the fixed point data format representing the output neuron gradient with an increment of 2 times.

For instance, the bit width of the decimal part of the fixed point data format representing the output neuron gradient is 3, which means the output neuron gradient precision is $2^{-3}$. After the bit width of the decimal part of the fixed point data format representing the output neuron gradient is increased with an increment of 2 times, the bit width becomes 6, which means the decreased output neuron gradient precision is $2^{-6}$.

In a viable example, after the neural network operation module determines to increase the bit width of the decimal part of the fixed point data format representing the output neuron gradient by a range b, the neural network operation module may increase the bit width of the decimal part of the fixed point format in a plurality of times, for instance, the neural network operation module may increase the bit width of the decimal part of the fixed point data format in two times, where in a first time the bit width may be increased by a range b1, in a second time the bit width may be increased by a range b2, and b=b1+b2.

B1 and b2 may be the same or different.

Alternatively, when the neural network operation module decreases the output neuron gradient precision, the neural network operation module may increase the bit width of the fixed point data format representing the weight.

Furthermore, the decrease of the output neuron gradient precision $S_{x(l)}$ is realized by increasing the bit width of the decimal part of the fixed point data format of the weight, and since the bit width of the fixed point data format representing the output neuron gradient stays the same, if the bit width of the decimal part is increased, the integer part is decreased, then the data range represented by the fixed point data format becomes smaller. In this case, after the neural network operation module decreases the output neuron gradient precision $S_{w(l)}$, the neural network operation module may increase the bit width of the fixed point data format, and after the bit width of the fixed point data format is increased, the bit width of the integer part stays the same, in other words, the increase of the integer part is the same as the increase of the decimal part.

For instance, the bit width of the fixed point data format is 9, in which the bit width of the sign bit is 1, the bit width of the integer part is 5, and the bit width of the decimal part is 3. After the neural network operation module increases the bit width of the decimal part and the bit width of the integer part, the bit width of the decimal part becomes 6, and the bit width of the integer part becomes 5. After the bit width of the decimal part is increased, the bit width of the integer part stays the same.

In a viable example, after the neural network operation module decreases the output neuron gradient precision, the neural network operation module is further configured to:

determine whether the output neuron gradient overflows when the output neuron gradient is represented by the fixed point data format; and if overflows, increase the bit width of the fixed point data format representing the output neuron gradient.

Specifically, it can be known from the description above that when the neural network operation module decreases the output neuron gradient precision, the representable data range of the fixed point data format representing the output neuron gradient may become smaller. In this case, after the neural network operation module decreases the output neuron gradient precision, a determination of whether the output neuron gradient outflows when being represented by the fixed point data format needs to be made. When it is determined that the output neuron gradient outflows, the neural network operation module may increase the bit width of the fixed point data format, so that the representable data range of the fixed point data format may be expanded, which can ensure that the output neuron gradient does not outflow when being represented by the fixed point data format.

Note that, increasing the bit width of the fixed point data format by the neural network operation module is increasing the bit width of the integer part of the fixed point data format.

Furthermore, increasing the bit width of the fixed point data format representing the output neuron gradient by the neural network operation module may include:

increasing, by the neural network operation module, the bit width of the fixed point data format representing the output neuron gradient according to a second preset stride N2, where the second preset stride N2 may be 1, 2, 3, 4, 5, 7, 8, or another positive integer.

Specifically, when it is determined to increase the bit width of the fixed point data format, the neural network operation module may increase the bit width of the fixed point data format by the second preset stride N2 each time.

In a viable example, increasing the bit width of the fixed point data format representing the output neuron gradient by the neural network operation module may include:

increasing, by the neural network operation module, the bit width of the fixed point data format representing the output neuron gradient with an increment of 2 times.

For instance, the bit width of the fixed point data format without the sign bit is 8. After the bit width of the fixed point data format is increased with an increment of 2 times, the bit width of the fixed point data format without the sign bit is 16; after the bit width of the fixed point data format is increased again with an increment of 2 times, the bit width of the fixed point data format without the sign bit is 32.

In a viable example, adjusting the input neuron precision $S_{x(l)}$, the weight precision $S_{w(l)}$, and the output neuron gradient precision $S\nabla_{x(l)}$ by the neural network operation module may include:

decreasing the input neuron precision $S_{x(l)}$ and/or the output neuron gradient precision $S\nabla_{x(l)}$, and keeping the weight precision $S_{w(l)}$ unchanged; or decreasing the input neuron precision $S_{x(l)}$, increasing the output neuron gradient precision $S\nabla_{x(l)}$, and keeping the weight precision $S_{w(l)}$ unchanged, where the decrease of the input neuron precision $S_{x(l)}$ is greater than the increase of the output neuron gradient precision $S\nabla_{x(l)}$; or increasing the output neuron gradient precision $S\nabla_{x(l)}$, decreasing the input neuron precision $S_{x(l)}$, and keeping the weight precision $S_{w(l)}$ unchanged, where the increase of the output neuron gradient precision $S\nabla_{x(l)}$ is smaller than the decrease of the input neuron precision $S_{x(l)}$; or increasing or decreasing one or any combination of the input neuron precision $S_{x(l)}$, the weight precision $S_{w(l)}$, and the output neuron gradient precision $S^i\nabla_x$, to minimize an absolute value of a difference between the gradient update precision T and the preset precision $T_r$.

It should be explained that a specific process of increasing any of the weight precision $S_{w(l)}$, the input neuron precision $S_{x(l)}$, and the output neuron gradient precision $S\nabla_{x(l)}$ by the neural network operation module may be seen in the process of increasing the weight precision $S_{w(l)}$, the input neuron precision $S_{x(l)}$, and output neuron gradient precision $S\nabla_{x(l)}$ by the neural network operation module, and is thus omitted here.

The method may further include: S204, representing, by the neural network operation module, an input neuron and a weight of the $L^{th}$ layer according to adjusted input neuron precision and the weight precision; and representing an output neuron gradient of the $L^{th}$ layer obtained from computations according to adjusted output neuron gradient precision for subsequent computations.

In other words, the operating unit is configured to increase or decrease the fixed point data format of the input neuron precision $S_{x(l)}$ to represent an input neuron of the $L^{th}$ layer, increase or decrease the fixed point data format of the weight precision $S_{w(l)}$ to represent a weight of the $L^{th}$ layer, and increase or decrease the fixed point data format of the output neuron gradient precision $S\nabla_{x(l)}$ to represent an output neuron gradient of the $L^{th}$ layer, so that subsequent computations can be performed.

After the input neuron precision $S_{x(l)}$, the weight precision $S_{w(l)}$, and the output neuron gradient precision $S\nabla_{x(l)}$ are adjusted according to the method above, the neural network operation module may recompute the gradient update precision T; when the gradient update precision is no longer larger than the preset precision $T_r$, the neural network operation module may follow the method of the step S203 to decrease the input neuron precision $S_{x(l)}$, the weight precision $S_{w(l)}$, and the output neuron gradient precision $S\nabla_{x(l)}$.

It should be explained that a frequency of computing the gradient update precision T by the neural network operation module may be flexibly set according to needs.

The neural network operation module may adjust the frequency of computing the gradient update precision T according to a count of training iterations in a neural network training process.

Alternatively, in a neural network training process, the neural network operation module may recompute the gradient update precision T after each iteration, or recompute the gradient update precision T after a preset count of iterations, or set the frequency according to the change of the gradient update precision T.

Alternatively, the neural network operation module may set the frequency of computing the gradient update precision T according to a count of training iterations in neural network training.

It can be seen that during a process of neural network operations, the technical scheme provided by the examples of the present disclosure can dynamically adjust the input neuron precision $S_x$, the weight precision $S_w$, and the output neuron gradient precision $S\nabla_x$ so that errors that may occur in a computation result may be reduced, computational overhead may be cut down, and computing resources may be saved while computation demands are met.

Figure 1D:
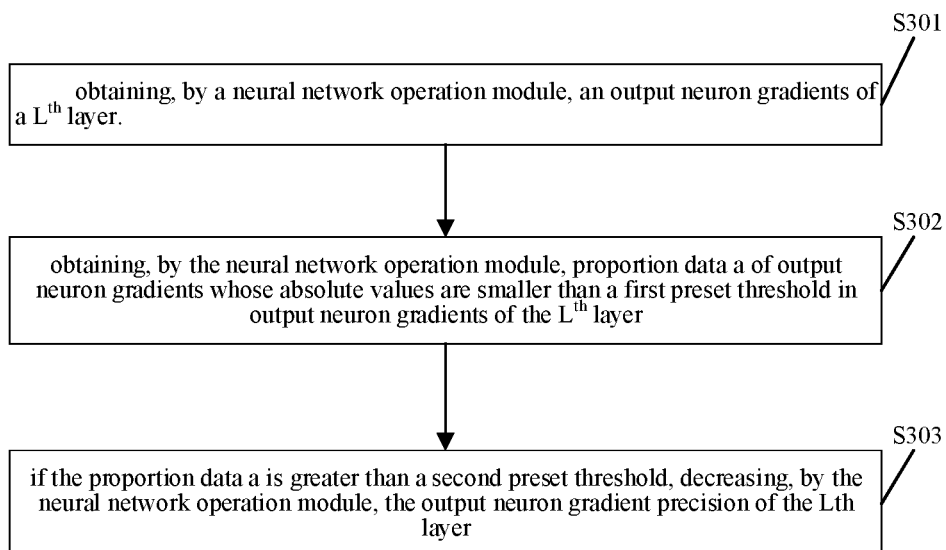
FIG. 1D is a flow chart of another neural network operation method according to an example of the present disclosure.

Referring to FIG. 1D, FIG. 1D is a flow chart of a neural network operation method according to an example of the present disclosure. As shown in FIG. 1D, the method may include:

S301, obtaining, by a neural network operation module, an output neuron gradient of an $L^{th}$ layer.

In a viable example, the neural network operation module may obtain an output neuron of the $L^{th}$ layer and an output neuron of an $L-1^{th}$ layer, and obtain the output neuron gradient of the $L^{th}$ layer according to the output neuron of the $L^{th}$ layer and the output neuron of the $L-1^{th}$ layer.

The method may further include: S302, obtaining, by the neural network operation module, proportion data a of output neuron gradients whose absolute values are smaller than a first preset threshold in output neuron gradients of the $L^{th}$ layer.

Alternatively, the first preset threshold may be 0, 0.01, 0.05, 0.1, 0.12, 0.05, or another value. Specifically, after the neural network operation module obtains the output neuron gradient of the $L^{th}$ layer, the neural network operation module may obtain n1 which is a count of gradients whose absolute values are smaller than the first preset threshold in output neuron gradients of the $L^{th}$ layer, and obtain the proportion data a which is a=n1/n2 according to n1 and n2 which is a count of output neuron gradients of the $L^{th}$ layer.

Alternatively, the proportion data may be 50%, 60%, 65%, 70%, 80%, 85%, 90%, or another value.

Alternatively, the proportion data is 80%.

S303, if the proportion data a is greater than a second preset threshold, decreasing, by the neural network operation module, the output neuron gradient precision of the $L^{th}$ layer.

In a viable example, when the neural network operation module decreases the output neuron gradient precision $S\nabla_{x(l)}$ of the $L^{th}$ layer, the neural network operation module may increase the bit width of the fixed point data format representing the output neuron gradient of the $L^{th}$ layer.

In a viable example, after the neural network operation module decreases the output neuron gradient precision $S\nabla_{x(l)}$ of the $L^{th}$ layer, the neural network operation module is further configured to:

determine whether the output neuron gradient of the $L^{th}$ layer overflows when the output neuron gradient is represented by the fixed point data format; and if overflows, increase the bit width of the fixed point data format representing the output neuron gradient of the $L^{th}$ layer.

In a viable example, increasing the bit width of the fixed point data format representing the output neuron gradient of the $L^{th}$ layer by the neural network operation module may include:

increasing the bit width of the fixed point data format representing the output neuron gradient of the $L^{th}$ layer according to a third preset stride N3.

In a viable example, increasing the bit width of the fixed point data format representing the output neuron gradient of the $L^{th}$ layer by the neural network operation module may include:

increasing the bit width of the fixed point data format representing the output neuron gradient of the $L^{th}$ layer with an increment of 2 times.

It should be explained that a process of decreasing the output neuron gradient precision $S\nabla_{x(l)}$ by the neural network operation module may be seen in related description above, and thus is omitted here.

After the output neuron gradient precision $S\nabla_{x(l)}$ is adjusted according to the method above, during a computation process, the neural network operation module may represent the output neuron gradient of the $L^{th}$ layer in the fixed point data format according to the adjusted output neuron gradient precision $S\nabla_{x(l)}$, and perform subsequent computations.

In can be seen that the technical solution provided by the examples of the present disclosure can adjust the output neuron precision according to the output neuron gradient during the neural network operation process, so that the error that may occur in the output neuron may be reduced, thereby ensuring that training can be performed normally.

Neural networks are also referred to as artificial neural networks. Artificial neural networks are widely used in the field of pattern recognition, image processing, function approximation, optimization computation and the like. Multi-layer artificial networks have drawn the attention of academia and industrial communities in recent years due to high recognition accuracy and good parallelism. Artificial neural networks involve a variety of algorithms. The fully connected layer is an important algorithm in artificial neural networks and is widely used in various artificial neural network models.

The existing neural network operations are performed based on general-purpose processors. The existing general-purpose processors only support the computation of floating-point data. However, the neural network operations often involve relatively complicated operations, so the amount of operations is large. A high requirement is also imposed on the memory. The existing neural network operations are based on floating-point data, and have high memory requirements. Therefore, the existing schemes may have high energy consumption and large cost.

An electronic device may include a device with wireless communication capabilities such as a handheld device, an on-board device for vehicles, a wireless headset, a computing device, or another processing device connected to the wireless modem, as well as various forms of user equipment (UE), mobile stations (MS), terminal device, etc. The electronic device may be a smart phone, a tablet, a headset, or the like. For convenience of description, the above-mentioned devices are referred to as electronic devices or electronic apparatus.

The electronic devices or electronic apparatus may be applied in the following scenarios which include but not limited to: a data processing device, a robot, a computer, a printer, a scanner, a phone, a tablet, a smart terminal, a mobile phone, a traffic recorder, a navigator, a sensor, a webcam, a cloud server, a camera, a video camera, a projector, a watch, a headset, a mobile storage, a wearable device, and various electronic products. The scenarios may further include: an aircraft, a ship, a vehicle, and various transportation means; a TV, an air conditioner, a microwave oven, a refrigerator, a rice cooker, a humidifier, a washing machine, an electric light, a gas stove, a range hood, and various household appliances; and various types of medical equipment such as nuclear magnetic resonance apparatus, B-ultrasound device, and an electrocardiograph.

Below is a detailed explanation of an example of the present disclosure.

Figure 4:
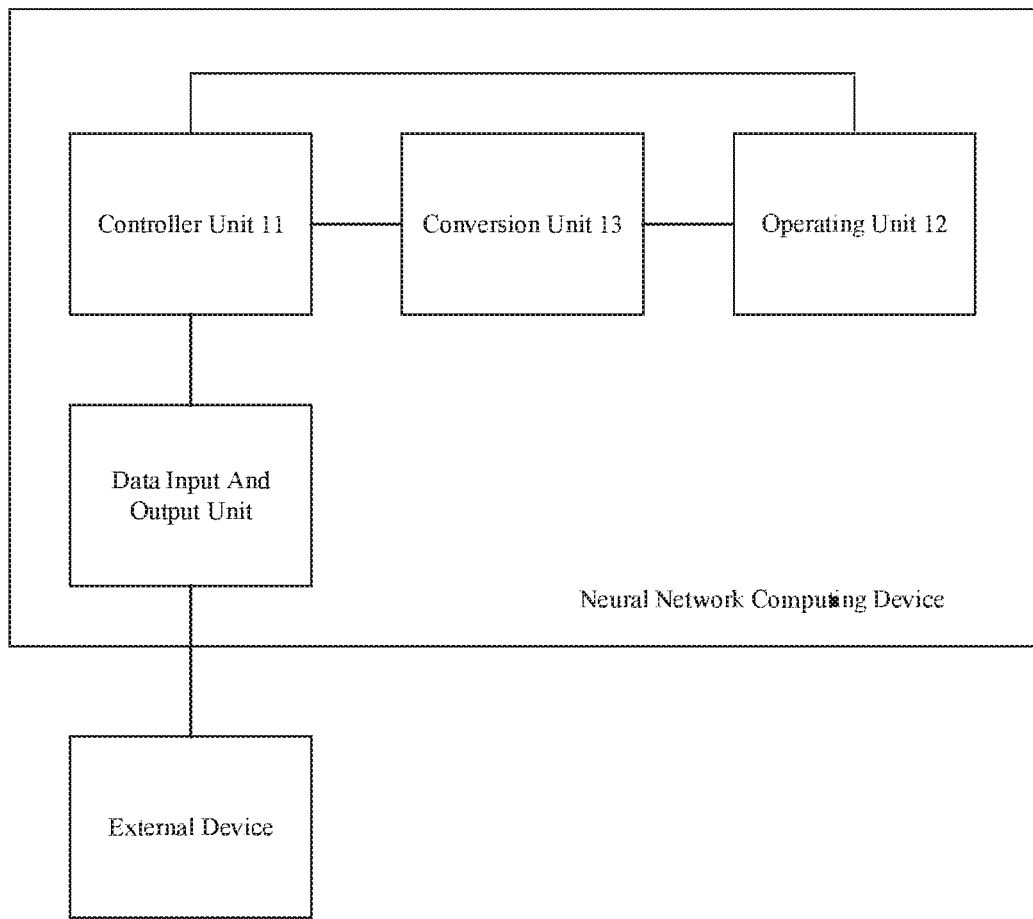
FIG. 4 illustrates an overall structure of a neural network operation device according to an example of the present disclosure.

First, a computing device used in the present disclosure will be introduced. Referring to FIG. 4, a neural network operation device is provided. The operation device is configured to perform neural network training operations. The neural network training operations may include neural network multi-layer training operations. The multi-layer training operations may include an $i^{th}$ layer, where at least some data of a forward computation or back computation of the $i^{th}$ layer are for fixed point data computations, and i is an integer greater than or equal to 1. The operation device may include: a controller unit 11, an operating unit 12, and a conversion unit 13, where the controller unit 11 is connected to the operating unit 12 and to the conversion unit 13 (the conversion unit may be set independently, or can be integrated into the controller unit or the operating unit); the training operations of the $i^{th}$ layer may include the forward computation and the back computation of the $i^{th}$ layer.

The forward computation of the $i^{th}$ layer may include:

a controller unit 11 configured to obtain input neuron data of the $i^{th}$ layer, weight data of the $i^{th}$ layer, a forward computation instruction of the $i^{th}$ layer; in an alternative example, the controller unit may obtain the input neuron data and the computation instruction via a data input and output unit, where the data input and output unit may be an I/O interface or I/O lead of one or a plurality of data; and the data input and output unit configured to read input neuron data or the forward computation instruction from an external device or an external memory.

The forward computation instruction may include but not limited to: a convolution operation instruction, a matrix multiplication instruction, a vector multiplication instruction, an activation instruction, etc. Examples of the present disclosure do not restrict a specific representation or a specific type of the forward computation instruction.

The controller unit 11 is further configured to parse the forward computation instruction of the $i^{th}$ layer to obtain a plurality of forward operation instructions, send the input neuron data of the $i^{th}$ layer and the weight data of the $i^{th}$ layer to the conversion unit 13, and send the plurality of forward operation instructions to the computing unit 12.

The conversion unit 13 is configured to perform floating point and fixed point conversion on all or some of the input neuron data of the $i^{th}$ layer and the weight data of the $i^{th}$ layer to obtain all fixed point data or mixed data, and send the all fixed point data or the mixed data to the computing unit, where the mixed data may include: some fixed point data and some floating point data.

The computing unit 12 is configured to perform fixed point computations on the all fixed point data or perform mixed computations on the mixed data according to the plurality of forward operation instructions, to obtain a forward output result of the $i^{th}$ layer.

The back computation of the $i^{th}$ layer may include that:

the controller unit 11 is configured to obtain input neuron data of the $i^{th}$ layer, weight data of the $i^{th}$ layer, an input neuron gradient of the $i^{th}$ layer, and a forward computation instruction of the $i^{th}$ layer; in an alternative example, the controller unit may obtain the input neuron data and the computation instruction via the data input and output unit, where the data input and output unit may be an I/O interface or I/O lead of one or a plurality of data; and the data input and output unit is configured to read input neuron data or a back computation instruction from an external device or an external memory.

The back computation instruction may include but not limited to: a matrix multiplication instruction, or a vector multiplication instruction, or the like. Examples of the present disclosure do not restrict a specific representation or a specific type of the back computation instruction.

The controller unit is further configured to parse the computation instruction of the $i^{th}$ layer to obtain a plurality of back operation instructions, send the input neuron data of the $i^{th}$ layer, the weight data of the $i^{th}$ layer, and the input neuron gradient of the $i^{th}$ layer to the conversion unit 13, and send the plurality of back operation instructions to the computing unit 12.

The conversion unit is further configured to perform floating point and fixed point conversion on all or some of the input neuron data of the $i^{th}$ layer, the weight data of the $i^{th}$ layer, and the input neuron gradient of the $i^{th}$ layer to obtain all fixed point data or mixed data, and send the all fixed point data and the mixed data to the computing unit, where the mixed data may include: some fixed point data and some floating point data.

The computing unit 12 is further configured to perform fixed point computations on the all fixed point data or perform mixed computations on the mixed data according to the plurality of back operation instructions, to obtain a weight gradient of the $i^{th}$ layer and an output result gradient of the $i^{th}$ layer. The computing unit may use the weight gradient of the $i^{th}$ layer to update the weight of the $i^{th}$ layer.

The mixed computations may include: fixed point computations performed on some fixed point data and floating point computations performed on some floating point data.

A conversion unit is included in the technical solution provided by the present disclosure includes. When performing the training operations of the $i^{th}$ layer, the conversion unit is capable of converting some or all of the input neuron data, weight data, and the input neuron gradient into fixed point data or mixed data. Compared with floating point data, the fixed point data require less storage space. In this way, the training of a neural network can be realized with a small amount of memory space. Therefore, the computing device provided by the present disclosure can reduce the memory capacity and reduce the cost. In addition, at least some fixed-point data exist in the training operation of the $i^{th}$ layer of the technical solution provided by the present disclosure. Compared with floating point computations, the technical solution provided by the present disclosure has the technical effect of reducing computations and having a fast computational speed.

The training operations of the neural network training may be the training operations of a layer of the neural network, which is the training operations of the $i^{th}$ layer. Other common training operation methods may be used for training operations of other layers. A method similar to the training operation method of the $i^{th}$ layer provided by the present disclosure may also be used. For a multi-layer neural network, a process for implementing the training operation method may be: in a forward computation, after the forward computation of an upper layer of an artificial neural network is completed, the computing device may use an output neuron (which is a forward output result) obtained by the operating unit from computations as input neuron of a next layer for performing computations (or some operations may be performed on the output neuron, then use the output neuron may be used as input neuron of the next layer). The some operations may include but not limited to activation operations and the like. At the same time, the computing device may replace the weight of the upper layer with the weight of the next layer. In a back computation, after the back computation of a next layer of the artificial neural network is completed, the computing device may use the output neuron gradient (which is the output result gradient) obtained by the operating unit as the input neuron gradient of an upper layer to perform computations (or perform some operations on the output neuron gradient, then use the output neuron gradient as input neuron gradient of the upper layer), at the same time, the computing device may replace the weight and the input neuron data with the weight and the input neuron data of a forward computation of the upper layer.

For artificial neural network operations, if the artificial neural network operations have multi-layer operations, the input neuron and the output neuron of the multi-layer operations do not refer to neurons of input layers and neurons of output layers of the whole neural network. Instead, for any two adjacent layers of the network, neurons that are in lower layers of forward computations of the network are referred to as input neurons, and neurons that are in upper layers of forward computations of the network are referred to as output neurons. Taking a convolutional neural network as an instance, it is assumed that a convolutional neural network has L layers, and K=1, 2, . . . , L−1. For a K-th layer and a K+1-th layer, the K-th layer is referred to as an input layer, neurons in the K-th layer are the input neurons, the K+1-th layer is referred to as an output layer, neurons in the K+1-th layer are the output neurons. In other words, except a top layer, every layer can be an input layer, and a lower layer of it can be a corresponding output layer.

Alternatively, the conversion unit 13 is configured to convert some of the input neuron data of the $i^{th}$ layer to some fixed point input neuron data and convert some of the weight data of the $i^{th}$ layer into some fixed point weight data, send the some fixed point input neuron data and the some fixed point weight data to the operating unit, and send some input neuron data (the remaining floating point data that have not been subjected to floating point and fixed point conversion) and some weight data (the remaining floating point data that have not been subjected to floating point and fixed point conversion) to the operating unit.

The operating unit is configured to perform fixed point data computations on the fixed point input neuron data and the fixed point weight data to obtain some fixed point forward output results, and send the some fixed point forward output results to the conversion unit.

The conversion unit is configured to perform fixed point and floating point conversion on the some fixed point forward output results to obtain a first set of some floating point forward operation results, and send the first set of some floating point forward operation results to the operating unit.

The operating unit is configured to perform computations (floating point computations) on the some input neuron data and some weight data to obtain a second set of some floating point forward operation results, and combine the first set of some floating point forward operation results and the second set of some floating point forward operation results to obtain forward output results of the $i^{th}$ layer.

Alternatively, the conversion unit 13 is configured to convert some of the input neuron data of the $i^{th}$ layer to some fixed point input neuron data, convert some of the weight data of the $i^{th}$ layer into some fixed point weight data, and convert input neuron gradients of the $i^{th}$ layer to some fixed point input neuron gradients, send the some fixed point input neuron data, the some fixed point input neuron gradients, and the some fixed point weight data to the operating unit, and send some input neuron data (the remaining floating point data that have not been subjected to floating point and fixed point conversion), some input neuron gradients, and some weight data (the remaining floating point data that have not been subjected to floating point and fixed point conversion) to the operating unit.

The operating unit is configured to perform fixed point data computations on the some fixed point input neuron gradients and the some fixed point input data to obtain some weight gradients of the $i^{th}$ layer, performs fixed point data computations on the some fixed point input neuron gradients and the some fixed point weight data to obtain some output result gradients of the $i^{th}$ layer, and sends the some weight gradients of $i^{th}$ layer and the some output result gradients of $i^{th}$ layer to the conversion unit.

The conversion unit is configured to perform fixed point and floating point conversion on the some weight gradients of the $i^{th}$ layer and the some output result gradients of the $i^{th}$ layer to obtain a first set of some weight gradients of the $i^{th}$ layer and a first set of some output result gradients of the $i^{th}$ layer, and send the first set of some weight gradients of the $i^{th}$ layer and the first set of some output result gradients of the $i^{th}$ layer to the operating unit.

The operating unit is configured to perform computations (floating point) on the some input neuron gradients and the some input data to obtain a second set of some weight gradients of the $i^{th}$ layer, perform computations on the some input neuron gradients and the some weight data to obtain a second set of some output result gradients of the $i^{th}$ layer, combine the first set of some weight gradients of the $i^{th}$ layer and the second set of some weight gradients of the $i^{th}$ layer to obtain weight gradients of the $i^{th}$ layer, and combine the first set of some output result gradients of the $i^{th}$ layer and the second set of some output result gradients of the $i^{th}$ layer to obtain output result gradients of the $i^{th}$ layer.

Alternatively, the conversion unit 13 is configured to determine the point of a floating point number, where point=$\lceil (\log_2(\text{max abs})-\text{width}+2) \rceil$ the width refers to bit width of a fixed point number.

The maxabs is a largest absolute value in floating point data that need to be converted, which in other words, refers to a largest absolute value in the elements of the input neuron data of the $i^{th}$ layer and the weight data of the $i^{th}$ layer. In this way, a largest value that can be represented by a fixed point number is greater than a smallest point (the position of point) value of the maxabs.

For the known point and width, the floating point number and the floating point number:

$$\text{int} = \begin{cases} -2^{width-1}, & \text{if float} < -2^{width+point-1} \\ \text{round}(\text{float}/2^{point}), & \text{if } -2^{width+point-1} \leq \text{float} \leq (2^{point-1}-1)*2^{point} \\ 2^{width-1}-1, & \text{if float} > (2^{width-1}-1)*2^{point} \end{cases}$$

Round represent rounding by 4/5, and float=int*2point

Int is a fixed point value, float is a floating point value, and point is the bit of a fixed point decimal point.

For instance, width=8, maxabs (a largest value of an absolute value of a group of numbers)=2.9, then for the group of numbers, point=−4. If point=−4, when float=1.3, it can be reckoned that int=21. Alternatively, the method of obtaining an input neuron gradient of the $i^{th}$ layer may include:

the input neuron gradient of the $i^{th}$ layer=f'*the output result gradient of the $i+1^{th}$ layer, and f' is a derived function of an activation function f.

Alternatively, referring to FIG. 3B, the operating unit may include a primary processing circuit 3101 and a plurality of secondary processing circuits 3102, where the primary processing circuit 3101 is configured to perform preprocessing on data (include one or any combination of input neuron data, weight data, and input neuron gradients, in which the data can be fixed point or floating point) and transfer data and operation instructions to the plurality of secondary processing circuits.

The plurality of secondary processing circuits 3102 are configured to perform intermediate computations in parallel according to data (can be fixed point data or floating point data) and operation instructions transferred from the primary processing circuit to obtain a plurality of intermediate results, and transfer the plurality of intermediate results to the primary processing circuit.

The primary processing circuit 3101 is configured to obtain a forward output result of the $i^{th}$ layer, an output result gradient of the $i^{th}$ layer, and a weight gradient of the $i^{th}$ layer according to the plurality of intermediate results, and update the weight of the $i^{th}$ layer according to the weight gradient of the $i^{th}$ layer.

Alternatively, the activation function f may be any of the following nonlinear functions: sigmoid, tanh, relu, softmax, or may be a linear function.

The operation instructions may include: a CONFIG instruction, a COMPUTE instruction, an IO instruction, a NOP instruction, a JUMP instruction, or a MOVE instruction.

Alternatively, the primary processing circuit may include a first storage unit, a first operating unit, a first data dependency determination unit, and a first storage unit, in which:

a neuron caching unit is configured to cache input data and output data used by the primary processing circuit when performing computations;

the first operating unit is configured to perform various computation functions of the primary processing circuit; and the first data dependency determination unit is configured to read an input neuron vector from the first storage unit, and send the input neuron vector to the secondary processing circuits through an interconnection module, and receive an intermediate result vector of the interconnection module and send the intermediate result vector to the first operating unit.

Alternatively, the first operating unit may include: a vector addition unit and an activation operating unit;

the vector addition unit is configured to perform element-wise addition on biased data and the intermediate result to obtain a biased result; and the activation operating unit is configured to perform an activation function operation on the bias result.

Alternatively, each secondary processing circuit may include a second operating unit, a second data dependency determination unit, a second storage unit, and a third storage unit, where the second operating unit is configured to perform arithmetic logic operations;

the second data dependency determination unit is configured to perform read/write operations on the second storage unit and the third storage unit;

the second storage unit is configured to cache data of an input neuron vector and cache an output neuron value obtained by computations performed by the secondary processing circuit; and the third storage unit is configured to cache a weight vector needed during a computation of the secondary processing circuit.

Alternatively, the second operating unit may include: a vector multiplication unit and an accumulation unit;

the vector multiplication unit is configured to perform vector multiplication operations in dot product operations; and the accumulation unit is configured to perform accumulation operations in dot product operations.

The above-mentioned process of updating the weight may include that:

the primary processing circuit 3101 is configured to transfer input neuron data of the $i^{th}$ layer to each secondary processing circuits respectively, transfer the input neuron gradient of the $i^{th}$ layer to each secondary processing circuit 3102. Each secondary processing circuit 3102 may multiply scalar data corresponding to the secondary processing circuit in the input neuron gradient of the $i^{th}$ layer in_gradient by the input neuron data of the $i^{th}$ layer to obtain an original weight update gradient vector dw_original of the $i^{th}$ layer of each secondary processing circuit. After original weight update gradient vectors of all layers are obtained, in order to restrict the gradient range of the weight, the primary processing circuit may perform restriction processing on an original weight update gradient. Specifically, the primary processing circuit is configured to compute a quadratic sum sumsq_diff of original weight update gradients of all layers, then extract a root of sumsq_diff to obtain l2norm_diff, if l2norm_diff is greater than clip_gradient (a given positive constant), the primary processing circuit may compute a scale factor scale_factor=clip_gradient/l2norm_diff, multiply all original weight update gradients dw_original by the scale factor scale_factor respectively to obtain a weight update gradient dw', and send the update gradient dw' to each secondary processing circuit; and the secondary processing circuit is configured to multiply the weight update gradient dw' by the weight to obtain an update weight of each secondary processing circuit of the $i^{th}$ layer.

In the technical solution provided by the present disclosure, the operating unit has a structure of one-primary and multiple-secondary. For a computation instruction of a forward operation, the structure can partition data according to the computation instruction of the forward operation, so that parallel operations can be performed for a part with large computation amount through a plurality of secondary processing circuits, thereby increasing the operation speed, saving the operation time, and reducing the power consumption. For a back operation, data can also be partitioned. Similar to the forward operation, the operation speed may also be improved.

Alternatively, the primary processing circuit and the secondary processing circuits may include a storage module which is configured to store data of the primary processing circuit or the secondary processing circuits. It should be explained that the primary processing circuit and the secondary processing circuits may share the storage module. In other words, one or a plurality of areas in the primary processing circuit may be used as a shared area, and the storage space of the shared area may be used (including read or write data) by the plurality of secondary processing circuits. One or a plurality of areas in the storage module of the secondary processing circuits may also be used as a shared area, and the storage space of the shared area may be used (including read or write data) by primary processing circuit.

The technical solution provides a plan of area-sharing of the storage module. Compared with a solution of a fixed storage module, the sharing of storage module by the interconnected primary processing circuit and the plurality of secondary processing circuits can help to avoid the problem that computations cannot be performed due to insufficient storage. In addition, the sharing of storage module can effectively reduce the storage space required by the storage area of the primary processing circuit, which may greatly reduce the cost of the primary processing circuit. In addition, compared with fetching data from external devices, the present technical solution can reduce the overhead of data reading or writing. Regarding the present computing device, when reading or writing data from external devices, the data need to be forwarded by the controller unit, the conversion unit, and the like. In this case, for neural network operations, data need to go through multiple components, thereby causing high data read/write overhead and high energy consumption. By setting a shared area in the primary processing circuit and the secondary processing circuit, when the space of the storage module of the primary processing circuit or of the secondary processing circuits is insufficient, there is no need to store the data in an external device, instead, the data can be directly stored in the operating unit, thereby greatly reducing the overhead.

Figure 4A:
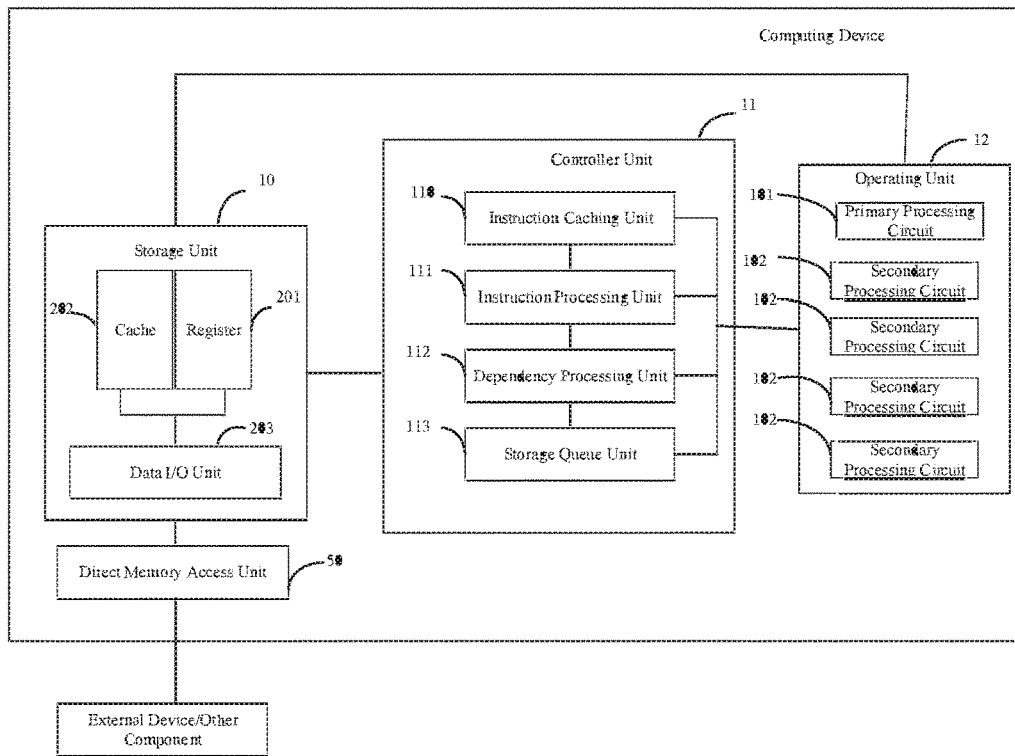
FIG. 4A is a schematic structural diagram of an operating unit according to an example of the present disclosure.

Alternatively, referring to FIG. 4A, the computing device may further include: the storage unit 10 and a direct memory access unit 50, where the storage unit 10 may include one or any combination of a register 210 and a cache 202. Specifically, the cache 202 is configured to store the computation instructions. The register 201 is configured to store the input neuron data, weight data, input neuron gradients, and scalars. The cache 202 is a high-speed temporary cache. The direct memory access unit 50 is configured to read data from or store data in the storage unit 10.

Alternatively, the controller unit 11 may include an instruction caching unit 110, an instruction processing unit 111, and a storage queue unit 113, where the instruction caching unit 110 is configured to store a computation instruction associated with the artificial neural network operations;

the instruction processing unit 111 is configured to parse the computation instruction to obtain a plurality of operation instructions; and the storage queue unit 113 is configured to store an instruction queue that may include a plurality of operation instructions or computation instructions that are to be performed and are sorted in sequential order.

For instance, in an optional technical solution, a primary operation processing circuit may include a controller unit, where the controller unit may include a primary instruction processing unit configured to decode an instruction to a micro-instruction. For instance, in another optional technical solution, a secondary processing circuit may include another controller unit, where another controller unit may include a secondary instruction processing unit configured to receive and process a micro-instruction. The micro-instruction may be an instruction in a next level of an instruction. The micro-instruction can be obtained by partitioning or decoding an instruction, and can be further decoded into control signals of each component, each unit, or each processing circuit.

As an optional example, the table below shows a structure of the computation instruction.

| opcode | register or immediate value | register/immediate value | ... |
|---|---|---|---|

The ellipsis in the table above indicates that a plurality of registers or immediate values may be included.

In another alternative example, the computation instruction may include one or a plurality of operation fields and one opcode. The computation instruction may include a neural network operation instruction. Taking a neural network operation instruction as an instance, as shown in the table below, register number 0, register number 1, register number 2, register number 3, and register number 4 may be operation fields. Register number 0, register number 1, register number 2, register number 3, and register number 4 may be the number of one or a plurality of registers.

| opcode | register number 0 | register number 1 | register number 2 | register number 3 | register number 4 |
|---|---|---|---|---|---|
| COM-PUTE | input data initial address | input data length | weight initial address | weight length | address of activation function interpolation table |
| IO | address of external memory for data | data length | address of internal memory for data | | |
| NOP | | | | | |
| JUMP | target address | | | | |
| MOVE | input address | data size | output address | | |

The register may be an off-chip memory. In a real application, the register may also be an on-chip memory for storing data. The data may be n-dimensional data, where n is an integer greater than or equal to 1. For instance, when n=1, the data are one-dimensional data which is a vector, when n=2, the data are two-dimensional data which is a matrix, and when n=3 or more than 3, the data are multi-dimensional tensor.

Figure 4B:
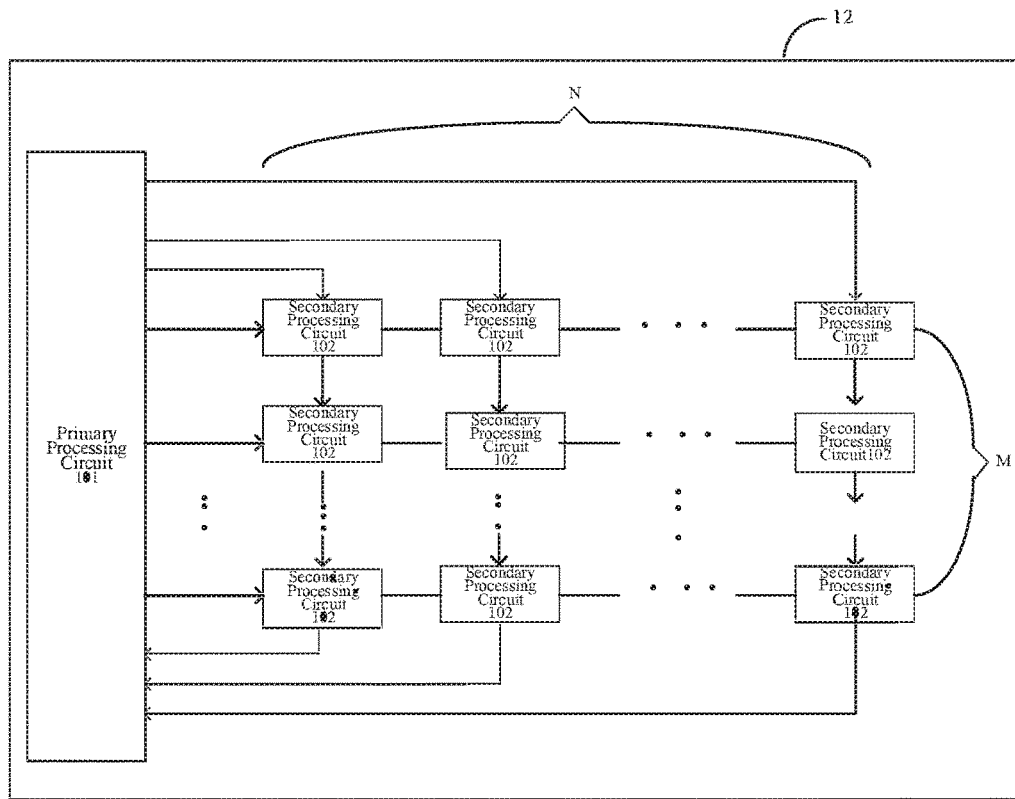
FIG. 4B is another schematic structural diagram of an operating unit according to an example of the present disclosure.

In another alternative example, as shown in FIG. 3B, the operating unit 12 may include one primary processing circuit 3101 and a plurality of secondary processing circuits 3102. In an example, as shown in FIG. 4B, the plurality of secondary processing circuits 102 may be arranged in the form of an array. Each secondary processing circuit may be connected to another adjacent secondary processing circuit, and the primary processing circuit 101 may be connected to k secondary processing circuits of the plurality of secondary processing circuits, where the k secondary processing circuits may be: n secondary processing circuits in a first row, n secondary processing circuits in an m-th row, and m secondary processing circuits in a first column. It should be explained that, as shown in FIG. 4B, the k secondary processing circuits may only include n secondary processing circuits in a first row, n secondary processing circuits in an m-th row, and m secondary processing circuits in a first column. In other words, the k secondary processing circuits may be secondary processing circuits that are connected to the primary processing circuit directly in the plurality of secondary processing circuits.

The k secondary processing circuits are configured to forward data and instructions among the primary processing circuit and the plurality of secondary processing circuits.

Alternatively, the conversion unit may be set inside the primary processing circuit.

The primary processing circuit may further include:
an activation processing circuit configured to perform activation operations or derivative operations on data in the primary processing circuit; and
an addition processing circuit configured to perform addition operations or accumulation operations.

The primary processing circuit is configured to determine the input neuron data as data for broadcasting, the weight data as data for distribution, divide the data for distribution as a plurality of data blocks, and send at least one of the data blocks and at least one operation instruction of a plurality of operation instructions to the secondary processing circuits.

The plurality of secondary processing circuits are configured to perform operations on received data according to the operation instruction to obtain an intermediate result, and transfer the intermediate result to the primary processing circuit.

The primary processing circuit is configured to receive a forward output result of the $i^{th}$ layer, an output result gradient of the $i^{th}$ layer, and a weight gradient of the $i^{th}$ layer, and update the weight of the $i^{th}$ layer according to the weight gradient of the $i^{th}$ layer.

The secondary processing circuit may include a multiplication processing circuit.

The multiplication processing circuit is configured to perform product operations on received data blocks to obtain a product result.

A forwarding processing circuit (optional) is configured to forward received data blocks or product results.

The accumulation processing circuit is configured to perform accumulation on the product results to obtain the intermediate result.

In another example, the operation instruction may be a computation instruction such as a matrix-multiply-matrix instruction, an accumulation instruction, an activation instruction, and the like.

A specific computation method of the computing device shown in FIG. 4 will be explained through a neural network operation instruction. For a neural network operation instruction, a formula to be perform can be: $s=s(\Sigma wx_i+b)$, which is to multiply a weight W by input data $x_i$, find the sum, add a bias b, perform an activation operation s(h), and obtain the final output result S.

Figure 4C:
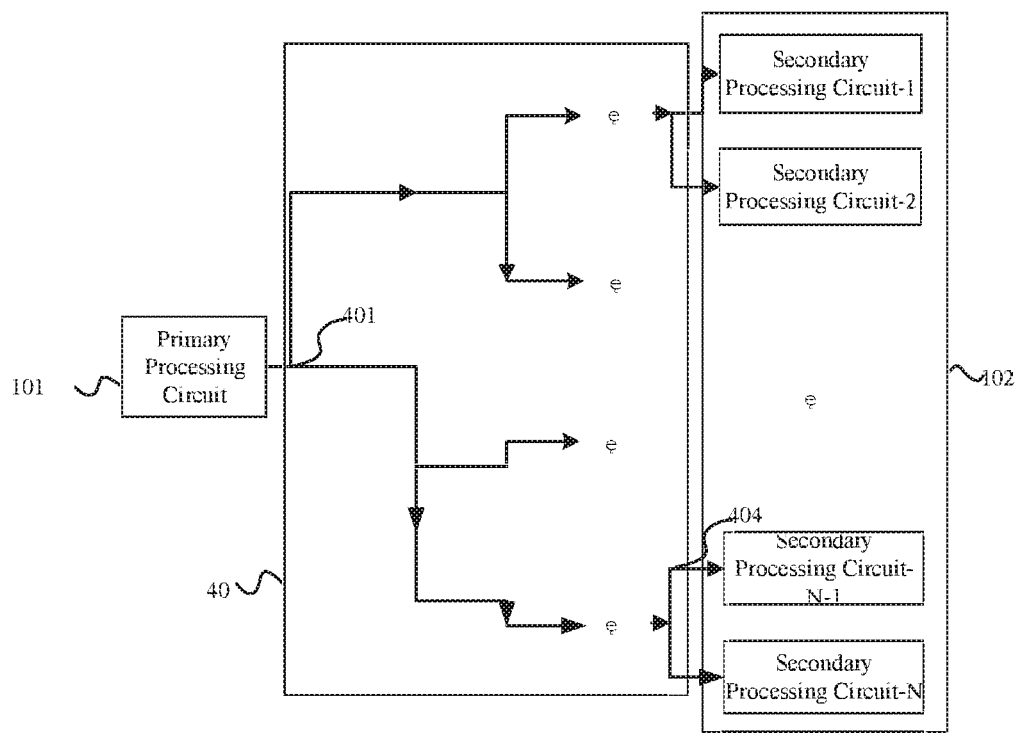
FIG. 4C is a schematic sending diagram of a tree module according to an example of the present disclosure.

As an alternative example, as shown in FIG. 4C, the device may further include: a tree module 40, where the tree module may include: a root port 401 and a plurality of branch ports 404, in which the root port of the tree module is connected to the primary processing circuit, and the plurality of branch ports of the tree module are connected to a secondary processing circuit of the plurality of secondary processing circuits respectively.

Figure 4D:
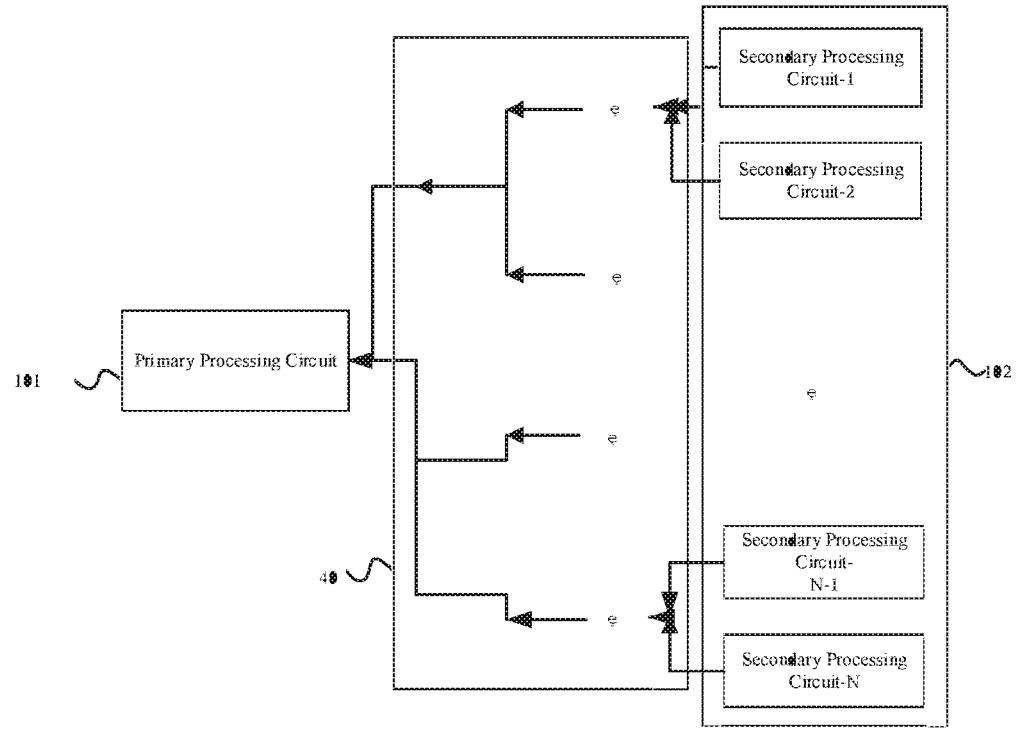
FIG. 4D is a schematic receiving diagram of a tree module according to an example of the present disclosure.

The tree module has a receiving and transferring function. For instance, as shown in FIG. 4C, the tree module has a transferring function, and as shown in FIG. 4D, the tree module 40 has a receiving function.

The tree module is configured to forward data and operation instructions between the primary processing circuit and the plurality of secondary processing circuits.

Alternatively, the tree module is an optional structure of the computing device. The tree module may include at least one layer of nodes, where the nodes are line-structured with a forwarding function, and the nodes may not have a computation function. If the tree module has zero layer of nodes, the tree module may be unnecessary.

Alternatively, the tree module may has an n-ary tree structure, for instance, a binary tree structure shown in FIG. 4C, the tree module may also be a ternary tree structure, where n may be an integer greater than or equal to 2. Examples of the present disclosure do not restrict a specific value of the n, the count of layers may be 2, and the secondary processing circuits may be connected to nodes of layers except a last but one layer.

Alternatively, the primary processing circuit inside the operating unit may have an independent cache, and may include: a neuron caching unit configured to cache input neuron vector data and output neuron value data of the secondary processing circuit. The primary processing circuit may further include a weight caching unit configured to cache weight data required by the secondary processing circuit during computations.

In an alternative example, the operating unit 12 is as shown in FIG. 3C, where the operating unit may include a branch processing circuit 3103. A specific connection structure is shown in FIG. 3C, where the primary processing circuit 3101 is connected to one or a plurality of branch processing circuits 3103, and the branch processing circuits 3103 are connected to one or a plurality of secondary processing circuits 3102; and the branch processing circuit 3103 is configured to forward data or instructions between the primary processing circuit 3101 and the secondary processing circuits 3102.

Alternatively, a storage module may be arranged inside the branch processing circuit 3103. The storage module may set one or more shared areas. The primary processing circuit and secondary processing circuits can write in or read data from the shared areas. Setting the shared areas inside the branch processing circuit 3103 can facilitate data storage of the primary processing circuit and the secondary processing circuits. The overhead caused by reading and writing of data storage is low. By doing so, the capacity of the storage modules of the primary processing circuit and the secondary processing circuits may be saved, thereby reducing the costs of the computing device.

In an optional example where a fully connected computation of neural network operations is as an instance, a process can be: y=f(wx+b), where, x is an input neuron matrix, w is a weight matrix, b is a bias scalar, f is an activation function that may be any of sigmoid, tanh, relu, and softmax. Assuming that there is a binary tree structure, the computing unit has 8 secondary processing circuits, and an implementation method may be:

The controller unit fetches the input neuron matrix x, the weight matrix w, and a fully connected computation instruction from the storage unit, and transfer the input neuron matrix x, the weight matrix w, and the fully connected computation instruction to the primary processing circuit.

The primary processing circuit determines the input neuron matrix x as data for broadcasting, determines the weight matrix weight as data for distribution, partitions the weight matrix w into 8 sub-matrices, transfer the 8 sub-matrices to 8 secondary processing circuits via the tree module, and broadcast the input neuron matrix x to 8 secondary processing circuits.

The secondary processing circuits perform multiplication and accumulation of the 8 sub-matrices and the input neuron matrix x to obtain 8 intermediate results, and transfer the 8 intermediate results to the primary processing circuit.

The primary processing circuit sorts the 8 intermediate results to obtain an operation result of wx, perform a bias b operation on the operation result, perform activation operations to obtain a final result y, and send the final result y to the controller unit. The controller unit outputs the final result y to the storage unit or stores the final result y in the storage unit.

A method for sorting the 8 intermediate results to obtain an operation result of wx may be: for matrix-multiply-matrix, determining some elements of the input neuron matrix x corresponding to the 8 sub-matrices, extracting a minimum value of rows of the 8 sub-matrices and a minimum value of columns of the some elements, the minimum value of rows and the minimum value of columns are the positions of the intermediate results in the operation result.

A method of performing a forward operation instruction of a neural network by the computing device as shown in FIG. 4 may include:

The controller unit fetches a neural network forward operation instruction, an operation field and at least one opcode corresponding to the neural network operation instruction from the instruction storage unit. The controller unit transfers the operation field to a data accessing unit, and send the at least one opcode to the operating unit.

The controller unit fetches a weight w and a bias b corresponding to the operation field from the storage unit (if b is 0, there is no need to fetch the bias b), transfers the weight w and the bias b to the primary processing circuit of the operating unit. The controller unit fetches input data Xi from the storage unit, and sends the input data Xi to the primary processing circuit.

The primary processing circuit determines the opcode as multiplication according to the at least one opcode, converts the input data Xi into fixed point input data Xi, converts weight data into fixed point weight data, determines the fixed point input data Xi as data for broadcasting, determines the fixed point weight data as data for distribution, and partitions the weight w into n fixed point data blocks.

The instruction processing unit of the controller unit determines a multiplication instruction, a bias instruction, and an accumulation instruction according to the at least one opcode, sends the multiplication instruction, the bias instruction, and the accumulation instruction to the primary processing circuit. The primary processing circuit sends the multiplication instruction and the input data Xi to the plurality of secondary processing circuits by means of broadcasting, and distributes the n fixed point data blocks to the plurality of secondary processing circuits (for instance, if there are n secondary processing circuits, each secondary processing circuit may receive one data block). The plurality of secondary processing circuits are configured to perform fixed point multiplication on the fixed point input data Xi and received fixed point data blocks according to the multiplication instruction to obtain a fixed point intermediate result, send the fixed point intermediate result to the primary processing circuit. The primary processing circuit accumulates intermediate results sent from the plurality of secondary processing circuits according to the accumulation instruction to obtain an accumulation result, converts the accumulation result into floating point accumulation result, adds the bias b to the floating point accumulation result according to the bias instruction to obtain a final result, and sends the final result to the controller unit.

The technical solution provided by the present disclosure can realize multiplication operations and bias operations of neural networks through instructions, which are neural network operation instructions, without storing or fetching intermediate results of neural network operations. The technical solution reduces the storing and fetching of intermediate data, and has technical effects of reducing corresponding operating steps and improving computational outcomes of neural networks.

The present disclosure further discloses a neural network device which may include one or a plurality of computing devices mentioned in the present disclosure. The neural network device is configured to obtain data to be operated and control information from other processing devices, perform designated neural network training operations, and transfer operation results to peripheral apparatus via an I/O interface. The peripheral apparatus may include a camera, a monitor, a mouse, a keyboard, a network card, a WIFI interface, and a server. When more than one computing devices are included, the computing devices can be connected to each other and transfer data to each other through a specific structure, for instance, the computing devices can realize interconnection and data transfer through a PCIE bus, so as to support machine learning operations with larger scale. In this case, the computing devices may share the same control system, or have their own independent control systems. The computing devices can share a memory, or have their own memories. In addition, an interconnection manner of the computing devices may be any interconnection topology.

The neural network computing devices may have good compatibility and may be connected to various types of servers through a PCIE interface.

Figure 4E:
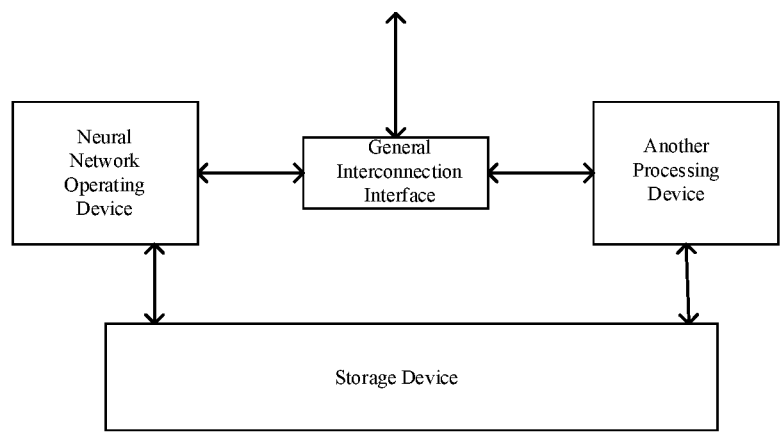
FIG. 4E is a schematic structural diagram of a combined processing device according to an example of the present disclosure.

The present disclosure also discloses a combined processing device which may include the neural network device, a general interconnection interface, and other processing devices. The neural network device interacts with other processing devices to perform operations specified by users. FIG. 4E is a schematic diagram of the combined processing device.

The other processing devices may include at least one or more of a general-purpose/special-purpose processors such as a central processing unit (CPU), a graphics processing unit (GPU), a neural network processor, and the like. The present disclosure does not restrict a count of processors included in the other processing devices. The other processing devices may serve as an interface that connects the neural network device to external data and control, including data moving, and may perform basic control such as starting and stopping the neural network device. The other processing devices may also cooperate with the neural network device to complete operational tasks.

The general interconnection interface is configured to transfer data and control instructions between the neural network device and the other processing devices. The neural network device may obtain required input data from the other processing devices and write the data in an on-chip storage means of the neural network device. The neural network device may obtain control instructions from the other processing devices, and write the control instructions in an on-chip control cache of the neural network device. The neural network device may further read data stored in the storage module of the neural network device and transfer the data to the other processing devices.

Alternatively, the structure is as shown in FIG. 4, which may include a storage means. The storage means is connected to the neural network device and the other processing devices respectively. The storage means is configured to store data of the neural network device and the other processing devices. The storage means may be particularly suitable for a case where data that need to be computed cannot be entirely stored in an internal memory of the machine learning operating device or the other processing devices.

The combined processing device can be used as an SOC (System On Chip) of a device including a mobile phone, a robot, a drone, a video surveillance device, and the like, which may effectively reduce the core area of a control part, increase the processing speed, and reduce overall power consumption. In this case, a universal interconnection interface of the combined processing device may be connected to some components of the device. Some components include webcams, monitors, mice, keyboards, network cards, and WIFI interfaces.

In some examples, the present disclosure discloses a chip including the neural network operating device or the combined processing device.

In some examples, the present disclosure provides a chip package structure including the chip.

Figure 5:
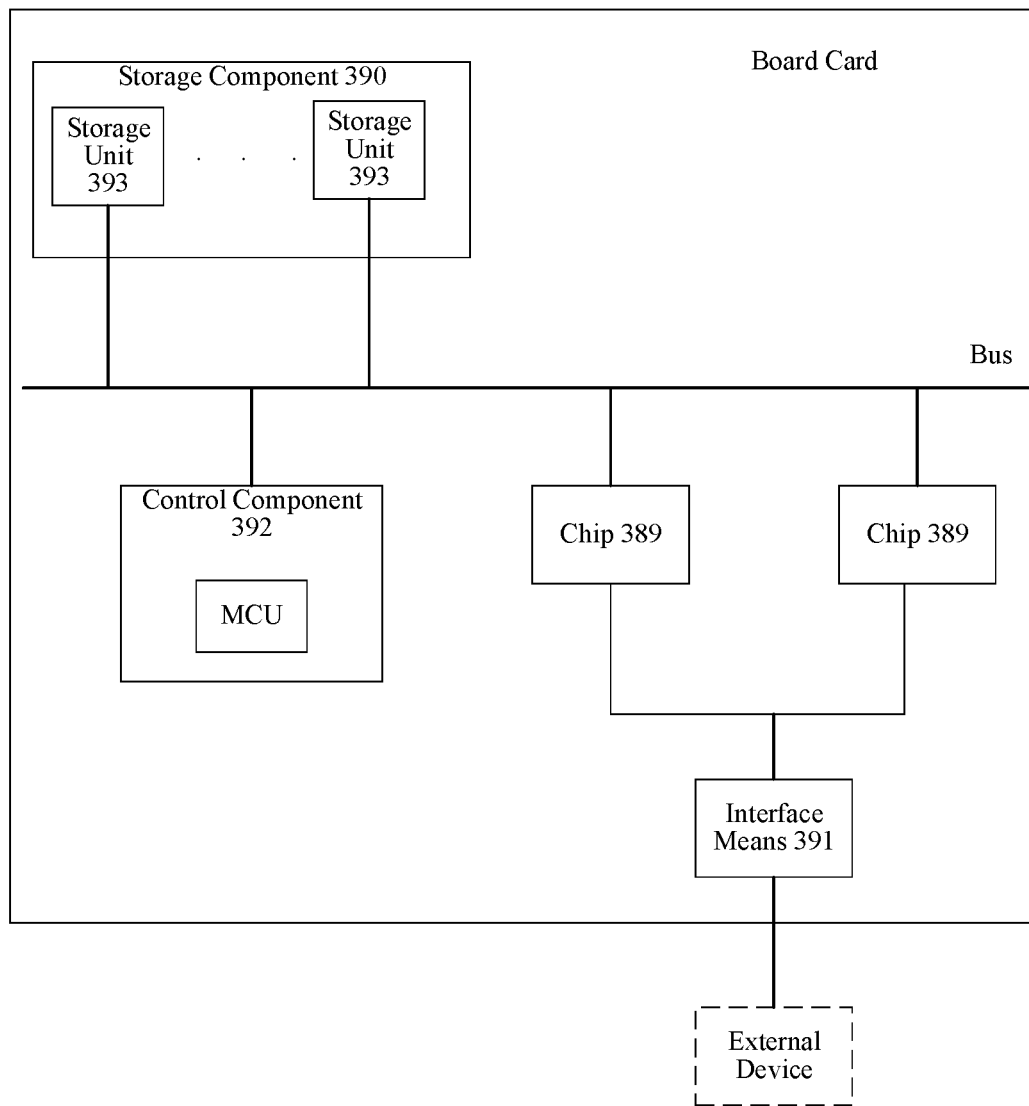
FIG. 5 is a schematic structural diagram of a board card according to an example of the present disclosure.

In some examples, the present disclosure provides a board card including the chip package structure. Referring to FIG. 5 which provides a board card, in addition to the above-mentioned chip 389, the board card may further include other matching components. The matching components may include but not limited to: a storage component 390, an interface means 391, and a control component 392.

The storage component 390 is connected to the chip inside the chip package structure via a bus, and is configured to store data. The storage component may include a plurality groups of storage units 393. Each group of storage units is connected to the chip via the bus. It can be understood that each group of the storage units may be DDR SDRAM (Double Data Rate SDRAM).

DDR can double the speed of SDRAM without increasing the clock frequency. DDR allows data reading on the rising and falling edges of the clock pulse. The speed of DDR is twice the speed of standard SDRAM. In an example, the storage device may include four groups of storage units. Each group of the storage units may include a plurality of DDR4 particles (chips). In an example, four 72-bit DDR4 controllers may be arranged inside the chip, where 64 bits of each 72-bit DDR4 controller are for data transfer and 8 bits are for ECC parity. It can be understood that when each group of the storage units adopts DDR4-3200 particles, the theoretical bandwidth of data transfer may reach 25600 MB/s.

In one example, each group of the storage units may include a plurality of DDR SDRAMs (Double Data Rate Synchronous Dynamic Random Access Memory) arranged in parallel. DDR can transfer data for two times per clock cycle. A DDR controller may be arranged inside the chip. The DDR controller is configured to control the data transfer and the data storage of each storage unit.

The interface means may be electrically connected to the chip inside the chip package structure. The interface means is configured to realize data transfer between the chip and an external device (such as a server or a computer). In one example, the interface means may be a standard PCIE interface. For instance, data to be processed may be transferred by a server via the standard PCIE interface to the chip, thereby realizing data transfer. Alternatively, when a PCIE 3.0×16 interface is adopted for transferring, the theoretical bandwidth may reach 16000 MB/s. In another example, the interface means may also be another interface. The present disclosure does not restrict a specific form of another interface as long as the interface unit can realize the transferring function. In addition, a computation result of the chip may still be transferred by the interface means to an external device (such as a server).

The control component is electrically connected to the chip. The control component is configured to monitor a status of the chip. Specifically, the chip and the control component can be electrically connected through a SPI interface. The control component may include MCU (Micro Controller Unit). If the chip includes a plurality of processing chips, a plurality of processing cores, or a plurality of processing circuits, the chip is capable of driving a plurality of loads. In this case, the chip can be in different working status such as multi-load status and light-load status. The working status of the plurality of processing chips, the plurality of processing cores, or a plurality of processing circuits can be regulated and controlled by the control device.

Some examples provide an electronic device which includes the board card.

The electronic device may include a data processing device, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or medical equipment.

The vehicle may include an airplane, a ship, and/or a car; the household electrical appliance may include a television, an air conditioner, a microwave oven, a refrigerator, an electric rice cooker, a humidifier, a washing machine, an electric lamp, a gas cooker, and a range hood; and the medical equipment may include a nuclear magnetic resonance spectrometer, a B-ultrasonic scanner, and/or an electrocardiograph.

The examples of the present disclosure have been described in detail above. The principles and implementations of the present disclosure are illustrated in the specific examples. The description of the examples above is only used to facilitate the understanding of the method and core ideas of the present disclosure. In addition, a person skilled in the art may make changes based on the specific examples and the scope of the applications according to the ideas of the present disclosure. In summary, the content of the present specification should not be construed as limiting the present disclosure.

What is claimed is:

1. A neural network operation module configured to perform operations of a multi-layer neural network, comprising:
    a storage unit configured to store input neuron precision, weight precision, and output neuron gradient precision;
    a controller unit configured to obtain input neuron precision $S_{x(l)}$, weight precision $S_{w(l)}$, and output neuron gradient precision $S\nabla_{x(l)}$ of an $L^{th}$ layer of the multi-layer neural network, wherein L is an integer greater than 0, obtain gradient update precision T according to the input neuron precision $S_{x(l)}$, the weight precision $S_{w(l)}$, and the output neuron gradient precision $S\nabla_{x(l)}$, and if the gradient update precision T is less than preset precision $T_r$, adjust the input neuron precision $S_{x(l)}$, the weight precision $S_{w(l)}$, and the output neuron gradient precision $S\nabla_{x(l)}$ to minimize an absolute value of a difference between the gradient update precision T and the preset precision $T_r$; and
    an operating unit configured to represent an input neuron and a weight of the $L^{th}$ layer according to the adjusted input neuron precision $S_{x(l)}$ and the weight precision $S_{w(l)}$, and represent an output neuron gradient of the $L^{th}$ layer obtained from computations according to the adjusted output neuron gradient precision $S\nabla_{x(l)}$ for subsequent computations;
    wherein the controller unit is further configured to:
        obtain the preset precision $T_r$ according to a method of machine learning, or
        obtain the preset precision $T_r$ according to a count of output neurons, a learning rate, and a count of samples during batch processing of an $(L-1)^{th}$ layer, wherein the greater the count of output neurons, the count of samples during batch processing, and the learning rate of the $(L-1)^{th}$ layer are, the greater the preset precision $T_r$ is.

2. The module of claim 1, wherein the obtaining, by the controller unit, of the gradient update precision T according to the input neuron precision $S_{x(l)}$, the weight precision $S_{w(l)}$, and the output neuron gradient precision $S\nabla_{x(l)}$ includes:
    the controller unit performs computations on the input neuron precision $S_{x(l)}$, the weight precision $S_{w(l)}$, and the output neuron gradient precision $S\nabla_{x(l)}$ according to a preset formula to obtain the gradient update precision T,
    wherein the preset formula is: $T=S_{x(l)}+S\nabla_{x(l)}-S_{w(l)}$.

3. The module of claim 2, wherein the adjusting, by the controller unit, of the input neuron precision $S_{x(l)}$, the weight precision $S_{w(l)}$, and the output neuron gradient precision $S\nabla_{x(l)}$ includes:
    the controller unit keeps the input neuron precision $S_{x(l)}$ and the weight precision $S_{w(l)}$ unchanged, and increases the output neuron gradient precision $S\nabla_{x(l)}$.

4. The module of claim 3, wherein when the controller unit increases the output neuron gradient precision $S\nabla_{x(l)}$, the controller unit decreases a bit width of a fixed point data format representing the output neuron gradient.

5. The module of claim 4, wherein the decreasing, by the controller unit, of the bit width of the fixed point data format representing the output neuron gradient includes:
    the controller unit decreases the bit width of the fixed point data format representing the output neuron gradient according to a first preset stride N1,
    wherein the first preset stride N1 can be 1, 2, 4, 6, 7, 8, or another positive integer.

6. The module of claim 4, wherein the decreasing, by the controller unit, of the bit width of the fixed point data format representing the output neuron gradient includes:
    the controller unit decreases the bit width of the fixed point data format representing the output neuron gradient with an increment of 2.

7. The module of claim 3, wherein after the controller unit increases the output neuron gradient precision $S\nabla_{x(l)}$, the controller unit is further configured to:
    determine whether the output neuron gradient precision $S\nabla_{x(l)}$ is less than required precision, wherein the required precision is a minimum precision of an output neuron gradient when a multi-layer neural network operation is performed; and
    if the output neuron gradient precision $S\nabla_{x(l)}$ is less than the required precision, the controller unit decreases the bit width of the fixed point data format representing the output neuron gradient.

8. A neural network operation method, comprising:
    obtaining input neuron precision $S_{x(l)}$, weight precision $S_{w(l)}$, and output neuron gradient precision $S\nabla_{x(l)}$ of an $L^{th}$ layer of a neural network;
    obtaining gradient update precision T by performing computations according to the input neuron precision $S_{x(l)}$, the weight precision $S_{w(l)}$, and the output neuron gradient precision $S\nabla_{x(l)}$;
    if the gradient update precision T is less than preset precision $T_r$, adjusting the input neuron precision $S_{x(l)}$, the weight precision $S_{w(l)}$, and the output neuron gradient $S\nabla_{x(l)}$ to minimize an absolute value of a difference between the gradient update precision T and the preset precision $T_r$;
    representing an input neuron and a weight of the $L^{th}$ layer according to the adjusted input neuron precision $S_{x(l)}$ and the weight precision $S_{w(l)}$; and representing an output neuron gradient of the $L^{th}$ layer obtained from computations according to the adjusted output neuron gradient precision $S\nabla_{x(l)}$ for subsequent computations, wherein the method further comprises:

obtaining the preset precision $T_r$ according to a method of machine learning, or obtaining the preset precision $T_r$ according to a count of output neurons, a learning rate, and a count of samples during batch processing of an $(L-1)^{th}$ layer, wherein the greater the count of output neurons, the count of samples during batch processing, and the learning rate of the $(L-1)^{th}$ layer are, the greater the preset precision $T_r$ is.

9. The method of claim 8, wherein the obtaining of the gradient update precision T by performing computations according to the input neuron precision $S_{x(l)}$, the weight precision $S_{w(l)}$, and the output neuron gradient precision $S\nabla_{x(l)}$ includes:

performing computations on the input neuron precision $S_{x(l)}$, the weight precision $S_{w(l)}$, and the output neuron gradient precision $S\nabla_{x(l)}$ according to a preset formula to obtain the gradient update precision T, wherein the preset formula is: $T=S_{x(l)}+S\nabla_{x(l)}-S_{w(l)}$.

10. The method of claim 9, wherein the adjusting of the input neuron precision $S_{x(l)}$, the weight precision $S_{w(l)}$, and the output neuron gradient precision $S\nabla_{x(l)}$ includes:

keeping the input neuron precision $S_{x(l)}$ and the weight precision $S_{w(l)}$ unchanged, and increasing the output neuron gradient precision $S\nabla_{x(l)}$.

11. The method of claim 10, wherein when increasing the output neuron gradient precision $S\nabla_{x(l)}$, the method further includes decreasing a bit width of a fixed point data format representing the output neuron gradient.

12. The method of claim 11, wherein after increasing the output neuron gradient precision $S\nabla_{x(l)}$, the method further includes:

determining whether the output neuron gradient precision $S\nabla_{x(l)}$ is less than required precision, wherein the required precision is a minimum precision of an output neuron gradient when a multi-layer neural network operation is performed; and if the output neuron gradient precision $S\nabla_{x(l)}$ is less than the required precision, decreasing the bit width of the fixed point data format representing the output neuron gradient.

13. The method of claim 11, wherein, the decreasing of the bit width of the fixed point data format representing the output neuron gradient includes:

decreasing the bit width of the fixed point data format representing the output neuron gradient according to a first preset stride N1, wherein the first preset stride N1 can be 1, 2, 4, 6, 7, 8, or another positive integer.

14. The method of claim 11, wherein the decreasing of the bit width of the fixed point data format representing the output neuron gradient includes:

decreasing the bit width of the fixed point data format representing the output neuron gradient with an increment of 2.

* * * * *